US012786987B2

(12) United States Patent
Li et al.

(10) Patent No.: US 12,786,987 B2
(45) Date of Patent: Nov. 3, 2026

(54) METHOD AND APPARATUS OF SCHEDULING REQUEST FOR SIDELINK COMMUNICATION IN MULTIPLE CARRIERS IN A WIRELESS COMMUNICATION SYSTEM

(71) Applicant: ASUS Technology Licensing Inc., Taipei City (TW)

(72) Inventors: Ming-Che Li, Taipei City (TW); Li-Chih Tseng, Taipei City (TW); Yi-Hsuan Kung, Taipei City (TW); Chun-Wei Huang, Taipei City (TW)

(73) Assignee: ASUS Technology Licensing Inc., Taipei City (TW)

( * ) Notice: Subject to any disclaimer, the term of this patent is extended or adjusted under 35 U.S.C. 154(b) by 620 days.

(21) Appl. No.: 18/134,583

(22) Filed: Apr. 14, 2023

(65) Prior Publication Data

US 2023/0354302 A1 Nov. 2, 2023

Related U.S. Application Data

(60) Provisional application No. 63/332,439, filed on Apr. 19, 2022.

(51) Int. Cl.

*H04W 72/1263* (2023.01)
*H04W 72/25* (2023.01)
*H04W 72/54* (2023.01)

(52) U.S. Cl.

CPC ....... *H04W 72/1263* (2013.01); *H04W 72/25* (2023.01); *H04W 72/54* (2023.01)

(58) Field of Classification Search

CPC . H04W 72/1263; H04W 72/25; H04W 72/54; H04W 72/23; H04W 72/40;

(Continued)

(56) References Cited

U.S. PATENT DOCUMENTS

| | | | | |
|---|---|---|---|---|
| 12,302,324 B2 * | 5/2025 | Zhao | | H04W 4/40 |
| 2022/0116959 A1 | 4/2022 | Li et al. | | |

(Continued)

FOREIGN PATENT DOCUMENTS

| | | |
|---|---|---|
| CN | 112929929 A | 6/2021 |
| CN | 113454938 A | 9/2021 |

(Continued)

OTHER PUBLICATIONS

Corresponding Korean Intellectual Property Office Application No. 10-2023-0049367, Office Action dated Sep. 25, 2025, 8 pages.

(Continued)

*Primary Examiner* — Ricky Q Ngo
*Assistant Examiner* — Kabir U Jahangir
(74) *Attorney, Agent, or Firm* — Cooper Legal Group LLC

(57) ABSTRACT

A method and apparatus are disclosed. In an example from the perspective of a first device configured with a plurality of carriers/cells for sidelink communication, the first device determines a first sidelink message for transmission to a first destination associated with a first set of carriers/cells of the plurality of carriers/cells. The first device triggers, based on the first sidelink message, a first scheduling request to a network node. The first device transmits a first signaling of the first scheduling request to the network node. The first signaling includes first information associated with the first destination and/or second information associated with the first set of carriers/cells.

20 Claims, 7 Drawing Sheets

(58) Field of Classification Search
CPC ..... H04W 72/21; H04W 24/10; H04W 72/12; H04W 72/232; H04W 72/542; H04W 92/18; H04L 5/0053
See application file for complete search history.

(56) References Cited

U.S. PATENT DOCUMENTS

| | | | | |
|---|---|---|---|---|
| 2023/0076874 | A1* | 3/2023 | Jeon | G01S 7/021 |
| 2023/0156859 | A1* | 5/2023 | Park | H04W 72/12<br>370/329 |
| 2024/0008000 | A1* | 1/2024 | Li | H04W 28/0278 |
| 2024/0113837 | A1* | 4/2024 | Hosseini | H04L 5/0053 |

FOREIGN PATENT DOCUMENTS

| | | | |
|---|---|---|---|
| CN | 113841462 | A | 12/2021 |
| EP | 3912295 | B1 | 11/2023 |

OTHER PUBLICATIONS

3GPP, TR37.985 v1.0.0: Overall description of Radio Access Network (RAN) aspects for Vehicle-to-everything (V2X) based on LTE and NR—Date of Publication on 3GPP server: Nov. 26, 2019.
Corresponding China Intellectual Property Office Application No. 202310398655.8, Office Action dated May 29, 2026, 20 pages.

* cited by examiner

METHOD AND APPARATUS OF SCHEDULING REQUEST FOR SIDELINK COMMUNICATION IN MULTIPLE CARRIERS IN A WIRELESS COMMUNICATION SYSTEM

CROSS-REFERENCE TO RELATED APPLICATIONS

The present Application claims the benefit of U.S. Provisional Patent Application Ser. No. 63/332,439 filed on Apr. 19, 2022, the entire disclosure of which is incorporated herein in its entirety by reference.

FIELD

This disclosure generally relates to wireless communication networks, and more particularly, to a method and apparatus of scheduling request for sidelink communication in multiple carriers in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a first device configured with a plurality of carriers/cells for sidelink communication, the first device determines a first sidelink message for transmission to a first destination associated with a first set of carriers/cells of the plurality of carriers/cells. The first device triggers, based on the first sidelink message, a first scheduling request to a network node. The first device transmits a first signaling of the first scheduling request to the network node. The first signaling comprises first information associated with the first destination and/or second information associated with the first set of carriers/cells.

In an example from the perspective of a first device, the first device receives, from a network node, first information associated with configuring a plurality of carriers/cells for sidelink communication. The first device receives, from the network node, a second information associated with configuring one or more scheduling request resources for requesting sidelink resources. The second information comprises a first scheduling request configuration associated with a first destination and/or a first set of carriers/cells of the plurality of carriers/cells. When the first device has a first sidelink Medium Access Control (MAC) Control Element (CE) available for transmission on a carrier/cell of the first set of carriers/cells to the first destination, the first device transmits, using the first scheduling request configuration, a first signaling of a first scheduling request to the network node. The first device receives, from the network node, a sidelink grant scheduling a first sidelink resource on a first carrier/cell of the first set of carriers/cells. The first device transmits the first sidelink MAC CE to the first destination on the first sidelink resource.

In an example from the perspective of a first device configured with a plurality of carriers/cells for sidelink communication, the first device generates a sidelink report, for transmission to a first destination, based on a measurement and/or a sensing result associated with a first sidelink resource pool in a first carrier/cell of the plurality of carriers/cells. The first device generates a sidelink MAC CE comprising the sidelink report and (i) information associated with the first carrier/cell, and/or (ii) information associated with the first sidelink resource pool. The first device transmits the sidelink MAC CE to the first destination on a second carrier/cell of the plurality of carriers/cells.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3$^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named “3rd Generation Partnership Project” referred to herein as 3GPP, including: 3GPP TS 38.214 V17.0.0 (2021 December), “3GPP TSG RAN; NR Physical layer procedures for data (Release 17)”; 3GPP TS 38.213 V17.0.0 (2021 December), “3GPP TSG RAN; NR Physical layer procedures for control (Release 17)”; 3GPP TS 38.212 V17.0.0 (2021 December), “3GPP TSG RAN; NR Multiplexing and channel coding (Release 17)”; 3GPP TS 38.321

V16.7.0 (2021 December), "3GPP TSG RAN; NR Medium Access Control (MAC) protocol specification (Release 16)"; 3GPP TS 38.331 V16.7.0 (2021 December), "3GPP TSG RAN; NR Radio Resource Control (RRC) protocol specification (Release 16)"; 3GPP TS 36.321 V16.6.0 (2021 October), "3GPP TSG RAN; E-UTRA; Medium Access Control (MAC) protocol specification (Release 16)"; 3GPP TS 36.331 V16.7.0 (2021 December), "3GPP TSG RAN; E-UTRA; Radio Resource Control (RRC) protocol specification (Release 16)"; RP-220476, "CR of TS 38.321 for Sidelink enhancement"; RP-213678, "New WID on NR sidelink evolution". The standards and documents listed above are hereby expressly incorporated by reference in their entirety.

Figure 1:
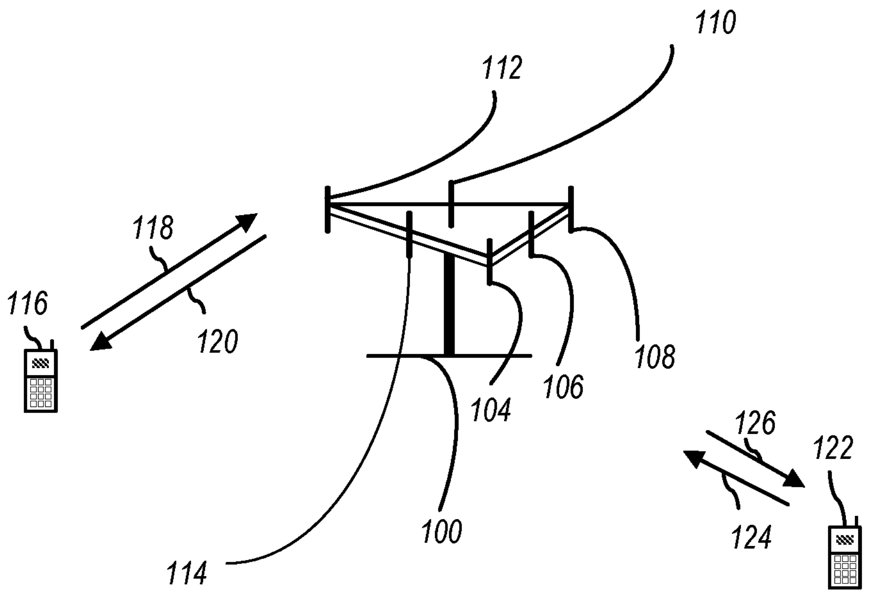
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
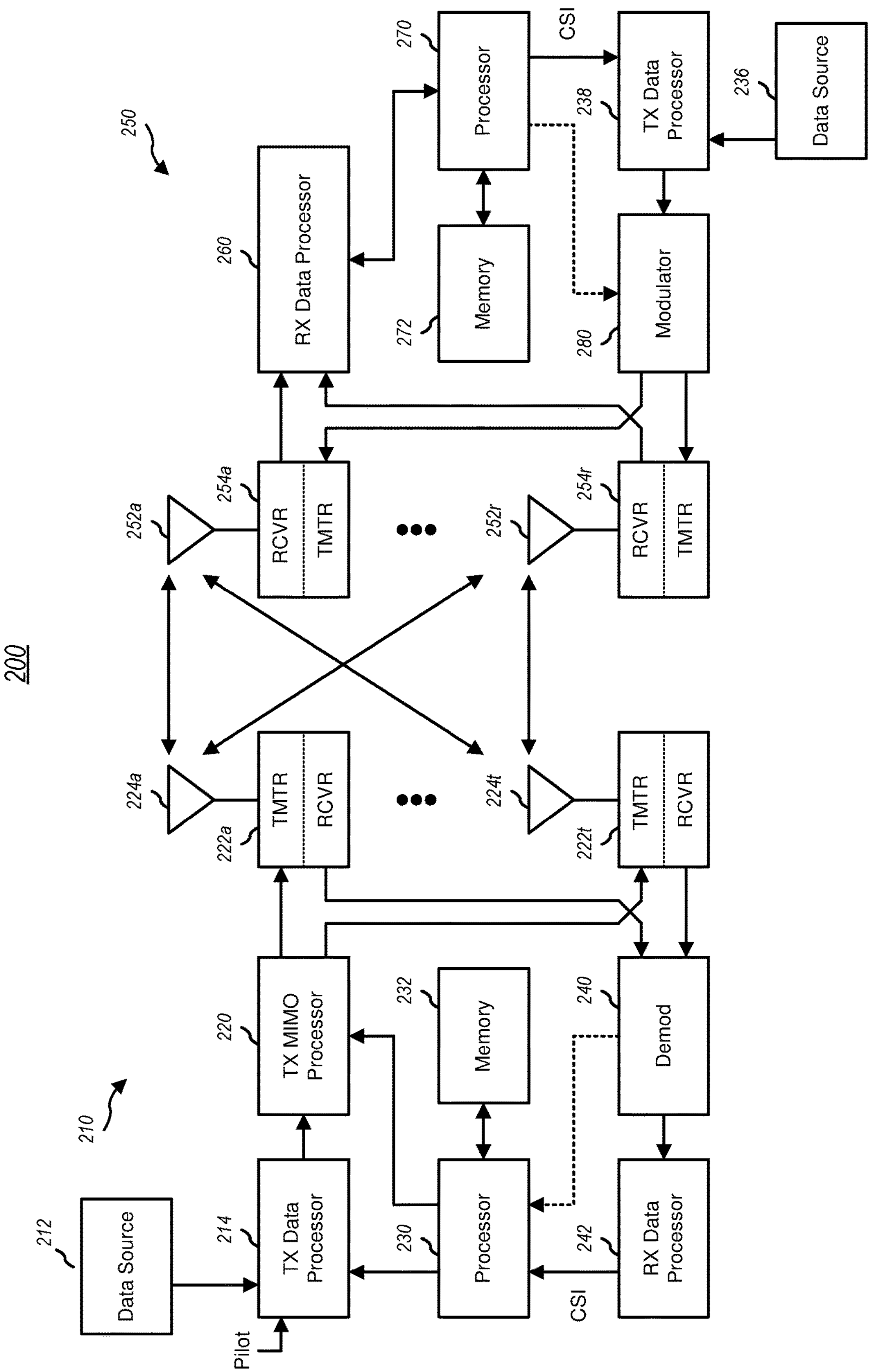
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222*a* through 222*t*. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222*a* through 222*t* may then be transmitted from $N_T$ antennas 224*a* through 224*t*, respectively.

At receiver system 250, the transmitted modulated signals are received by $N_R$ antennas 252*a* through 252*r* and the received signal from each antenna 252 may be provided to a respective receiver (RCVR) 254*a* through 254*r*. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which pre-coding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254*a* through 254*r*, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
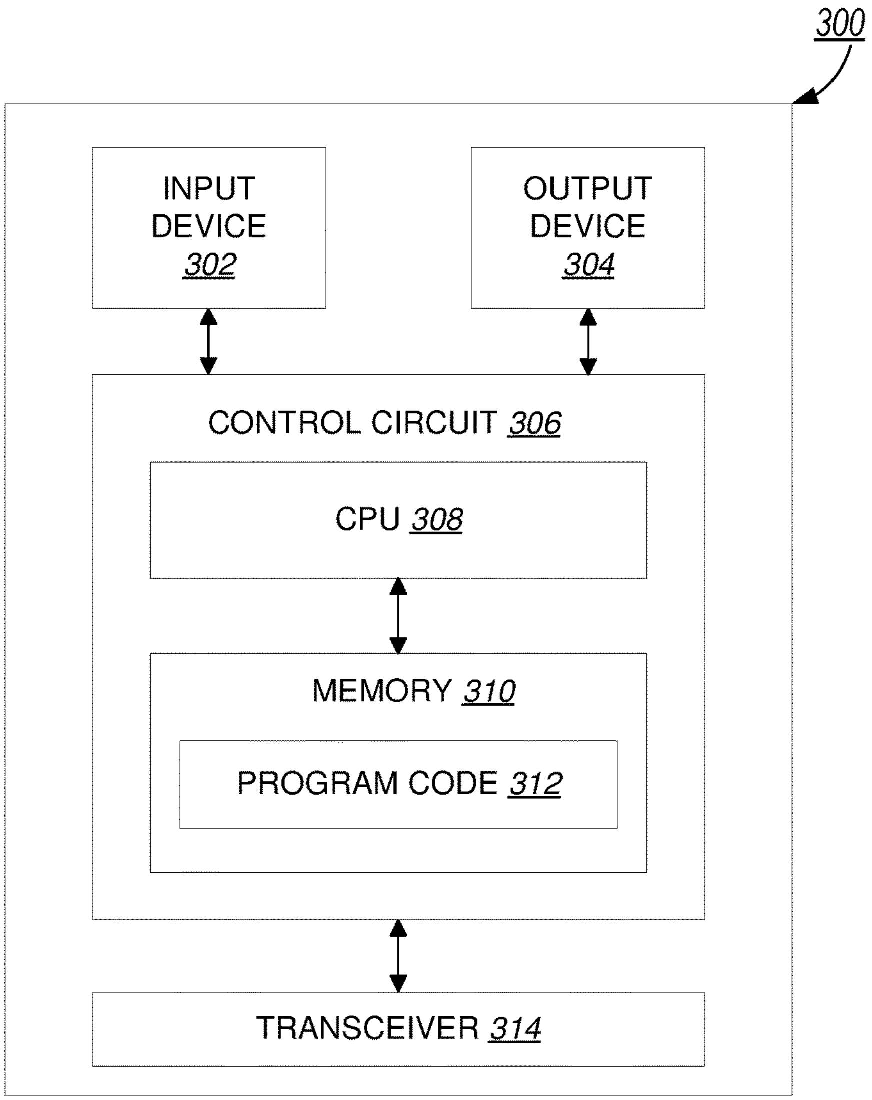
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
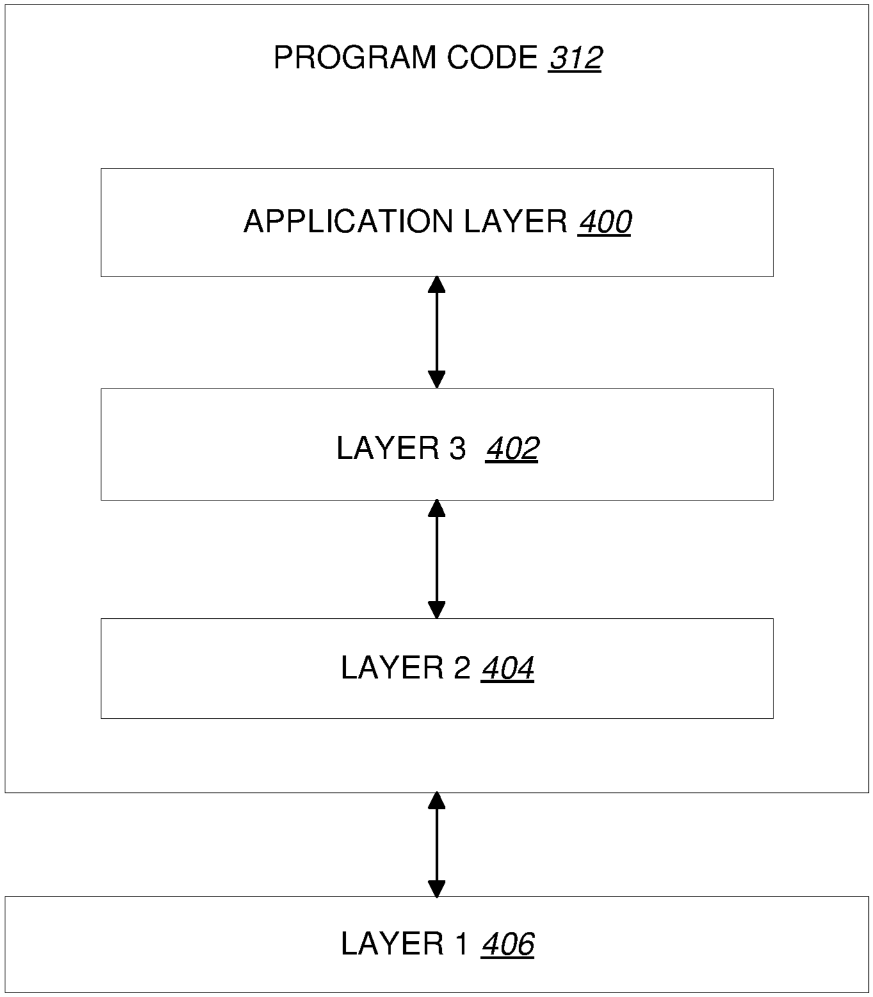
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

3GPP TS 38.214 V17.0.0 discusses Physical Sidelink Shared Channel (PSSCH)-related procedure in NR. Sidelink resource allocation mode 1 and sidelink resource allocation mode 2 for acquiring sidelink resources are discussed. One or more parts of 3GPP TS 38.214 V17.0.0 are quoted below:

8 Physical Sidelink Shared Channel Related Procedures

A UE can be configured by higher layers with one or more sidelink resource pools. A sidelink resource pool can be for transmission of PSSCH, as described in Clause 8.1, or for reception of PSSCH, as described in Clause 8.3 and can be associated with either sidelink resource allocation mode 1 or sidelink resource allocation mode 2.

In the frequency domain, a sidelink resource pool consists of sl-NumSubchannel contiguous sub-channels. A sub-channel consists of sl-SubchannelSize contiguous PRBs, where sl-NumSubchannel and sl-SubchannelSize are higher layer parameters.

The set of slots that may belong to a sidelink resource pool is denoted by $$\left(t_0^{SL}, t_1^{SL}, \ldots, t_{T_{max}-1}^{SL}\right)$$

where

The UE determines the set of resource blocks assigned to a sidelink resource pool as follows:

The resource block pool consists of $N_{PRB}$ PRBs.

8.1 UE Procedure for Transmitting the Physical Sidelink Shared Channel

Each PSSCH transmission is associated with an PSCCH transmission.

That PSCCH transmission carries the $1^{st}$ stage of the SCI associated with the PSSCH transmission; the $2^{nd}$ stage of the associated SCI is carried within the resource of the PSSCH.

If the UE transmits SCI format 1-A on PSCCH according to a PSCCH resource configuration in slot n and PSCCH resource m, then for the associated PSSCH transmission in the same slot one transport block is transmitted with up to two layers;

8.1.2 Resource Allocation

In sidelink resource allocation mode 1:

for PSSCH and PSCCH transmission, dynamic grant, configured grant type 1 and configured grant type 2 are supported. The configured grant Type 2 sidelink transmission is semi-persistently scheduled by a SL grant in a valid activation DCI according to Clause 10.2A of [6, TS 38.213].

8.1.2.1 Resource Allocation in Time Domain

The UE shall transmit the PSSCH in the same slot as the associated PSCCH.

The minimum resource allocation unit in the time domain is a slot.

In sidelink resource allocation mode 1:

For sidelink dynamic grant, the PSSCH transmission is scheduled by a DCI format 3_0.

8.1.2.2 Resource Allocation in Frequency Domain

The resource allocation unit in the frequency domain is the sub-channel.

The sub-channel assignment for sidelink transmission is determined using the “Frequency resource assignment” field in the associated SCI.

The lowest sub-channel for sidelink transmission is the sub-channel on which the lowest PRB of the associated PSCCH is transmitted.

8.1.4 UE Procedure for Determining the Subset of Resources to be Reported to Higher Layers in PSSCH Resource Selection in Sidelink Resource Allocation Mode 2

In resource allocation mode 2, the higher layer can request the UE to determine a subset of resources from which the higher layer will select resources for PSSCH/PSCCH transmission. To trigger this procedure, in slot n, the higher layer provides the following parameters for this PSSCH/PSCCH transmission:

8.1.5 UE Procedure for Determining Slots and Resource Blocks for PSSCH Transmission Associated with an SCI Format 1-A The set of slots and resource blocks for PSSCH transmission is determined by the resource used for the PSCCH transmission containing the associated SCI format 1-A, and fields ‘Frequency resource assignment’, ‘Time resource assignment’ of the associated SCI format 1-A as described below.

8.1.5A UE Procedure for Determining Slots and Resource Blocks Indicated by a Preferred or Non-Preferred Resource Set The set of slots and resource blocks indicated by a set of preferred or non-preferred resource(s) is determined as described below.

When the set is a preferred resource set, if the transmission of the set was triggered by an explicit request, the resource reservation interval $P_{rsvp,m}$ is omitted.

8.2 UE Procedure for Transmitting Sidelink Reference Signals 8.2.1 CSI-RS Transmission Procedure A UE transmits sidelink CSI-RS within a unicast PSSCH transmission if the following conditions hold:

CSI reporting is enabled by higher layer parameter sl-CSI-Acquisition; and the 'CSI request' field in the corresponding SCI format 2-A is set to 1.

8.3 UE Procedure for Receiving the Physical Sidelink Shared Channel

For sidelink resource allocation mode 1, a UE upon detection of SCI format 1-A on PSCCH can decode PSSCH according to the detected SCI formats 2-A and 2-B, and associated PSSCH resource configuration configured by higher layers. The UE is not required to decode more than one PSCCH at each PSCCH resource candidate.

8.5 UE Procedure for Reporting Channel State Information (CSI)

8.5.1 Channel State Information Framework

CSI consists of Channel Quality Indicator (CQI) and Rank Indicator (RI). The CQI and RI are always reported together.

8.5.1.1 Reporting Configurations

The UE shall calculate CSI parameters (if reported) assuming the following dependencies between CSI parameters (if reported)

CQI shall be calculated conditioned on the reported RI

The CSI reporting can be aperiodic (using [10, TS 38.321]). Table 8.5.1.1-1 shows the supported combinations of CSI reporting configurations and CSI-RS configurations and how the CSI reporting is triggered for CSI-RS configuration. Aperiodic CSI-RS is configured and triggered/activated as described in Clause 8.5.1.2.

TABLE 8.5.1.1-1

Triggering/Activation of CSI reporting for the possible CSI-RS Configurations.

| CSI-RS Configuration | Aperiodic CSI Reporting |
|---|---|
| Aperiodic CSI-RS | Triggered by SCI. |

For CSI reporting, wideband CQI reporting is supported. A wideband CQI is reported for a single codeword for the entire CSI reporting band.

8.5.1.2 Triggering of Sidelink CSI Reports

The CSI-triggering UE is not allowed to trigger another aperiodic CSI report for the same UE before the last slot of the expected reception or completion of the ongoing aperiodic CSI report associated with the SCI format 2-A with the 'CSI request' field set to 1, where the last slot of the expected reception of the ongoing aperiodic CSI report is given by [10, TS38.321].

An aperiodic CSI report is triggered by an SCI format 2-A with the 'CSI request' field set to 1.

A UE is not expected to transmit a sidelink CSI-RS and a sidelink PT-RS which overlap.

8.5.2 Channel State Information 8.5.2.1 CSI Reporting Quantities 8.5.2.1.1 Channel Quality Indicator (CQ)

The UE shall derive CQI as specified in clause 5.2.2.1, with the following changes PDSCH replaced by PSSCH uplink slot replaced by sidelink slot downlink physical resource blocks replaced by sidelink physical resource blocks Transport Block Size determination according to Clause 8.1.3.2

CSI reference resource according to the Clause 8.5.2.3 interference measurements are not supported sub-band CQI is not supported 8.5.2.2 Reference Signal (CSI-RS)

The UE can be configured with one CSI-RS pattern as indicated by the higher layer parameters sl-CSI-RS-FreqAllocation, sl-CSI-RS-FirstSymbol in SL-CSI-RS-Config.

Parameters for which the UE shall assume non-zero transmission power for CSI-RS are configured according to clause 8.2.1.

A UE is not expected to be configured such that a CSI-RS and the corresponding PSCCH can be mapped to the same resource element. A UE is not expected to receive sidelink CSI-RS and PSSCH DM-RS, nor CSI-RS and 2nd-stage SCI, on the same symbol.

Sidelink CSI-RS shall be transmitted according to [4, TS 38.211] in the resource blocks used for the PSSCH associated with the SCI format 2-A triggering a report.

8.5.2.3 CSI Reference Resource Definition

The CSI reference resource in sidelink is defined as follows:

In the frequency domain, the CSI reference resource is defined by the group of sidelink physical resource blocks containing the sidelink CSI-RS to which the derived CSI relates.

In the time domain, the CSI reference resource for a CSI reporting in sidelink slot n is defined by a single sidelink slot $n_{CSI\_ref}$ where $n_{CSI\_ref}$ is the same sidelink slot as the corresponding CSI request.

8.5.3 CSI Reporting

The UE can be configured with one CSI reporting latency bound as indicated by the higher layer parameter sl-LatencyBoundCSI-Report. CSI reporting is aperiodic and is described in [10, TS 38.321].

3GPP TS 38.213 V17.0.0 discusses sidelink control/feedback channel-related procedure in NR. One or more parts of 3GPP TS 38.213 V17.0.0 are quoted below:

16 UE Procedures for Sidelink

A UE is provided by SL-BWP-Config a BWP for SL transmissions (SL BWP) with numerology and resource grid determined as described in [4, TS 38.211]. For a resource pool within the SL BWP, the UE is provided by sl-NumSubchannel a number of sub-channels where each sub-channel includes a number of contiguous RBs provided by sl-SubchannelSize. The first RB of the first sub-channel in the SL BWP is indicated by sl-StartRB-Subchannel. Available slots for a resource pool are provided by sl-TimeResource and occur with a periodicity of 10240 ms. For an available slot without S-SS/PSBCH blocks, SL transmissions can start from a first symbol indicated by sl-StartSymbol and be within a number of consecutive symbols indicated by sl-LengthSymbols. For an available slot with S-SS/PSBCH blocks, the first symbol and the number of consecutive symbols is predetermined.

The UE expects to use a same numerology in the SL BWP and in an active UL BWP in a same carrier of a same cell. If the active UL BWP numerology is different than the SL BWP numerology, the SL BWP is deactivated.

A priority of a PSSCH according to NR radio access or according to E-UTRA radio access is indicated by a priority field in a respective scheduling SCI format.

16.3 UE Procedure for Reporting and Obtaining Control Information in PSFCH

Control information provided by a PSFCH transmission includes HARQ-ACK information or conflict information.

16.3.0 UE Procedure for Transmitting PSFCH with Control Information

A UE can be indicated by an SCI format scheduling a PSSCH reception to transmit a PSFCH with HARQ-ACK information in response to the PSSCH reception. The UE provides HARQ-ACK information that includes ACK or NACK, or only NACK.

A UE can be provided, by sl-PSFCH-Period, a number of slots in a resource pool for a period of PSFCH transmission occasion resources. If the number is zero, PSFCH transmissions from the UE in the resource pool are disabled.

16.3.1 UE Procedure for Receiving PSFCH with Control Information

A UE that transmitted a PSSCH scheduled by a SCI format 2-A or a SCI format 2-B that indicates HARQ feedback enabled, attempts to receive associated PSFCHs with HARQ-ACK information according to PSFCH resources determined as described in clause 16.3.0. The UE determines an ACK or a NACK value for HARQ-ACK information provided in each PSFCH resource as described in [8-4, TS 38.101-4]. The UE does not determine both an ACK value and a NACK value at a same time for a PSFCH resource.

For each PSFCH reception occasion, from a number of PSFCH reception occasions, the UE generates HARQ-ACK information to report to higher layers. For generating the HARQ-ACK information, the UE can be indicated by a SCI format to perform one of the following 16.4 UE Procedure for Transmitting PSCCH A UE can be provided a number of symbols in a resource pool, by sl-TimeResourcePSCCH, starting from a second symbol that is available for SL transmissions in a slot, and a number of PRBs in the resource pool, by sl-FreqResourcePSCCH, starting from the lowest PRB of the lowest sub-channel of the associated PSSCH, for a PSCCH transmission with a SCI format 1-A.

. . . A UE that transmits a PSCCH with SCI format 1-A using sidelink resource allocation mode 1 [6, TS 38.214] sets 16.5 UE Procedure for Reporting HARQ-ACK on Uplink A UE can be provided PUCCH resources or PUSCH resources [12, TS 38.331] to report HARQ-ACK information that the UE generates based on HARQ-ACK information that the UE obtains from PSFCH receptions, or from absence of PSFCH receptions. The UE reports HARQ-ACK information on the primary cell of the PUCCH group, as described in clause 9, of the cell where the UE monitors PDCCH for detection of DCI format 3_0.

For PSSCH transmissions scheduled by a DCI format 3_0, a UE generates HARQ-ACK information in response to PSFCH receptions to multiplex in a PUCCH transmission occasion that is after a last time resource in a set of time resources provided by the DCI format 3_0.

From a number of PSFCH reception occasions, the UE generates HARQ-ACK information to report in a PUCCH or PUSCH transmission. The UE can be indicated by a SCI format to perform one of the following and the UE constructs a HARQ-ACK codeword with HARQ-ACK information, when applicable 3GPP TS 38.212 V17.0.0 discusses sidelink control information and downlink control information (DCI) as SL grant in NR. One or more parts of 3GPP TS 38.212 V17.0.0 are quoted below:

7.3 Downlink Control Information

A DCI transports downlink control information for one or more cells with one RNTI.

7.3.1.4 DCI Formats for Scheduling of Sidelink 7.3.1.4.1 Format 3_0

DCI format 3_0 is used for scheduling of NR PSCCH and NR PSSCH in one cell.

The following information is transmitted by means of the DCI format 3_0 with CRC scrambled by SL-RNTI or SL-CS-RNTI:

- Resource pool index—$\lceil \log_2 I \rceil$ bits, where I is the number of resource pools for transmission configured by the higher layer parameter sl-TxPoolScheduling.
- Time gap—3 bits determined by higher layer parameter sl-DCI-ToSL-Trans, as defined in clause 8.1.2.1 of [6, TS 38.214]
- HARQ process number—4 bits.
- New data indicator—1 bit.
- Lowest index of the subchannel allocation to the initial transmission—

$$-\lceil \log_2(N_{subChannel}^{SL}) \rceil$$

bits as defined in clause 8.1.2.2 of [6, TS 38.214]

- SCI format 1-A fields according to clause 8.3.1.1:
  - Frequency resource assignment.
  - Time resource assignment.
- PSFCH-to-HARQ feedback timing indicator—$\lceil \log_2 N_{fb\_timing} \rceil$ bits, where $N_{fb\_timing}$ is the number of entries in the higher layer parameter sl-PSFCH-ToPUCCH, as defined in clause 16.5 of [5, TS 38.213]
- PUCCH resource indicator—3 bits as defined in clause 16.5 of [5, TS 38.213].
- Configuration index—0 bit if the UE is not configured to monitor DCI format 3_0 with CRC scrambled by SL-CS-RNTI; otherwise 3 bits as defined in clause 8.1.2 of [6, TS 38.214]. If the UE is configured to monitor DCI format 3_0 with CRC scrambled by SL-CS-RNTI, this field is reserved for DCI format 3_0 with CRC scrambled by SL-RNTI.
- Counter sidelink assignment index—2 bits
  - 2 bits as defined in clause 16.5.2 of [5, TS 38.213] if the UE is configured with pdsch-HARQ-ACK-Codebook=dynamic
  - 2 bits as defined in clause 16.5.1 of [5, TS 38.213] if the UE is configured with pdsch-HARQ-ACK-Codebook=semi-static
- Padding bits, if required 8.3 Sidelink Control Information on PSCCH SCI carried on PSCCH is a $1^{st}$-stage SCI, which transports sidelink scheduling information.

8.3.1 $1^{st}$-Stage SCI Formats 8.3.1.1 SCI Format 1-A

SCI format 1-A is used for the scheduling of PSSCH and $2^{nd}$-stage-SCI on PSSCH The following information is transmitted by means of the SCI format 1-A:

- Priority—3 bits as specified in clause 5.4.3.3 of [12, TS 23.287] and clause 5.22.1.3.1 of [8, TS 38.321]. Value '000' of Priority field corresponds to priority value '1', value '001' of Priority field corresponds to priority value '2', and so on.
- Frequency resource assignment—

$$\left\lceil \log_2\left(\frac{N_{subChannel}^{SL}\left(N_{subChannel}^{SL}+1\right)}{2}\right)\right\rceil$$

bits when the value of the higher layer parameter sl-MaxNumPerReserve is configured to 2; otherwise $$\left\lceil \log_2\left(\frac{N^{SL}_{subChannel}\left(N^{SL}_{subChannel}+1\right)\left(2N^{SL}_{subChannel}+1\right)}{6}\right)\right\rceil$$

bits when the value of the higher layer parameter sl-MaxNumPerReserve is configured to 3, as defined in clause 8.1.5 of [6, TS 38.214].

Time resource assignment—5 bits when the value of the higher layer parameter sl-MaxNumPerReserve is configured to 2; otherwise 9 bits when the value of the higher layer parameter sl-MaxNumPerReserve is configured to 3, as defined in clause 8.1.5 of [6, TS 38.214].

Resource reservation period—$\lceil \log_2 N_{rsv\_period} \rceil$ bits as defined in clause 16.4 of [5, TS 38.213], where $N_{rsv\_period}$ is the number of entries in the higher layer parameter sl-ResourceReservePeriodList, if higher layer parameter sl-MultiReserveResource is configured; 0 bit otherwise.

DMRS pattern—$\lceil \log_2 N_{pattern} \rceil$ bits as defined in clause 8.4.1.1.2 of [4, TS 38.211], where $N_{pattern}$ is the number of DMRS patterns configured by higher layer parameter sl-PSSCH-DMRS-TimePatternList.

$2^{nd}$-stage SCI format—2 bits as defined in Table 8.3.1.1-1.

Beta_offset indicator—2 bits as provided by higher layer parameter sl-BetaOffsets2ndSCI and Table 8.3.1.1-2.

Number of DMRS port—1 bit as defined in Table 8.3.1.1-3.

Modulation and coding scheme—5 bits as defined in clause 8.1.3 of [6, TS 38.214].

Additional MCS table indicator—as defined in clause 8.1.3.1 of [6, TS 38.214]: 1 bit if one MCS table is configured by higher layer parameter sl-Additional-MCS-Table; 2 bits if two MCS tables are configured by higher layer parameter sl-Additional-MCS-Table; 0 bit otherwise.

PSFCH overhead indication—1 bit as defined clause 8.1.3.2 of [6, TS 38.214] if higher layer parameter sl-PSFCH-Period=2 or 4; 0 bit otherwise.

Reserved—a number of bits as determined by higher layer parameter sl-NumReservedBits, with value set to zero.

TABLE 8.3.1.1-1

| $2^{nd}$-stage SCI formats | |
|---|---|
| Value of 2nd-stage SCI format field | 2nd-stage SCI format |
| 00 | SCI format 2-A |
| 01 | SCI format 2-B |
| 10 | SCI format 2-C |
| 11 | Reserved |

8.4 Sidelink Control Information on PSSCH

SCI carried on PSSCH is a $2^{nd}$-stage SCI, which transports sidelink scheduling information.

. . . 8.4.1.1 SCI Format 2-A

SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:

HARQ process number—4 bits.

New data indicator—1 bit.

Redundancy version—2 bits as defined in Table 7.3.1.1.1-2.

Source ID—8 bits as defined in clause 8.1 of [6, TS 38.214].

Destination ID—16 bits as defined in clause 8.1 of [6, TS 38.214].

HARQ feedback enabled/disabled indicator—1 bit as defined in clause 16.3 of [5, TS 38.213].

Cast type indicator—2 bits as defined in Table 8.4.1.1-1 and in clause 8.1 of [6, TS 38.214].

CSI request—1 bit as defined in clause 8.2.1 of [6, TS 38.214] and in clause 8.1 of [6, TS 38.214].

TABLE 8.4.1.1-1

| Cast type indicator | |
|---|---|
| Value of Cast type indicator | Cast type |
| 00 | Broadcast |
| 01 | Groupcast when HARQ-ACK information includes ACK or NACK |
| 10 | Unicast |
| 11 | Groupcast when HARQ-ACK information includes only NACK |

8.4.1.2 SCI Format 2-B

SCI format 2-B is used for the decoding of PSSCH, with HARQ operation when HARQ-ACK information includes only NACK, or when there is no feedback of HARQ-ACK information.

8.4.5 Multiplexing of Coded $2^{nd}$-Stage SCI Bits to PSSCH

The coded $2^{nd}$-stage SCI bits are multiplexed onto PSSCH according to the procedures in Clause 8.2.1.

3GPP TS 38.321 V16.7.0 discusses sidelink procedures in Medium Access Control (MAC) layer in NR. One or more parts of 3GPP TS 38.321 V16.7.0 are quoted below:

5.4.4 Scheduling Request

The Scheduling Request (SR) is used for requesting UL-SCH resources for new transmission. The MAC entity may be configured with zero, one, or more SR configurations. An SR configuration consists of a set of PUCCH resources for SR across different BWPs and cells. For a logical channel or for SCell beam failure recovery (see clause 5.17) and for consistent LBT failure recovery (see clause 5.21), at most one PUCCH resource for SR is configured per BWP.

Each SR configuration corresponds to one or more logical channels and/or to SCell beam failure recovery and/or to consistent LBT failure recovery. Each logical channel, SCell beam failure recovery, and consistent LBT failure recovery, may be mapped to zero or one SR configuration, which is configured by RRC. The SR configuration of the logical channel that triggered a BSR (clause 5.4.5) or the SCell beam failure recovery or the consistent LBT failure recovery (clause 5.21) (if such a configuration exists) is considered as corresponding SR configuration for the triggered SR. Any SR configuration may be used for an SR triggered by Pre-emptive BSR (clause 5.4.7).

RRC configures the following parameters for the scheduling request procedure:

sr-ProhibitTimer (per SR configuration);

sr-TransMax (per SR configuration).

The following UE variables are used for the scheduling request procedure:

SR_COUNTER (per SR configuration).

If an SR is triggered and there are no other SRs pending corresponding to the same SR configuration, the MAC entity shall set the SR_COUNTER of the corresponding SR configuration to 0.

When an SR is triggered, it shall be considered as pending until it is cancelled.

All pending SR(s) for BSR triggered according to the BSR procedure (clause 5.4.5) prior to the MAC PDU assembly shall be cancelled and each respective sr-ProhibitTimer shall be stopped when the MAC PDU is transmitted and this PDU includes a Long or Short BSR MAC CE which contains buffer status up to (and including) the last event that triggered a BSR (see clause 5.4.5) prior to the MAC PDU assembly. All pending SR(s) for BSR triggered according to the BSR procedure (clause 5.4.5) shall be cancelled and each respective sr-ProhibitTimer shall be stopped when the UL grant(s) can accommodate all pending data available for transmission.

The MAC entity shall for each pending SR not triggered according to the BSR procedure (clause 5.4.5) for a Serving Cell:

1> if this SR was triggered by Pre-emptive BSR procedure (see clause 5.4.7) prior to the MAC PDU assembly and a MAC PDU containing the relevant Pre-emptive BSR MAC CE is transmitted; or 1> if this SR was triggered by beam failure recovery (see clause 5.17) of an SCell and a MAC PDU is transmitted and this PDU includes a BFR MAC CE or a Truncated BFR MAC CE which contains beam failure recovery information for this SCell; or 1> if this SR was triggered by beam failure recovery (see clause 5.17) of an SCell and this SCell is deactivated (see clause 5.9); or 1> if this SR was triggered by consistent LBT failure recovery (see clause 5.21) of an SCell and a MAC PDU is transmitted and the MAC PDU includes an LBT failure MAC CE that indicates consistent LBT failure for this SCell; or 1> if this SR was triggered by consistent LBT failure recovery (see clause 5.21) of an SCell and all the triggered consistent LBT failure(s) for this SCell are cancelled:

2> cancel the pending SR and stop the corresponding sr-ProhibitTimer, if running.

Only PUCCH resources on a BWP which is active at the time of SR transmission occasion are considered valid.

As long as at least one SR is pending, the MAC entity shall for each pending SR:

1> if the MAC entity has no valid PUCCH resource configured for the pending SR:

2> initiate a Random Access procedure (see clause 5.1) on the SpCell and cancel the pending SR.

1> else, for the SR configuration corresponding to the pending SR:

2> when the MAC entity has an SR transmission occasion on the valid PUCCH resource for SR configured; and 2> if sr-ProhibitTimer is not running at the time of the SR transmission occasion; and 2> if the PUCCH resource for the SR transmission occasion does not overlap with a measurement gap:

3> if the PUCCH resource for the SR transmission occasion overlaps with neither a UL-SCH resource nor an SL-SCH resource; or 3> if the MAC entity is able to perform this SR transmission simultaneously with the transmission of the SL-SCH resource; or 3> if the MAC entity is configured with lch-basedPrioritization, and the PUCCH resource for the SR transmission occasion does not overlap with the PUSCH duration of an uplink grant received in a Random Access Response or with the PUSCH duration of an uplink grant addressed to Temporary C-RNTI or with the PUSCH duration of a MSGA payload, and the PUCCH resource for the SR transmission occasion for the pending SR triggered as specified in clause 5.4.5 overlaps with any other UL-SCH resource(s), and the physical layer can signal the SR on one valid PUCCH resource for SR, and the priority of the logical channel that triggered SR is higher than the priority of the uplink grant(s) for any UL-SCH resource(s) where the uplink grant was not already de-prioritized, and the priority of the uplink grant is determined as specified in clause 5.4.1; or 3> if both sl-PrioritizationThres and ul-PrioritizationThres are configured and the PUCCH resource for the SR transmission occasion for the pending SR triggered as specified in clause 5.22.1.5 overlaps with any UL-SCH resource(s) carrying a MAC PDU, and the value of the priority of the triggered SR determined as specified in clause 5.22.1.5 is lower than sl-PrioritizationThres and the value of the highest priority of the logical channel(s) in the MAC PDU is higher than or equal to ul-PrioritizationThres and any MAC CE prioritized as described in clause 5.4.3.1.3 is not included in the MAC PDU and the MAC PDU is not prioritized by upper layer according to TS 23.287 [19]; or 3> if a SL-SCH resource overlaps with the PUCCH resource for the SR transmission occasion for the pending SR triggered as specified in clause 5.4.5, and the MAC entity is not able to perform this SR transmission simultaneously with the transmission of the SL-SCH resource, and either transmission on the SL-SCH resource is not prioritized as described in clause 5.22.1.3.1a or the priority value of the logical channel that triggered SR is lower than ul-PrioritizationThres, if configured; or 3> if a SL-SCH resource overlaps with the PUCCH resource for the SR transmission occasion for the pending SR triggered as specified in clause 5.22.1.5, and the MAC entity is not able to perform this SR transmission simultaneously with the transmission of the SL-SCH resource, and the priority of the triggered SR determined as specified in clause 5.22.1.5 is higher than the priority of the MAC PDU determined as specified in clause 5.22.1.3.1a for the SL-SCH resource:

4> consider the SR transmission as a prioritized SR transmission.

4> consider the other overlapping uplink grant(s), if any, as a de-prioritized uplink grant(s);

4> if the de-prioritized uplink grant(s) is a configured uplink grant configured with autonomousTx whose PUSCH has already started:

5> stop the configuredGrantTimer for the corresponding HARQ process of the de-prioritized uplink grant(s).

4> if SR_COUNTER<sr-TransMax:

5> instruct the physical layer to signal the SR on one valid PUCCH resource for SR;

5> if LBT failure indication is not received from lower layers:

6> increment SR_COUNTER by 1;

6> start the sr-ProhibitTimer.

5> else if lbt-FailureRecoveryConfig is not configured:

6> increment SR_COUNTER by 1.

4> else:

5> notify RRC to release PUCCH for all Serving Cells;

5> notify RRC to release SRS for all Serving Cells;

5> clear any configured downlink assignments and uplink grants;

5> clear any PUSCH resources for semi-persistent CSI reporting;

5> initiate a Random Access procedure (see clause 5.1) on the SpCell and cancel all pending SRs.

3> else:

4> consider the SR transmission as a de-prioritized SR transmission.

. . . 5.22 SL-SCH Data transfer 5.22.1 SL-SCH Data Transmission 5.22.1.1 SL Grant Reception and SCI Transmission Sidelink grant is received dynamically on the PDCCH, configured semi-persistently by RRC or autonomously selected by the MAC entity. The MAC entity shall have a sidelink grant on an active SL BWP to determine a set of PSCCH duration(s) in which transmission of SCI occurs and a set of PSSCH duration(s) in which transmission of SL-SCH associated with the SCI occurs. A sidelink grant addressed to SLCS-RNTI with NDI=1 is considered as a dynamic sidelink grant.

If the MAC entity has been configured with Sidelink resource allocation mode 1 as indicated in TS 38.331 [5], the MAC entity shall for each PDCCH occasion and for each grant received for this PDCCH occasion:

1> if a sidelink grant has been received on the PDCCH for the MAC entity's SL-RNTI:

2> if the NDI received on the PDCCH has not been toggled compared to the value in the previously received HARQ information for the HARQ Process ID:

3> use the received sidelink grant to determine PSCCH duration(s) and PSSCH duration(s) for one or more retransmissions of a single MAC PDU for the corresponding Sidelink process according to clause 8.1.2 of TS 38.214 [7].

2> else:

3> use the received sidelink grant to determine PSCCH duration(s) and PSSCH duration(s) for initial transmission and, if available, retransmission(s) of a single MAC PDU according to clause 8.1.2 of TS 38.214 [7].

2> if a sidelink grant is available for retransmission(s) of a MAC PDU which has been positively acknowledged as specified in clause 5.22.1.3.1a:

3> clear the PSCCH duration(s) and PSSCH duration(s) corresponding to retransmission(s) of the MAC PDU from the sidelink grant.

The MAC entity shall for each PSSCH duration:

1> for each sidelink grant occurring in this PSSCH duration:

2> select a MCS table allowed in the pool of resource which is associated with the sidelink grant;

2> if the MAC entity has been configured with Sidelink resource allocation mode 1:

3> select a MCS which is, if configured, within the range that is configured by RRC between sl-MinMCS-PSSCH and sl-MaxMCS-PSSCH associated with the selected MCS table included in sl-ConfigDedicatedNR;

3> set the resource reservation interval to Oms.

2> else:

2> if the configured sidelink grant has been activated and this PSSCH duration corresponds to the first PSSCH transmission opportunity within this sl-PeriodCG of the configured sidelink grant:

3> set the HARQ Process ID to the HARQ Process ID associated with this PSSCH duration and, if available, all subsequent PSSCH duration(s) occuring in this sl-PeriodCG for the configured sidelink grant;

3> determine that this PSSCH duration is used for initial transmission;

3> flush the HARQ buffer of Sidelink process associated with the HARQ Process ID.

2> deliver the sidelink grant, the selected MCS, and the associated HARQ information to the Sidelink HARQ Entity for this PSSCH duration.

5.22.1.3 Sidelink HARQ Operation 5.22.1.3.1 Sidelink HARQ Entity

The MAC entity includes at most one Sidelink HARQ entity for transmission on SL-SCH, which maintains a number of parallel Sidelink processes.

The maximum number of transmitting Sidelink processes associated with the Sidelink HARQ Entity is 16. A sidelink process may be configured for transmissions of multiple MAC PDUs. For transmissions of multiple MAC PDUs with Sidelink resource allocation mode 2, the maximum number of transmitting Sidelink processes associated with the Sidelink HARQ Entity is 4.

A delivered sidelink grant and its associated Sidelink transmission information are associated with a Sidelink process. Each Sidelink process supports one TB.

For each sidelink grant, the Sidelink HARQ Entity shall:

1> if the MAC entity determines that the sidelink grant is used for initial transmission as specified in clause 5.22.1.1; or 2> (re-)associate a Sidelink process to this grant, and for the associated Sidelink process:

NOTE 1A: The Sidelink HARQ Entity will associate the selected sidelink grant to the Sidelink process determined by the MAC entity.

3> obtain the MAC PDU to transmit from the Multiplexing and assembly entity, if any;

3> if a MAC PDU to transmit has been obtained:

4> if a HARQ Process ID has been set for the sidelink grant:

5> (re-)associate the HARQ Process ID corresponding to the sidelink grant to the Sidelink process;

NOTE 1a: There is one-to-one mapping between a HARQ Process ID and a Sidelink process in the MAC entity configured with Sidelink resource allocation mode 1.

4> determines Sidelink transmission information of the TB for the source and destination pair of the MAC PDU as follows:

5> set the Source Layer-1 ID to the 8 LSB of the Source Layer-2 ID of the MAC PDU;

5> set the Destination Layer-1 ID to the 16 LSB of the Destination Layer-2 ID of the MAC PDU;

5> (re-)associate the Sidelink process to a Sidelink process ID;

5> consider the NDI to have been toggled compared to the value of the previous transmission corresponding to the Sidelink identification information and the Sidelink process ID of the MAC PDU and set the NDI to the toggled value;

5> set the cast type indicator to one of broadcast, groupcast and unicast as indicated by upper layers;

5> if HARQ feedback has been enabled for the MAC PDU according to clause 5.22.1.4.2;

6> set the HARQ feedback enabled/disabled indicator to enabled.

5> else:

6> set the HARQ feedback enabled/disabled indicator to disabled.

5> set the priority to the value of the highest priority of the logical channel(s), if any, and a MAC CE, if included, in the MAC PDU;

4> deliver the MAC PDU, the sidelink grant and the Sidelink transmission information of the TB to the associated Sidelink process;

4> instruct the associated Sidelink process to trigger a new transmission.

3> else:

4> flush the HARQ buffer of the associated Sidelink process.

1> else (i.e. retransmission):

2> if the HARQ Process ID corresponding to the sidelink grant received on PDCCH, the configured sidelink grant or the selected sidelink grant is associated to a Sidelink process of which HARQ buffer is empty; or 2> if the HARQ Process ID corresponding to the sidelink grant received on PDCCH is not associated to any Sidelink process:

3> ignore the sidelink grant.

2> else:

3> identify the Sidelink process associated with this grant, and for the associated Sidelink process:

4> deliver the sidelink grant of the MAC PDU to the associated Sidelink process;

4> instruct the associated Sidelink process to trigger a retransmission.

5.22.1.3.1a Sidelink Process

The Sidelink process is associated with a HARQ buffer.

New transmissions and retransmissions are performed on the resource indicated in the sidelink grant as specified in clause 5.22.1.1 and with the MCS selected as specified in clause 8.1.3.1 of TS 38.214 [7] and clause 5.22.1.1.

. . . Priority of a MAC PDU is determined by the highest priority of the logical channel(s) or a MAC CE in the MAC PDU.

If the Sidelink HARQ Entity requests a new transmission, the Sidelink process shall:

1> store the MAC PDU in the associated HARQ buffer;

1> store the sidelink grant received from the Sidelink HARQ Entity;

1> generate a transmission as described below.

If the Sidelink HARQ Entity requests a retransmission, the Sidelink process shall:

1> store the sidelink grant received from the Sidelink HARQ Entity;

1> generate a transmission as described below.

To generate a transmission, the Sidelink process shall:

1> if there is no uplink transmission; or

1> if the MAC entity is able to simultaneously perform uplink transmission(s) and sidelink transmission at the time of the transmission; or 1> if the other MAC entity and the MAC entity are able to simultaneously perform uplink transmission(s) and sidelink transmission at the time of the transmission respectively; or 1> if there is a MAC PDU to be transmitted for this duration in uplink, except a MAC PDU obtained from the Msg3 buffer, the MSGA buffer, or prioritized as specified in clause 5.4.2.2, and the sidelink transmission is prioritized over uplink transmission:

2> instruct the physical layer to transmit SCI according to the stored sidelink grant with the associated Sidelink transmission information;

2> instruct the physical layer to generate a transmission according to the stored sidelink grant;

2> if HARQ feedback has been enabled the MAC PDU according to clause 5.22.1.4.2:

3> instruct the physical layer to monitor PSFCH for the transmission and perform PSFCH reception as specified in clause 5.22.1.3.2.

2> if sl-PUCCH-Config is configured by RRC for the stored sidelink grant:

3> determine transmission of an acknowledgement on the PUCCH as specified in clause 5.22.1.3.2.

5.22.1.4 Multiplexing and Assembly

For PDU(s) associated with one SCI, MAC shall consider only logical channels with the same Source Layer-2 ID-Destination Layer-2 ID pair for one of unicast, groupcast and broadcast which is associated with the pair. Multiple transmissions for different Sidelink processes are allowed to be independently performed in different PSSCH durations.

5.22.1.4.1 Logical Channel Prioritization 5.22.1.4.1.1 General

The sidelink Logical Channel Prioritization procedure is applied whenever a new transmission is performed.

RRC controls the scheduling of sidelink data by signalling for each logical channel:

sl-Priority where an increasing priority value indicates a lower priority level;

sl-PrioritisedBitRate which sets the sidelink Prioritized Bit Rate (sPBR);

sl-BucketSizeDuration which sets the sidelink Bucket Size Duration (sBSD).

5.22.1.4.1.2 Selection of Logical Channels

The MAC entity shall for each SCI corresponding to a new transmission:

1> select a Destination associated to one of unicast, groupcast and broadcast, having at least one of the MAC CE and the logical channel with the highest priority, among the logical channels that satisfy all the following conditions and MAC CE(s), if any, for the SL grant associated to the SCI:

2> SL data is available for transmission; and

2> SBj>0, in case there is any logical channel having SBj>0; and

2> sl-configuredGrantType1Allowed, if configured, is set to true in case the SL grant is a Configured Grant Type 1; and 2> sl-AllowedCG-List, if configured, includes the configured grant index associated to the SL grant; and 2> sl-HARQ-FeedbackEnabled is set to disabled, if PSFCH is not configured for the SL grant associated to the SCI.

. . . 5.22.1.4.1.3 Allocation of Sidelink Resources

. . . The MAC entity shall not generate a MAC PDU for the HARQ entity if the following conditions are satisfied:

there is no Sidelink CSI Reporting MAC CE generated for this PSSCH transmission as specified in clause 5.22.1.7; and the MAC PDU includes zero MAC SDUs.

Logical channels shall be prioritised in accordance with the following order (highest priority listed first):

data from SCCH;

Sidelink CSI Reporting MAC CE;

data from any STCH.

5.22.1.4.2 Multiplexing of MAC Control Elements and MAC SDUs

The MAC entity shall multiplex a MAC CE and MAC SDUs in a MAC PDU according to clauses 5.22.1.4.1 and 6.1.6.

5.22.1.5 Scheduling Request

In addition to clause 5.4.4, the Scheduling Request (SR) is also used for requesting SL-SCH resources for new transmission when triggered by the Sidelink BSR (clause 5.22.1.6) or the SL-CSI reporting (clause 5.22.1.7). If configured, the MAC entity performs the SR procedure as specified in this clause unless otherwise specified in clause 5.4.4. For a sidelink logical channel or for SL-CSI reporting, at most one PUCCH resource for SR is configured per UL BWP.

The SR configuration of the logical channel that triggered the Sidelink BSR (clause 5.22.1.6) (if such a configuration exists) is also considered as corresponding SR configuration for the triggered SR (clause 5.4.4). The value of the priority of the triggered SR corresponds to the value of priority of the logical channel that triggered the SR.

Each sidelink logical channel may be mapped to zero or one SR configuration, which is configured by RRC. If the SL-CSI reporting procedure is enabled by RRC, the SL-CSI reporting is mapped to one SR configuration for all PC5-RRC connections. The SR configuration of the SL-CSI reporting triggered according to 5.22.1.7 is considered as corresponding SR configuration for the triggered SR (clause 5.4.4). The value of the priority of the triggered SR corresponds to the value of the priority of the Sidelink CSI Reporting MAC CE.

All pending SR(s) triggered according to the Sidelink BSR procedure (clause 5.22.1.6) prior to the MAC PDU assembly shall be cancelled and each respective sr-ProhibitTimer shall be stopped when the MAC PDU is transmitted and this PDU includes a SL-BSR MAC CE which contains buffer status up to (and including) the last event that triggered a Sidelink BSR (see clause 5.22.1.4) prior to the MAC PDU assembly.

All pending SR(s) triggered according to the Sidelink BSR procedure (clause 5.22.1.6) shall be cancelled and each respective sr-ProhibitTimer shall be stopped when the SL grant(s) can accommodate all pending data available for transmission in sidelink.

The pending SR triggered according to the SL-CSI reporting for a destination shall be cancelled and each respective sr-ProhibitTimer shall be stopped when the SL grant(s) can accommodate the Sidelink CSI Reporting MAC CE when the SL-CSI reporting that has been triggered but not cancelled or when the triggered SL-CSI reporting is cancelled due to latency non-fulfilment as specified in 5.22.1.7. All pending SR(s) triggered by either Sidelink BSR or Sidelink CSI report shall be cancelled, when RRC configures Sidelink resource allocation mode 2.

5.22.1.6 Buffer Status Reporting

The Sidelink Buffer Status reporting (SL-BSR) procedure is used to provide the serving gNB with information about SL data volume in the MAC entity.

The MAC entity shall:

1> if the sidelink Buffer Status reporting procedure determines that at least one SL-BSR has been triggered and not cancelled:

2> if UL-SCH resources are available for a new transmission and the UL-SCH resources can accommodate the SL-BSR MAC CE plus its subheader as a result of logical channel prioritization according to clause 5.4.3.1:

3> instruct the Multiplexing and Assembly procedure in clause 5.4.3 to generate the SL-BSR MAC CE(s);

3> start or restart sl-periodicBSR-Timer except when all the generated SL-BSRs are Truncated SL-BSRs;

3> start or restart sl-retxBSR-Timer.

2> if a Regular SL-BSR has been triggered and sl-logicalChannelSR-DelayTimer is not running:

3> if there is no UL-SCH resource available for a new transmission; or

3> if UL-SCH resources are available for a new transmission and the UL-SCH resources cannot accommodate the SL-BSR MAC CE plus its subheader as a result of logical channel prioritization according to clause 5.4.3.1; or 3> if the set of Subcarrier Spacing index values in sl-AllowedSCS-List, if configured for the logical channel that triggered the SL-BSR, does not include the Subcarrier Spacing index associated to the UL-SCH resources available for a new transmission; or 3> if sl-MaxPUSCH-Duration, if configured for the logical channel that triggered the SL-BSR, is smaller than the PUSCH transmission duration associated to the UL-SCH resources available for a new transmission:

4> trigger a Scheduling Request.

A MAC PDU shall contain at most one SL-BSR MAC CE, even when multiple events have triggered a SL-BSR. The Regular SL-BSR and the Periodic SL-BSR shall have precedence over the padding SL-BSR.

The MAC entity shall restart sl-retxBSR-Timer upon reception of an SL grant for transmission of new data on any SL-SCH.

All triggered SL-BSRs may be cancelled when the SL grant(s) can accommodate all pending data available for transmission. All BSRs triggered prior to MAC PDU assembly shall be cancelled when a MAC PDU is transmitted and this PDU includes a SL-BSR MAC CE which contains buffer status up to (and including) the last event that triggered a SL-BSR prior to the MAC PDU assembly. All triggered SL-BSRs shall be cancelled, and sl-retx-BSR-Timer and sl-periodic-BSR-Timer shall be stopped, when RRC configures Sidelink resource allocation mode 2.

NOTE 2: MAC PDU assembly can happen at any point in time between uplink grant reception and actual transmission of the corresponding MAC PDU. SL-BSR and SR can be triggered after the assembly of a MAC PDU which contains a SL-BSR MAC CE, but before the transmission of this MAC PDU. In addition, SL-BSR and SR can be triggered during MAC PDU assembly.

5.22.1.7 CSI Reporting

The Sidelink Channel State Information (SL-CSI) reporting procedure is used to provide a peer UE with sidelink channel state information as specified in clause 8.5 of TS 38.214 [7].

RRC configures the following parameters to control the SL-CSI reporting procedure:

sl-LatencyBoundCSI-Report, which is maintained for each PC5-RRC connection.

The MAC entity maintains a sl-CSI-ReportTimer for each pair of the Source Layer-2 ID and the Destination Layer-2 ID corresponding to a PC5-RRC connection. sl-CSI-ReportTimer is used for a SL-CSI reporting UE to follow the latency requirement signalled from a CSI triggering UE. The value of sl-CSI-ReportTimer is the same as the latency requirement of the SL-CSI reporting in sl-LatencyBound-CSI-Report configured by RRC.

The MAC entity shall for each pair of the Source Layer-2 ID and the Destination Layer-2 ID corresponding to a PC5-RRC connection which has been established by upper layers:

1> if the SL-CSI reporting has been triggered by a SCI and not cancelled:

2> if the sl-CSI-ReportTimer for the triggered SL-CSI reporting is not running:

3> start the sl-CSI-ReportTimer.

2> if the sl-CSI-ReportTimer for the triggered SL-CSI reporting expires:

3> cancel the triggered SL-CSI reporting.

2> else if the MAC entity has SL resources allocated for new transmission and the SL-SCH resources can accommodate the SL-CSI reporting MAC CE and its subheader as a result of logical channel prioritization:

3> instruct the Multiplexing and Assembly procedure to generate a Sidelink CSI Reporting MAC CE as defined in clause 6.1.3.35;

3> stop the sl-CSI-ReportTimer for the triggered SL-CSI reporting;

3> cancel the triggered SL-CSI reporting.

2> else if the MAC entity has been configured with Sidelink resource allocation mode 1:

3> trigger a Scheduling Request.

NOTE: The MAC entity configured with Sidelink resource allocation mode 1 may trigger a Scheduling Request if transmission of a pending SL-CSI reporting with the sidelink grant(s) cannot fulfil the latency requirement associated to the SL-CSI reporting.

3GPP TS 38.331 V16.7.0 discusses Radio Resource Control (RRC) configurations associated with sidelink in NR. One or more parts of 3GPP TS 38.331 V16.7.0 are quoted below:

SIB12

SIB12 contains NR sidelink communication configuration.

SIB12 information element

```
SIB12-r16 ::=                SEQUENCE {
   ...
SIB12-IEs-r16 ::=            SEQUENCE {
   sl-ConfigCommonNR-r16          SL-ConfigCommonNR-r16,
   lateNonCriticalExtension       OCTET STRING
OPTIONAL,
   ...
}
SL-ConfigCommonNR-r16 ::=             SEQUENCE {
   sl-FreqInfoList-r16                               SEQUENCE (SIZE
(1..maxNrofFreqSL-r16) ) OF SL-FreqConfigCommon-r16                  OPTIONAL, -
- Need R
   sl-UE-SelectedConfig-r16                          SL-UE-SelectedConfig-r16
OPTIONAL, -- Need R
   sl-NR-AnchorCarrierFreqList-r16                   SL-NR-AnchorCarrierFreqList-
r16                                                       OPTIONAL,        -- Need R
   sl-EUTRA-AnchorCarrierFreqList-r16                SL-EUTRA-
AnchorCarrierFreqList-r16
OPTIONAL, -- Need R
   sl-RadioBearerConfigList-r16                      SEQUENCE (SIZE
(1..maxNrofSLRB-r16) ) OF SL-RadioBearerConfig-r16                   OPTIONAL, -
- Need R
   sl-RLC-BearerConfigList-r16                       SEQUENCE (SIZE (1..maxSL-
LCID-r16)) OF SL-RLC-BearerConfig-r16                          OPTIONAL,      -- Need R
   sl-MeasConfigCommon-r16                           SL-MeasConfigCommon-r16
OPTIONAL, -- Need R
   sl-CSI-Acquisition-r16                            ENUMERATED { enabled }
OPTIONAL, -- Need R
   sl-OffsetDFN-r16                                  INTEGER (1..1000)
OPTIONAL, -- Need R
   t400-r16                                          ENUMERATED {ms100, ms200,
ms300, ms400, ms600, ms1000, ms1500, ms2000} OPTIONAL,                  -- Need R
   ...
}
SL-NR-AnchorCarrierFreqList-r16 ::= SEQUENCE (SIZE (1..maxFreqSL-NR-
r16)) OF ARFCN-ValueNR
SL-EUTRA-AnchorCarrierFreqList-r16 ::= SEQUENCE (SIZE (1..maxFreqSL-
EUTRA-r16) ) OF ARFCN-ValueEUTRA
```

| SIB12 field descriptions |
|---|
| . . . |
| sl-CSI-Acquisition<br>This field indicates whether CSI reporting is enabled in sidelink unicast. If not set, SL CSI reporting is disabled. |
| sl-EUTRA-AnchorCarrierFreqList<br>This field indicates the EUTRA anchor carrier frequency list, which can provide the NR sidelink communication configurations. |
| sl-FreqInfoList<br>This field indicates the NR sidelink communication configuration on some carrier frequency (ies). In this release, only one entry can be configured in the list. |
| sl-NR-AnchorCarrierFreqList<br>This field indicates the NR anchor carrier frequency list, which can provide the NR sidelink communication configurations. |
| [. . .] |

6.3.5 Sidelink Information Elements

SL-BWP-Config

The IE SL-BWP-Config is used to configure the UE specific NR sidelink communication on one particular sidelink bandwidth part.

SL-BWP-Config information element

```
SL-BWP-Config-r16 ::=                     SEQUENCE {
   sl-BWP-Id                                 BWP-Id,
   sl-BWP-Generic-r16                        SL-BWP-Generic-r16
OPTIONAL, -- Need M
   sl-BWP-PoolConfig-r16                     SL-BWP-PoolConfig-r16
OPTIONAL, -- Need M
   ...
}
SL-BWP-Generic-r16 ::=                    SEQUENCE {
   sl-BWP-r16                                BWP
OPTIONAL, -- Need M
   sl-LengthSymbols-r16                      ENUMERATED { sym7, sym8,
sym9, sym10, sym11, sym12, sym13, sym14} OPTIONAL, -- Need M
   sl-Start Symbol-r16                       ENUMERATED { sym0, sym1,
sym2, sym3, sym4, sym5, sym6, sym7}       OPTIONAL, -- Need M
   sl-PSBCH-Config-r16                       SetupRelease { SL-PSBCH-
Config-r16}                               OPTIONAL, -- Need M
   sl-TxDirectCurrent Location-r16           INTEGER (0..3301)
OPTIONAL, -- Need M
   ...
}
```

| SL-BWP-Config field descriptions |
|---|
| sl-BWP-Generic<br>This field indicates the generic parameters on the configured sidelink BWP. |
| sl-BWP-PoolConfig<br>This field indicates the resource pool configurations on the configured sidelink BWP. |

| SL-BWP-Generic field descriptions |
|---|
| sl-LengthSymbols<br>This field indicates the number of symbols used for sidelink in a slot without SL-SSB. A single value can be (pre)configured per sidelink bandwidth part. |
| sl-StartSymbol<br>This field indicates the starting symbol used for sidelink in a slot without SL-SSB. A single value can be (pre)configured per sidelink bandwidth part. |

SL-BWP-ConfigCommon

The IE SL-BWP-ConfigCommon is used to configure the cell-specific configuration information on one particular sidelink bandwidth part.

SL-BWP-ConfigCommon information element

```
SL-BWP-ConfigCommon-r16 :: =          SEQUENCE {
   sl-BWP-Generic-r16                    SL-BWP-Generic-r16
OPTIONAL, -- Need R
   s1-BWP-PoolConfigCommon-r16           SL-BWP-PoolConfigCommon-
r16                                   OPTIONAL, -- Need R
   ...
}
```

| SL-BWP-ConfigCommon field descriptions |
|---|
| sl-BWP-Generic<br>This field indicates the generic parameters on the configured sidelink BWP. |
| sl-BWP-PoolConfigCommon |

-continued

| SL-BWP-ConfigCommon field descriptions |
|---|
| This field indicates the resource pool configurations on the configured sidelink BWP. |

SL-BWP-PoolConfig

The IE SL-BWP-PoolConfig is used to configure NR sidelink communication resource pool.

SL-BWP-PoolConfig information element

```
SL-BWP-PoolConfig-r16 ::=            SEQUENCE {
   sl-RxPool-r16                          SEQUENCE (SIZE (1..maxNrofRXPool-
r16) ) OF SL-ResourcePool-r16        OPTIONAL,   -- Cond HO
   sl-TxPoolSelectedNormal-r16            SL-TxPoolDedicated-r16
OPTIONAL,   -- Need M
   sl-TxPoolScheduling-r16                SL-TxPoolDedicated-r16
OPTIONAL,   -- Need N
   sl-TxPoolExceptional-r16               SL-ResourcePoolConfig-r16
OPTIONAL   -- Need M
}
SL-TxPoolDedicated-r16 ::=           SEQUENCE {
   sl-PoolToReleaseList-r16               SEQUENCE (SIZE (1..maxNrofTXPool-
r16) ) OF SL-ResourcePoolID-r16      OPTIONAL,   -- Need N
   sl-PoolToAddModList-r16                SEQUENCE (SIZE (1..maxNrofTXPool-
r16) ) OF SL-ResourcePoolConfig-r16  OPTIONAL   -- Need N
}
SL-ResourcePoolConfig-r16 ::=        SEQUENCE {
   sl-ResourcePoolID-r16                  SL-ResourcePoolID-r16,
   sl-ResourcePool-r16                    SL-ResourcePool-r16
OPTIONAL   -- Need M
}
SL-ResourcePoolID-r16 ::=              INTEGER (1..maxNrofPoolID-r16)
```

| SL-BWP-PoolConfig field descriptions |
|---|
| sl-RxPool<br>Indicates the receiving resource pool on the configured BWP. For the PSFCH related configuration, if configured, will be used for PSFCH transmission/reception. If the field is included, it replaces any previous list, i.e. all the entries of the list are replaced and each of the SL-ResourcePool entries is considered to be newly created. |
| sl-TxPoolExceptional<br>Indicates the resources by which the UE is allowed to transmit NR sidelink communication in exceptional conditions on the configured BWP. For the PSFCH related configuration, if configured, will be used for PSFCH transmission/reception. |
| sl-TxPoolScheduling<br>Indicates the resources by which the UE is allowed to transmit NR sidelink communication based on network scheduling on the configured BWP. For the PSFCH related configuration, if configured, will be used for PSFCH transmission/reception. |
| sl-TxPoolSelectedNormal<br>Indicates the resources by which the UE is allowed to transmit NR sidelink communication by UE autonomous resource selection on the configured BWP. For the PSFCH related configuration, if configured, will be used for PSFCH transmission/reception. |

SL-BWP-PoolConfigCommon

The IE SL-BWP-PoolConfigCommon is used to configure the cell-specific NR sidelink communication resource pool.

SL-BWP-PoolConfigCommon information element

```
SL-BWP-PoolConfigCommon-r16 ::=      SEQUENCE {
   sl-RxPool-r16                            SEQUENCE (SIZE
(1..maxNrofRXPool-r16) ) OF SL-ResourcePool-r16       OPTIONAL, --
Need R
   sl-TxPoolSelectedNormal-r16          SEQUENCE (SIZE
(1..maxNrofTXPool-r16) ) OF SL-ResourcePoolConfig-r16 OPTIONAL, --
Need R
   sl-TxPoolExceptional-r16             SL-ResourcePoolConfig-r16
OPTIONAL   -- Need R
}
[...]
```

SL-ConfigDedicatedNR

The IE SL-ConfigDedicatedNR specifies the dedicated configuration information for NR sidelink communication.

SL-ConfigDedicatedNR information element

```
SL-ConfigDedicatedNR-r16 ::=                SEQUENCE {
   sl-PHY-MAC-RLC-Config-r16                    SL-PHY-MAC-RLC-Config-r16
OPTIONAL,   -- Need M
   sl-RadioBearerToReleaseList-r16              SEQUENCE (SIZE
(1..maxNrofSLRB-r16) ) OF SLRB-Uu-ConfigIndex-r16            OPTIONAL,   -
- Need N
   sl-RadioBearerToAddModList-r16               SEQUENCE (SIZE
(1..maxNrofSLRB-r16) ) OF SL-RadioBearerConfig-r16           OPTIONAL,   -
- Need N
   sl-MeasConfigInfoToReleaseList-r16           SEQUENCE (SIZE (1..maxNrofSL-
```

-continued

SL-ConfigDedicatedNR information element

```
Dest-r16) ) OF SL-DestinationIndex-r16          OPTIONAL,   -- Need N
   sl-MeasConfigInfoToAddModList-r16          SEQUENCE (SIZE (1..maxNrofSL-
Dest-r16) ) OF SL-MeasConfigInfo-r16            OPTIONAL,   -- Need N
   t400-r16                                   ENUMERATED {ms100, ms200,
ms300, ms400, ms600, ms1000, ms1500, ms2000}      OPTIONAL,   -- Need M
   . . .
}
SL-DestinationIndex-r16 ::=                   INTEGER (0..maxNrofSL-Dest-1-
r16)
SL-PHY-MAC-RLC-Config-r16::=                SEQUENCE {
   sl-ScheduledConfig-r16                     SetupRelease { SL-
ScheduledConfig-r16 }                               OPTIONAL,   --
Need M
   sl-UE-SelectedConfig-r16                   SetupRelease { SL-UE-
SelectedConfig-r16 }                              OPTIONAL,   -- Need N
M
   sl-FreqInfoToReleaseList-r16               SEQUENCE (SIZE
(1..maxNrofFreqSL-r16) ) OF SL-Freq-Id-r16                  OPTIONAL,   -
- Need N
   sl-FreqInfoToAddModList-r16                SEQUENCE (SIZE
(1..maxNrofFreqSL-r16) ) OF SL-FreqConfig-r16               OPTIONAL,   -
- Need N
   sl-RLC-BearerToReleaseList-r16             SEQUENCE (SIZE (1..maxSL-
LCID-r16) ) OF SL-RLC-BearerConfigIndex-r16     OPTIONAL,   -- Need N
   sl-RLC-BearerToAddModList-r16              SEQUENCE (SIZE (1..maxSL-
LCID-r16) ) OF SL-RLC-BearerConfig-r16            OPTIONAL,   -- Need
   sl-MaxNumConsecutiveDTX-r16                ENUMERATED {n1, n2, n3, n4,
n6, n8, n16, n32}                               OPTIONAL,   -- Need M
   sl-CSI-Acquisition-r16                     ENUMERATED {enabled}
OPTIONAL,   -- Need R
   sl-CSI-SchedulingRequestId-r16             SetupRelease
{SchedulingRequest Id}                                      OPTIONAL,
-- Need M
   sl-SSB-PriorityNR-r16                      INTEGER (1..8)
OPTIONAL,   -- Need R
   networkControlledSyncTx-r16                ENUMERATED {on, off}
OPTIONAL,   -- Need M
}
```

| SL-ConfigDedicatedNR field descriptions |
|---|
| sl-MeasConfigInfoToAddModList<br>This field indicates the RSRP measurement configurations for unicast destinations to add and/or modify. |
| sl-MeasConfigInfoToReleaseList<br>This field indicates the RSRP measurement configurations for unicast destinations to remove. |
| sl-PHY-MAC-RLC-Config<br>This field indicates the lower layer sidelink radio bearer configurations. |
| sl-RadioBearerToAddModList<br>This field indicates one or multiple sidelink radio bearer configurations to add and/or modify. |
| sl-RadioBearerToReleaseList<br>This field indicates one or multiple sidelink radio bearer configurations to remove. |

| SL-PHY-MAC-RLC-Config field descriptions |
|---|
| sl-FreqInfoToAddModList<br>This field indicates the NR sidelink communication configuration on some carrier frequency (ies) to add and/or modify. In this release, only one entry can be configured in the list. |
| sl-FreqInfoToReleaseList<br>This field indicates the NR sidelink communication configuration on some carrier frequency (ies) to remove. In this release, only one entry can be configured in the list. |
| sl-RLC-BearerToAddModList<br>This field indicates one or multiple sidelink RLC bearer configurations to add and/or modify. |
| sl-RLC-BearerToReleaseList<br>This field indicates one or multiple sidelink RLC bearer configurations to remove. |
| sl-ScheduledConfig<br>Indicates the configuration for UE to transmit NR sidelink communication based on network scheduling. This field is not configured simultaneously with sl-UE-SelectedConfig. |
| sl-UE-SelectedConfig<br>Indicates the configuration used for UE autonomous resource selection. This field is not configured simultaneously with sl-ScheduledConfig. |
| sl-CSI-Acquisition<br>Indicates whether CSI reporting is enabled in sidelink unicast. If the field is absent, sidelink CSI reporting is disabled. |
| sl-CSI-SchedulingRequestId<br>If present, it indicates the scheduling request configuration applicable for sidelink CSI report MAC CE, as specified in TS 38.321 [3]. |
| [ . . . ] |

SL-FreqConfig

The IE SL-FreqConfig specifies the dedicated configuration information on one particular carrier frequency for NR sidelink communication.

SL-FreqConfig information element

```
SL-FreqConfig-r16 ::=                       SEQUENCE {
   sl-Freq-Id-r16                              SL-Freq-Id-r16,
   sl-SCS-SpecificCarrierList-r16           SEQUENCE (SIZE (1..maxSCSs) )
OF SCS-SpecificCarrier,
   sl-AbsoluteFrequencyPointA-r16           ARFCN-ValueNR
```

-continued

SL-FreqConfig information element

```
OPTIONAL,    -- Need M
   sl-AbsoluteFrequencySSB-r16         ARFCN-ValueNR
OPTIONAL,    -- Need R
   frequencyShift7p5khzSL-r16          ENUMERATED {true}
OPTIONAL,    -- Cond V2X-SL-Shared
   valueN-r16                          INTEGER (−1..1),
   sl-BWP-ToReleaseList-r16            SEQUENCE (SIZE (1..maxNrofSL-
BWPs-r16) ) OF BWP-Id               OPTIONAL,    -- Need N
   sl-BWP-ToAddModList-r16             SEQUENCE (SIZE (1..maxNrofSL-
BWPs-r16) ) OF SL-BWP-Config-r16 OPTIONAL,    -- Need N
   sl-SyncConfigList-r16               SL-SyncConfigList-r16
OPTIONAL,    -- Need M
   sl-SyncPriority-r16                 ENUMERATED {gnss, gnbEnb}
OPTIONAL    -- Need M
}
SL-Freq-Id-r16 ::=                     INTEGER (1..maxNrofFreqSL-r16)
```

SL-FreqConfig field descriptions frequencyShift7p5khzSL
Enable the NR SL transmission with a 7.5 kHz shift to the LTE raster. If the field is absent, the frequency shift is disabled.
sl-AbsoluteFrequencyPointA -continued SL-FreqConfig field descriptions Absolute frequency of the reference resource block (Common RB 0). Its lowest subcarrier is also known as Point A.
sl-AbsoluteFrequencySSB
Indicates the frequency location of sidelink SSB. The transmission bandwidth for sidelink SSB is within the bandwidth of this sidelink BWP.
sl-BWP-ToAddModList
This field indicates the list of sidelink BWP(s) on which the NR sidelink communication configuration is to be added or reconfigured. In this release, only one BWP is allowed to be configured for NR sidelink communication.
sl-BWP-ToReleaseList
This field indicates the list of sidelink BWP(s) on which the NR sidelink communication configuration is to be released.
sl-Freq-Id
This field indicates the identity of the dedicated configuration information on the carrier frequency for NR sidelink communication.
sl-SCS-SpecificCarrierList
A set of UE specific channel bandwidth and location configurations for different subcarrier spacings (numerologies). Defined in relation to Point A. The UE uses the configuration provided in this field only for the purpose of channel bandwidth and location determination. In this release, only one SCS-SpecificCarrier is allowed to be configured for NR sidelink communication.

The IE FreqConfigCommon specifies the cell-specific configuration information on one particular carrier frequency for NR sidelink communication.

SL-FreqConfigCommon information element

```
SL-FreqConfigCommon-r16 ::=            SEQUENCE {
   sl-SCS-SpecificCarrierList-r16         SEQUENCE (SIZE (1..maxSCSs) ) OF
SCS-SpecificCarrier,
   sl-AbsoluteFrequencyPointA-r16         ARFCN-ValueNR,
   sl-AbsoluteFrequencySSB-r16            ARFCN-ValueNR
OPTIONAL, -- Need R
   frequencyShift7p5khzSL-r16             ENUMERATED {true}
OPTIONAL, -- Cond V2X-SL-Shared
   valueN-r16                             INTEGER (−1..1),
   sl-BWP-List-r16                        SEQUENCE (SIZE (1..maxNrofSL-
BWPs-r16) ) OF SL-BWP-ConfigCommon-r16      OPTIONAL, -- Need R
   sl-SyncConfigList-r16                  SL-SyncConfigList-r16
OPTIONAL, -- Need R
   . . .
}
```

SL-FreqConfigCommon field descriptions frequencyShift7p5khzSL
Enable the NR SL transmission with a 7.5 kHz shift to the LTE raster. If the field is absent, the frequency shift is disabled.
sl-AbsoluteFrequencyPointA
Absolute frequency of the reference resource block (Common RB 0). Its lowest subcarrier is also known as Point A.
sl-AbsoluteFrequencySSB
Indicates the frequency location of sidelink SSB. The transmission bandwidth for sidelink SSB is within the bandwidth of this sidelink BWP.
sl-BWP-List
This field indicates the list of sidelink BWP(s) on which the NR sidelink communication configuration. In this release, only one BWP is allowed to be configured for NR sidelink communication.
[ . . . ]

SL-ResourcePool

The IE SL-ResourcePool specifies the configuration information for NR sidelink communication resource pool.

SL-ResourcePool information element

```
SL-ResourcePool-r16 ::=                    SEQUENCE {
  sl-PSCCH-Config-r16                        SetupRelease { SL-PSCCH-Config-
r16 }                                        OPTIONAL,   -- Need M
  sl-PSSCH-Config-r16                        SetupRelease { SL-PSSCH-Config-
r16 }                                        OPTIONAL,   -- Need M
  sl-PSFCH-Config-r16                        SetupRelease { SL-PSFCH-Config-
r16 }                                        OPTIONAL,   -- Need M
sl-SyncAllowed-r16                           SL-SyncAllowed-r16
OPTIONAL,   -- Need M
  sl-SubchannelSize-r16                      ENUMERATED {n10, n12, n15, n20,
n25, n50, n75, n100}                       OPTIONAL,   -- Need M
  dummy                                      INTEGER (10..160)
OPTIONAL,   -- Need M
  sl-StartRB-Subchannel-r16                  INTEGER (0..265)
OPTIONAL,   -- Need M
  sl-NumSubchannel-r16                       INTEGER (1..27)
OPTIONAL,   -- Need M
  sl-Additional-MCS-Table-r16                ENUMERATED {qam256, qam64LowSE,
qam256-qam64LowSE }                        OPTIONAL,   -- Need M
  sl-ThreshS-RSSI-CBR-r16                    INTEGER (0..45)
OPTIONAL,   -- Need M
  sl-TimeWindowSizeCBR-r16                   ENUMERATED {ms100, slot100}
OPTIONAL,   -- Need M
  sl-TimeWindowSizeCR-r16                    ENUMERATED {ms1000, slot1000}
OPTIONAL,   -- Need M
  sl-PTRS-Config-r16                         SL-PTRS-Config-r16
OPTIONAL,   -- Need M
  sl-UE-SelectedConfigRP-r16                 SL-UE-SelectedConfigRP-r16
OPTIONAL,   -- Need M
  sl-RxParametersNcell-r16                   SEQUENCE {
    sl-TDD-Configuration-r16                   TDD-UL-DL-ConfigCommon
OPTIONAL,   -- Need M
    sl-SyncConfigIndex-r16                     INTEGER (0..15)
  }
OPTIONAL,   -- Need M
  sl-ZoneConfigMCR-List-r16                  SEQUENCE (SIZE (16) ) OF SL-
ZoneConfigMCR-r16                              OPTIONAL,   -- Need M
  sl-FilterCoefficient-r16                   FilterCoefficient
OPTIONAL,   -- Need M
  sl-RB-Number-r16                           INTEGER (10..275)
OPTIONAL,   -- Need M
  sl-PreemptionEnable-r16                    ENUMERATED {enabled, p11, p12,
p13, p14, p15, p16, p17, p18}                OPTIONAL,   -- Need R
  sl-PriorityThreshold-UL-URLLC-r16          INTEGER (1..9)
OPTIONAL,   -- Need M
  sl-PriorityThreshold-r16                   INTEGER (1..9)
OPTIONAL,   -- Need M
  sl-X-Overhead-r16                          ENUMERATED {n0, n3, n6, n9}
OPTIONAL,   -- Need S
  sl-PowerControl-r16                        SL-PowerControl-r16
OPTIONAL,   -- Need M
  sl-TxPercentageList-r16                    SL-TxPercentageList-r16
OPTIONAL,   -- Need M
  sl-MinMaxMCS-List-r16                      SL-MinMaxMCS-List-r16
OPTIONAL,   -- Need M
  . . .,
  [ [
  sl-TimeResource-r16                        BIT STRING (SIZE (10..160) )
OPTIONAL,   -- Need M
  ] ]
}
...
SL-PSCCH-Config-r16 ::=                      SEQUENCE {
  sl-TimeResourcePSCCH-r16                     ENUMERATED {n2, n3}
OPTIONAL,   -- Need M
  sl-FreqResourcePSCCH-r16                     ENUMERATED {n10,n12, n15,
n20, n25}                                    OPTIONAL,   -- Need M
  sl-DMRS-ScrambleID-r16                       INTEGER (0..65535)
OPTIONAL,   -- Need M
  sl-NumReservedBits-r16                       INTEGER (2..4)
OPTIONAL,   -- Need M
  . . .
}
```

-continued

| SL-ResourcePool information element | |
|---|---|
| SL-PSSCH-Config-r16 ::= | SEQUENCE { |
| sl-PSSCH-DMRS-TimePatternList-r16 | SEQUENCE (SIZE (1..3) ) OF |
| INTEGER (2..4) | OPTIONAL, -- Need M |
| sl-BetaOffsets2ndSCI-r16 | SEQUENCE (SIZE (4) ) OF SL- |
| BetaOffsets-r16 | OPTIONAL, -- Need M |
| sl-Scaling-r16 | ENUMERATED {f0p5, f0p65, |
| f0p8, f1} | OPTIONAL, -- Need M |
| . . . | |
| } | |
| ... | |
| . . . | |
| } | |

| SL-ResourcePool field descriptions |
|---|
| sl-NumSubchannel<br>Indicates the number of subchannels in the corresponding resource pool, which consists of contiguous PRBs only. |
| sl-PreemptionEnable<br>Indicates whether pre-emption is disabled or enabled in a resource pool. If the field is present and the value is pl1, pl2, and so on (but not enabled), it means that pre-emption is enabled and a priority level p_preemption is configured. If the field is present and the value is enabled, the pre-emption is enabled (but p_preemption is not configured) and pre-emption is applicable to all levels. |
| sl-PriorityThreshold-UL-URLLC<br>Indicates the threshold used to determine whether NR sidelink transmission is prioritized over uplink transmission of priority index 1 as specified in TS 38.213[13], clause 16.2.4.3, or whether PUCCH transmission carrying SL HARQ is prioritized over PUCCH transmission carrying UCI of priority index 1 if they overlap in time as specified in TS 38.213 [13], clause 9.2.5.0. |
| sl-PriorityThreshold<br>Indicates the threshold used to determine whether NR sidelink transmission is prioritized over uplink transmission of priority index 0 as specified in TS 38.213[13], clause 16.2.4.3, or whether PUCCH transmission carrying SL HARQ is prioritized over PUCCH transmission carrying UCI of priority index 0 if they overlap in time as specified in TS 38.213 [13], clause 9.2.5.0. |
| sl-RB-Number<br>Indicates the number of PRBs in the corresponding resource pool, which consists of contiguous PRBs only. The remaining RB cannot be used (See TS 38.214[19], clause 8). |
| sl-StartRB-Subchannel<br>Indicates the lowest RB index of the subchannel with the lowest index in the resource pool with respect to the lowest RB index of a SL BWP. |
| sl-SubchannelSize<br>Indicates the minimum granularity in frequency domain for the sensing for PSSCH resource selection in the unit of PRB. |
| [ . . . ] |

3GPP TS 36.321 V16.6.0 discusses cell restriction of uplink (UL) logical channel (LCH) and (different and/or allowed) carrier sets of sidelink (SL) LCH for Packet Data Convergence Protocol (PDCP) duplication in MAC layer of LTE. One or more parts of 3GPP TS 36.321 V16.6.0 are quoted below:

5.4.3 Multiplexing and Assembly 5.4.3.1 Logical Channel Prioritization

The Logical Channel Prioritization procedure is applied when a new transmission is performed.

RRC controls the scheduling of uplink data by signalling for each logical channel: priority where an increasing priority value indicates a lower priority level, prioritisedBitRate which sets the Prioritized Bit Rate (PBR), bucketSizeDuration which sets the Bucket Size Duration (BSD), and optionally allowedTTI-Lengths which sets the allowed TTI lengths. For NB-IoT, prioritisedBitRate, bucketSizeDuration and the corresponding steps of the Logical Channel Prioritisation procedure (i.e., Step 1 and Step 2 below) are not applicable.

The MAC entity shall perform the following Logical Channel Prioritization procedure when a new transmission is performed on an UL grant with a certain TTI length:

The MAC entity shall allocate resources to the logical channels that are allowed to transmit using the TTI length of the grant, in the following steps:

Step 1: All the allowed logical channels with Bj>0 are allocated resources in a decreasing priority order. If the PBR of a logical channel is set to "infinity", the MAC entity shall allocate resources for all the data that is available for transmission on the logical channel before meeting the PBR of the lower priority logical channel(s);

Step 2: the MAC entity shall decrement Bj by the total size of MAC SDUs served to logical channel j in Step 1;

NOTE 1: The value of Bj can be negative.

Step 3: if any resources remain, all the allowed logical channels are served in a strict decreasing priority order (regardless of the value of Bj) until either the data for that logical channel or the UL grant is exhausted, whichever comes first. Logical channels configured with equal priority should be served equally.

The UE shall also follow the rules below during the scheduling procedures above:

if a logical channel has been configured with Ich-CellRestriction and if PDCP duplication within the same MAC entity (i.e. CA duplication) is activated, for this logical channel the MAC entity shall consider the cells indicated by Ich-CellRestriction to be restricted for transmission.

for NB-IoT UEs, BL UEs or UEs in enhanced coverage, if edt-SmallTBS-Enabled is set to TRUE for the corresponding PRACH resource, the UE shall choose a TB size among the set of possible TB sizes as described in clauses 8.6.2 and 16.3.3 of TS 36.213 [2]

The MAC entity shall not transmit data for a logical channel corresponding to a radio bearer that is suspended (the conditions for when a radio bearer is considered suspended are defined in TS 36.331 [8]).

5.14.1.3 Multiplexing and Assembly

For PDU(s) associated with one SCI, MAC shall consider only logical channels with the same Source Layer-2 ID-Destination Layer-2 ID pair.

Multiple transmissions within overlapping SC periods to different ProSe Destinations are allowed subject to single-cluster SC-FDM constraint.

In V2X sidelink communication, multiple transmissions for different Sidelink processes are allowed to be independently performed in different subframes.

5.14.1.3.1 Logical Channel Prioritization

The Logical Channel Prioritization procedure is applied when a new transmission is performed. Each sidelink logical channel has an associated priority which is the PPPP and optionally an associated PPPR. Multiple sidelink logical channels may have the same associated priority. The mapping between priority and LCID is left for UE implementation. If duplication is activated as specified in TS 36.323 [4], the MAC entity shall map different sidelink logical channels which correspond to the same PDCP entity onto different carriers in accordance with clause 5.14.1.5, or onto different carriers of different carrier sets (if configured in allowedCarrierFreqList for the corresponding destination). For a given sidelink logical channel, it is up to UE implementation which carrier set to select among the carrier sets configured in allowedCarrierFreqList (if configured) for the corresponding destination.

The MAC entity shall perform the following Logical Channel Prioritization procedure either for each SCI transmitted in an SC period in sidelink communication, or for each SCI corresponding to a new transmission in V2X sidelink communication:

The MAC entity shall allocate resources to the sidelink logical channels in the following steps:

Only consider sidelink logical channels not previously selected for this SC period and the SC periods (if any) which are overlapping with this SC period, to have data available for transmission in sidelink communication;

Only consider sidelink logical channels which meet the following conditions:

allowed on the carrier where the SCI is transmitted for V2X sidelink communication, if the carrier is configured by upper layers according to TS 36.331 [8] and TS 24.386 [15];

having a priority whose associated threshCBR-FreqReselection is no lower than the CBR of the carrier when the carrier is (re-)selected in accordance with 5.14.1.5;

Only consider one sidelink logical channel among sidelink logical channels corresponding to same PDCP entity, if duplication is activated as specified in TS 36.323 [4].

Step 0: Select a ProSe Destination, having the sidelink logical channel with the highest priority, among the sidelink logical channels having data available for transmission and having the same transmission format as the one selected corresponding to the ProSe Destination;

5.24 Activation/Deactivation of PDCP Duplication

If one or more DRBs are configured with PDCP duplication, the network may activate and deactivate the PDCP duplication for the configured DRB(s) by sending the PDCP Duplication Activation/Deactivation MAC CE described in clause 6.1.3.17. In addition, PDCP duplication for DRB(s) may be activated upon configuration by upper layers (TS 36.331 [8]).

Upon reception of a PDCP Duplication Activation/Deactivation MAC CE, the MAC entity shall for each DRB configured with duplication:

if the MAC CE indicates that PDCP duplication for the DRB shall be activated:

indicate the activation of PDCP duplication for the DRB to upper layers.

if the MAC CE indicates that PDCP duplication for the DRB shall be deactivated:

indicate the deactivation of PDCP duplication for the DRB to upper layers.

3GPP TS 36.331 V16.7.0 discusses RRC parameters associated with PDCP duplication in LTE. One or more parts of 3GPP TS 36.331 V16.7.0 are quoted below:

LogicalChannelConfig

The IE LogicalChannelConfig is used to configure the logical channel parameters.

LogicalChannelConfig information element

```
LogicalChannelConfig ::=            SEQUENCE {
  ul-SpecificParameters               SEQUENCE {
    priority                        INTEGER (1..16),
    prioritisedBitRate                  ENUMERATED {
                                      kBps0, kBps8, kBps16, kBps32,
kBps64, kBps128,
                                      kBps256, infinity, kBps512-v1020,
kBps1024-v1020,
                                      kBps2048-v1020, spare5, spare4,
spare3, spare2,
                                      spare1},
bucketSizeDuration                    ENUMERATED {
                                    ms50, ms100, ms150, ms300, ms500,
ms1000, spare2,
                                    spare1},
    logicalChannelGroup                 INTEGER (0..3)   OPTIONAL
  -- Need OR
  }   OPTIONAL,                                                     --
Cond UL
  ...,
  [ [ logicalChannelSR-Mask-r9  ENUMERATED {setup} OPTIONAL
  -- Cond SRmask
  ] ],
  [ [ logicalChannelSR-Prohibit-r12     BOOLEAN   OPTIONAL   -
- Need ON
  ] ],
  [ [ laa-UL-Allowed-r14                BOOLEAN   OPTIONAL,
  -- Need ON
    bitRateQueryProhibitTimer-r14ENUMERATED {
                                s0, s0dot4, s0dot8, sldot6, s3, s6,
s12,
                                s30}   OPTIONAL   -- Need OR
  ] ],
  [ [ allowedTTI-Lengths-r15      CHOICE {
    release       NULL,
    setup       SEQUENCE {
      shortTTI-r15      BOOLEAN,
      subframeTTI-r15       BOOLEAN
    }
  }                               OPTIONAL,                         --
Need ON
  logicalChannelSR-Restriction-r15 CHOICE {
    release       NULL,
    setup       ENUMERATED {spucch, pucch}
  }                               OPTIONAL,                         --
Need ON
  channelAccessPriority-r15           CHOICE {
    release                             NULL,
    setup                             INTEGER (1..4)
  }                               OPTIONAL,       -- Need ON
  lch-CellRestriction-r15             BIT STRING (SIZE (maxServCell-
r13) ) OPTIONAL -- Need ON
  ] ],
  [ [
    bitRateMultiplier-r16           ENUMERATED {x40, x70, x100, x200}
  OPTIONAL -- Need OR
  ] ]
}
[...]
```

SL-V2X-PacketDuplicationConfig

The IE SL-V2X-PacketDuplicationConfig specifies the configuration information for sidelink packet duplication for V2X sidelink communication transmission.

| SL-V2X-PacketDuplicationConfig information element |
|---|
| SL-V2X-PacketDuplicationConfig-r15 ::= SEQUENCE {<br>threshSL-Reliability-r15 SL-Reliability-r15,<br>allowedCarrierFreqConfig-r15 SL-PPPR-Dest-CarrierFreqList-r15 OPTIONAL, -- Need OR<br>. . .<br>}<br>SL-PPPR-Dest-CarrierFreqList-r15 ::= SEQUENCE (SIZE (1..maxSL-Dest-r12) ) OF SL-PPPR-Dest-CarrierFreq<br>SL-PPPR-Dest-CarrierFreq ::= SEQUENCE {<br>destinationInfoList-r15 SL-DestinationInfoList-r12 OPTIONAL, -- Need OR<br>allowedCarrierFreqList-r15 SL-AllowedCarrierFreqList-r15 OPTIONAL -- Need OR<br>}<br>SL-AllowedCarrierFreqList-r15 ::= SEQUENCE {<br>allowedCarrierFreqSet1 SEQUENCE (SIZE (1..maxFreqV2X-r14) ) OF ARFCN-ValueEUTRA-r9,<br>allowedCarrierFreqSet2 SEQUENCE (SIZE (1..maxFreqV2X-r14) ) OF ARFCN-ValueEUTRA-r9<br>} |

| 1> SL-V2X-PacketDuplicationConfig field descriptions |
|---|
| allowedCarrierFreqList, allowedCarrierFreqSet1, allowedCarrierFreqSet2<br>Indicates, for V2X sidelink communication, the set of carrier frequencies applicable for the transmission of the MAC SDUs from the sidelink logical channels whose associated destination are included in destinationInfoList (see TS 36.321 [6]). If present, E-UTRAN shall ensure allowedCarrierFreqSet1 and allowedCarrierFreqSet2 do not include the same carrier frequency. |
| threshSL-Reliability<br>Indicates the reliability threshold used to determine whether sidelinik packet duplication is configured and activated for V2X sidelink communication transmission. See TS 36.323 [8] and TS 36.321 [6]. |

RP-220476 discusses sidelink Discontinuous Reception (DRX) procedure in MAC layer in NR. One or more parts of RP-220476 are quoted below:

5.x Sidelink Discontinuous Reception (DRX)

The MAC entity may be configured by RRC with a SL DRX functionality that controls the UE's SCI (i.e., 1 stage SCI and 2$^{nd}$ stage SCI) monitoring activity for unicast, for groupcast and broadcast. When using SL DRX operation, the MAC entity shall also monitor SCI (i.e., 1$^{st}$ stage SCI and 2$^{nd}$ stage SCI) according to requirements found in other clauses of this specification.

RRC controls Sidelink DRX operation by configuring the following parameters:

- sl-drx-onDurationTimer: the duration at the beginning of a SL DRX cycle;
- sl-drx-SlotOffset: the delay before starting the sl-drx-onDurationTimer;
- sl-drx-InactivityTimer(except for the broadcast transmission): the duration after the fist slot of SCI (i.e., 1$^{st}$ stage SCI and 2$^{nd}$ stage SCI) reception in which an SCI indicates a new SL transmission for the MAC entity;
- sl-drx-RetransmissionTimer (per Sidelink process except for the broadcast transmission): the maximum duration until a SL retransmission is received;
- sl-drx-StartOffset: the slot where the SL DRX cycle starts;
- sl-drx-Cycle: the Sidelink DRX cycle;
- sl-drx-HARQ-RTT-Timer (per Sidelink process except for the broadcast transmission): the minimum duration before a SL HARQ retransmission is expected by the MAC entity.

5.x.1 Behaviour of UE Receiving SL-SCH Data

When SL DRX is configured, the Active Time includes the time while:

- sl-drx-onDurationTimer or sl-drx-InactivityTimer is running; or
- sl-drx-RetransmissionTimer is running; or
- period of sl-LatencyBoundCSI-Report configured by RRC in case SL-CSI reporting MAC CE is not received; or
- the time between the transmission of the request of SL-CSI reporting and the reception of the SL-SCI reporting MAC CE in case SL-CSI reporting MAC CE is received; or
- Slot associated with the announced periodic transmissions by the UE transmitting SL-SCH Data.

When one or multiple SL DRX is configured, the MAC entity shall:

1> if multiple SL DRX Cycles that are mapped with multiple SL-QoS-Profiles of a Destination Layer-2 ID and interested cast type is associated to groupcast and broadcast:

2> select sl-drx-Cycle whose length of the sl-drx-cycle is the shortest one among multiple SL DRX Cycles that are mapped with multiple SL-QoS-Profiles associated with the Destination Layer-2 ID:

2> select sl-drx-onDurationTimer whose length of the sl-drx-onDurationTimer is the longest one among multiple SL DRX onduration timers that are mapped with multiple SL-QoS-Profiles associated with the Destination Layer-2 ID.

1> if a sl-drx-HARQ-RTT-Timer expires:

2> if the data of the corresponding Sidelink process was not successfully decoded or if the HARQ feedback (i.e., negative acknowledgement) is not transmitted for unicast due to UL/SL prioritization:

3> start the sl-drx-RetransmissionTimer for the corresponding Sidelink process in the first slot after the expiry of sl-drx-HARQ-RTT-Timer.

When the cast type is groupcast or broadcast as indicated by upper layer, the sl-drx-StartOffset and sl-drx-SlotOffset are derived from the following equations:

sl-drx-StartOffset (ms)=Destination Layer-2 ID modulo sl-drx-Cycle (ms).

sl-drx-SlotOffset (ms)=Destination Layer-2 ID modulo sl-drx-onDurationTimer (ms).

1> if the SL DRX cycle is used, and [(DFN×10)+subframe number] modulo (sl-drx-Cycle)=sl-drx-StartOffset:

2> start sl-drx-onDurationTimer after sl-drx-SlotOffset from the beginning of the subframe.

1> if a SL DRX is in Active Time:

2> monitor the SCI (i.e., 1$^{st}$ stage SCI and 2$^{nd}$ stage SCI) in this SL DRX.

2> if the SCI indicates a new SL transmission:

3> if Source Layer-1 ID of the SCI is equal to the 8 LSB of the intended Destination Layer-2 ID and Destination Layer-1 ID of the SCI is equal to the 8 LSB of the intended Source Layer-2 ID and the cast type indicator in the SCI is set to unicast:

4> start or restart sl-drx-InactivityTimer for the corresponding Source Layer-2 ID and Destination Layer-2 ID pair after the fist slot of SCI reception.

3> if Destination Layer-1 ID of the SCI (i.e., 2$^{nd}$ stage SCI) is equal to the 8 LSB of the intended Destination Layer-1 ID and the cast type indicator in the SCI is set to groupcast:

4> select sl-drx-InactivityTimer whose length of the sl-drx-InactivityTimer is the largest one among multiple SL DRX Inactivity timers that are mapped to multiple SL-QoS-Profiles of Destination Layer-2 ID associated with the Destination Layer-1 ID of the SCI; and 4> start or restart sl-drx-InactivityTimer for the corresponding Destination Layer-2 ID after the fist slot of SCI reception.

2> if the SCI indicates a SL transmission:

3> if PSFCH resource is not configured for the SL grant associated to the SCI:

4> start the sl-drx-HARQ-RTT-Timer for the corresponding Sidelink process in the slot following the end of PSSCH transmission (i.e., currently received PSSCH).

3> if PSFCH resource is configured for the SL grant associated to the SCI:

4> if HARQ feedback is enabled by the SCI and the cast type indicator in the SCI is set to unicast; or 4> if HARQ feedback is enabled by the SCI and the cast type indicator in the SCI is set to groupcast and positive-negative acknowledgement is selected;

5> start the sl-drx-HARQ-RTT-Timer for the corresponding Sidelink process in the first slot after the end of the corresponding PSFCH transmission carrying the SL HARQ feedback; or 5> start the sl-drx-HARQ-RTT-Timer for the corresponding Sidelink process in the first slot after the end of the corresponding PSFCH resource for the SL HARQ feedback when the SL HARQ feedback is not transmitted due to UL/SL prioritization;

4> if HARQ feedback is enabled by the SCI and the cast type indicator in the SCI is set to groupcast and negative-only acknowledgement is selected;

5> start the sl-drx-HARQ-RTT-Timer for the corresponding Sidelink process in the first slot after the end of the corresponding PSFCH transmission carrying the SL HARQ feedback; or 5> start the sl-drx-HARQ-RTT-Timer for the corresponding Sidelink process in the first slot after the end of the corresponding PSFCH resource for the SL HARQ feedback when the SL HARQ feedback is not transmitted due to UL/SL prioritization; or 5> start the sl-drx-HARQ-RTT-Timer for the corresponding Sidelink process in the first slot after the end of the corresponding PSFCH resource for the SL HARQ feedback when the SL HARQ feedback is a positive acknowledgement.

4> if HARQ feedback is disabled by the SCI and the resource(s) for one or more retransmission opportunities is not scheduled in the SCI:

5> start the sl-drx-HARQ-RTT-Timer for the corresponding Sidelink process in the slot following the end of PSFCH resource.

4> if HARQ feedback is disabled by the SCI and the resource(s) for one or more retransmission opportunities is scheduled in the SCI:

5> start the sl-drx-HARQ-RTT-Timer for the corresponding Sidelink process in the slot following the end of PSSCH transmission (i.e., currently received PSSCH).

NOTE: The sl-drx-HARQ-RTT-Timer is derived from the retransmission resource timing (i.e., immediately next retransmission resource indicated in an SCI) when SCI indicates a next retransmission resource. The UE uses the sl-drx-HARQ-RTT-Timer is configured as specified in TS 38.331 [5] when an SCI doesn't indicate a next retransmission resource.

3> stop the sl-drx-RetransmissionTimer for the corresponding Sidelink process.

1> if a SL DRX Command MAC CE is received for the Source Layer-2 ID and Destination Layer-2 ID pair of a unicast:

2> stop sl-drx-onDurationTimer for the Source Layer-2 ID and Destination Layer-2 ID pair of a unicast;

2> stop sl-drx-InactivityTimer for the Source Layer-2 ID and Destination Layer-2 ID pair of a unicast.

5.x.2 Behaviour of UE Transmitting SL-SCH Data

The UE transmitting SL-SCH Data should keep aligned with its intended UE receiving the SL-SCH Data regarding the SL DRX Active time as specified in clause 5.x.1.

Furthermore, the UE transmitting SL-SCH Data determines the SL DRX active time based on SL DRX timers that are running (e.g., sl-drx-onDurationTimer, sl-drx-InactivityTimer, sl-drx-RetransmissionTimer) or will be running in the future (e.g., sl-drx-onDurationTimer, sl-drx-InactivityTimer, sl-drx-RetransmissionTimer) at the UE(s) receiving SL-SCH data. The UE may select resource for the initial transmission of groupcast within the time when sl-drx-onDurationTimer or sl-drx-InactivityTimer of the destination is running.

NOTE: A UE may assume that a resource for retransmission is in the active time if an initial transmission causes the sl-drx-RetransmissionTimer to be started at the receiving UE.

RP-213678 discusses Rel-18 Work Item Description (WID) on NR sidelink evolution. One or more parts of RP-213678 are quoted below:

3 Justification

. . . Although NR sidelink was initially developed for V2X applications, there is growing interest in the industry to expand the applicability of NR sidelink to commercial use cases. For commercial sidelink applications, two key requirements have been identified:

Increased sidelink data rate

Support of new carrier frequencies for sidelink

Increased sidelink data rate is motivated by applications such as sensor information (video) sharing between vehicles with high degree of driving automation. Commercial use cases could require data rates in excess of what is possible in Rel-17. Increased data rate can be achieved with the support of sidelink carrier aggregation and sidelink over unlicensed spectrum. Furthermore, by enhancing the FR2 sidelink operation, increased data rate can be more efficiently supported on FR2. While the support of new carrier frequencies and larger bandwidths would also allow to improve its data rate, the main benefit would come from making sidelink more applicable for a wider range of applications. More specifically, with the support of unlicensed spectrum and the enhancement in FR2, sidelink will be in a better position to be implemented in commercial devices since utilization of the ITS band is limited to ITS safety related applications.

4 Objective 4.1 Objective of SI or Core Part WI or Testing Part WI

To check in RAN #97 for objectives 1 and 3, taking into account the progress on objectives 2 and 4, aiming to have specification work for both objective 1 and 3.

1. Specify mechanism to support NR sidelink CA operation based on LTE sidelink CA operation [RAN2, RAN1, RAN4](This part of the work is put on hold until further checking in RAN #97)

Support only LTE sidelink CA features for NR (i.e., SL carrier (re-)selection, synchronization of aggregated carriers, handling the limited capability, power control for simultaneous sidelink TX, packet duplication)

The work is limited to FR1 licensed spectrum and ITS band in FR1.

No specific enhancements of Rel-17 sidelink features with sidelink CA support.

This feature is backwards compatible in the following regards

A Rel-16/Rel-17 UE can receive Rel-18 sidelink broadcast/groupcast transmissions with CA for the carrier on which it receives PSCCH/PSSCH and transmits the corresponding sidelink HARQ feedback (when SL-HARQ is enabled in SCI)

Rel-18 sidelink should be able to coexist with Rel-16/17 sidelink in the same resource pool. This does not preclude the possibility of operating Rel-18 sidelink in a dedicated resource pool.

One, some and/or all of the following terminology and assumptions may be used hereafter.

Base station (BS): a network central unit and/or a network node in New Radio (NR) that is used to control one or more Transmission and/or Reception Points (TRPs) which are associated with one or more cells. Communication between a base station and one or more TRPs may be via fronthaul. Base station may be referred to as central unit (CU), eNB, gNB, and/or NodeB.

Cell: a cell comprises one or more associated TRPs (e.g., coverage of the cell may comprise coverage of some and/or all associated TRP(s)). One cell may be controlled by one base station. Cell may be referred to as TRP group (TRPG).

Uplink (UL)-control signal: A UL-control signal may be a Scheduling Request (SR), a Channel State Information (CSI), a Hybrid Automatic Repeat Request (HARQ)-Acknowledgement (HARQ-ACK) and/or a HARQ-Negative Acknowledgement (NACK) for downlink transmission.

Slot: a slot is a scheduling unit in NR. A slot duration (e.g., a duration of a slot) may be 14 Orthogonal Frequency Division Multiplexing (OFDM) symbols.

In NR Release 16 (NR Rel-16) and/or NR Release 17 (NR Rel-17), sidelink communication is designed for and/or performed in a carrier/cell (from UE's perspective, for example). For example, a UE may perform sidelink transmissions in one sidelink Bandwidth Part (BWP) of one carrier/cell (e.g., the UE may perform sidelink transmission in only the one sidelink BWP of the one carrier/cell). In the present disclosure, the term "carrier/cell" may correspond to a carrier and/or a cell. In some examples, there are at least two sidelink resource allocation modes designed for NR sidelink communication such as discussed in a 3rd Generation Partnership Project (3GPP) 3GPP Technical Specification (TS) (3GPP TS 38.214 V17.0.0): (i) in Mode 1 (e.g., NR sidelink resource allocation mode 1), a base station (e.g., a network node) can schedule one or more sidelink transmission resources to be used by a transmitter User Equipment (UE) (TX UE) for one or more sidelink transmissions, and/or (ii) in mode 2 (e.g., NR sidelink resource allocation mode 2), a TX UE determines (e.g., a base station does not schedule) one or more sidelink transmission resources within a sidelink resource pool, wherein the sidelink resource pool is configured by a base station (e.g., network node) and/or is pre-configured.

For network scheduling mode (e.g. NR sidelink resource allocation mode 1), the network node may transmit a sidelink (SL) grant on Uu interface for scheduling Physical Sidelink Shared Channel (PSSCH) resources and/or Physical Sidelink Control Channel (PSCCH) resources. In response to the receive sidelink grant, the TX UE may perform PSCCH transmissions and/or PSSCH transmissions on PC5 interface. In some examples, among sidelink logical channels with available data, the TX UE may identify a sidelink logical channel with the highest priority. The TX UE may determine a destination associated with the sidelink logical channel with the highest priority. Then, the TX UE may generate a sidelink data packet from the sidelink logical channel with the highest priority and may perform one or more PSCCH and/or PSSCH transmissions, for transmitting the sidelink data packet, on the PSSCH/PSCCH resources scheduled by the sidelink grant. In the present disclosure, the term "PSSCH/PSCCH" may refer to PSSCH and/or PSCCH. For example, the PSSCH/PSCCH resources may comprise one or more PSSCH resources and/or one or more PSCCH resources. The Uu interface corresponds to a wireless interface for communication between network and the TX UE. The PC5 interface corresponds to a wireless interface for communication between (e.g., directly between) UEs and/or devices.

For UE selection mode (e.g., NR sidelink resource allocation mode 2), since transmission resources are not scheduled by a network, the TX UE may be required to perform sensing before selecting a resource for transmission (e.g., the TX UE may perform sensing-based transmission) in order to avoid resource collision and interference with (e.g., from or to) other UEs. When sensing-based resource selection is triggered (and/or requested) for a sidelink data packet to a destination, the TX UE may determine (e.g., a physical layer of the TX UE may determine) a valid/identified resource set based on sensing results (e.g., the valid/identified resource set may be a resource set that is identified by the UE and/or determined to be valid by the UE). The valid/identified resource set may be reported to higher layers (e.g., higher layers of the TX UE, such as Medium Access Control (MAC) layer of the TX UE). The TX UE (e.g., the higher layers of the TX UE) may select (e.g., randomly select) one or more valid/identified resources from the valid/identified resource set. The TX UE may utilize the one or more valid/identified resources to perform one or more sidelink transmissions for transmitting the sidelink data packet to the destination. The one or more sidelink transmissions from the TX UE may comprise PSSCH transmission and/or PSCCH transmission.

In NR Rel-16 sidelink, full sensing is supported for sensing-based resource selection. To reduce power consumption, partial sensing is further designed in NR Rel-17 sidelink, such that a UE may perform periodic-based partial sensing and/or contiguous partial sensing for selecting sidelink resources, instead of performing full sensing with more power consumption. Note that the sensing and resource selection may be performed from transmitter aspect of the UE.

In NR Rel-16 sidelink and/or NR Rel-17 sidelink, a sidelink control information (SCI) can indicate/allocate/schedule at most three sidelink resources, e.g., PSSCH resources, for a same Transport Block (TB), e.g., via Frequency resource assignment field and Time resource assignment field in the SCI. The first/initial one of the at most three PSSCH resources and the SCI are in the same sidelink slot. The SCI may comprise a 1st stage SCI (i.e., SCI format 1-A or other SCI format, such as SCI format 1-X where X may be any value) and a 2nd stage SCI (i.e., SCI format 2-A or SCI format 2-B or SCI format 2-C or other SCI format, such as SCI format 2-X where X may be any value). The 1st stage SCI may be transmitted via PSCCH. The 2nd stage SCI may be transmitted via multiplexed with the indicated/allocated/scheduled PSSCH in the same sidelink slot. In other words, the SCI can indicate/allocate/schedule at most two PSSCH resources, for the same TB, in later sidelink slots in a same sidelink resource pool.

For NR Rel-16 sidelink and/or NR Rel-17 sidelink, Physical Sidelink Feedback Channel (PSFCH) is designed and/or utilized for transmitting sidelink Hybrid Automatic Repeat Request-Acknowledgement (HARQ-ACK) feedback. For a sidelink resource pool, PSFCH resources may be configured (e.g., pre-configured) periodically with a period of N sidelink slots associated with the sidelink resource pool.

Alternatively and/or additionally, when a TX UE configured in mode 1 (e.g., NR sidelink resource allocation mode 1) receives a sidelink grant from network for scheduling PSSCH and/or PSCCH resources, the TX UE may perform sidelink transmissions on the scheduled PSSCH/PSCCH resources for a same sidelink data packet. The sidelink grant may also indicate a Physical Uplink Control Channel (PUCCH) resource. When TX UE determines to request more PSSCH/PSCCH resources for the sidelink data packet (e.g., the TX UE may decide to request more PSSCH/PSCCH resources based on (i) receiving/detecting sidelink HARQ-ACK feedback from Receiver User Equipment (RX UE), wherein the sidelink HARQ-ACK feedback indicates NACK and/or Discontinuous Transmission (DTX), and/or (ii) the TX UE not having retransmitted the sidelink data packet over a maximum allowed retransmission number), the TX UE may indicate (e.g., report) NACK via PUCCH transmission on the PUCCH resource. In the present disclosure, the term "receiving/detecting" may refer to receiving and/or detecting. When TX UE determines not to request more PSSCH/PSCCH resources for the sidelink data packet (e.g., the TX UE may decide not to request more PSSCH/PSCCH resources based on receiving/detecting sidelink HARQ-ACK feedback that indicates ACK from RX UE, and/or the TX UE having retransmitted the sidelink data packet over a maximum allowed retransmission number), the TX UE may indicate (e.g., report) ACK via PUCCH transmission on the PUCCH resource.

For TX UE configured in mode 1 (e.g., NR sidelink resource allocation mode 1), when the TX UE has available sidelink data for transmission (e.g., sidelink data that is available to be transmitted) and does not have one or more scheduled/reserved PSSCH/PSCCH resources for transmitting the available sidelink data, the TX UE may transmit a SR to network for requesting resources. In the present disclosure, the term "scheduled/reserved" may refer to scheduled and/or reserved. For example, a scheduled/reserved resource may correspond to a resource that is scheduled and/or reserved (e.g., scheduled and/or reserved for a transmission of data). The SR resource may be configured by network. When network receives/detects the SR from the TX UE, the network may schedule UL resource to the TX UE. The TX UE can report/transmit a Sidelink Buffer Status Report (SL BSR), comprising information of the available sidelink data, to network via the scheduled UL resource. Based on the sidelink buffer status report, the network node may transmit sidelink grant(s) for scheduling PSSCH/PSCCH resources to the TX UE.

In NR Rel-16/17 sidelink, a SL CSI report (sent from a device to a device, for example) may be transmitted via a MAC Control Element (CE), i.e., a SL-CSI reporting MAC CE. A UE-B can request a SL CSI report via 1-bit CSI request field in a SCI format 2-A. When UE-A receives the SCI format 2-A (e.g., in response to receiving the SCI format 2-A), UE-A may generate a SL CSI report and generate a corresponding SL-CSI reporting MAC CE (e.g., the SL-CSI reporting MAC CE may comprise the SL CSI report). The SL-CSI reporting MAC CE may be included in a MAC Protocol Data Unit (PDU), and UE-A may transmit the MAC PDU (which may also be denoted as TB) via PSSCH to UE-B. In some systems, SL CSI report is supported for unicast, but is not yet supported for groupcast and broadcast. It may be appreciated that the present disclosure may be used in a variety of scenarios, including, but not limited to, unicast, groupcast, broadcast, etc. Some example scenarios are provided relating to MAC PDU.

In a first example scenario, when the MAC PDU comprises (e.g., only) the SL-CSI reporting MAC CE (e.g., the MAC PDU does not comprise multiplexed sidelink data in the MAC PDU), the MAC PDU may be considered to disable SL HARQ feedback (e.g., the MAC PDU may be interpreted as an indication that SL HARQ feedback is disabled, among other things). Accordingly, a HARQ feedback enabled/disabled indicator field (e.g., a field indicating whether HARQ feedback is enabled or disabled) in corresponding SCI (e.g., in SCI format 2-A or SCI format 2-B or SCI format 2-C) may indicate SL HARQ feedback disabled (e.g., indicate that SL HARQ feedback is disabled), wherein the corresponding SCI schedules/allocates the PSSCH transmission for transmitting the MAC PDU. In the present disclosure, the term "schedules/allocates" refers to schedules and/or allocates.

In a second example scenario, when the MAC PDU comprises the SL-CSI reporting MAC CE and sidelink data from one or more logical channels (e.g., one or more first logical channels) configured with disabled SL HARQ feedback, the MAC PDU may be considered to disable SL HARQ feedback (e.g., the MAC PDU may be interpreted as an indication that SL HARQ feedback is disabled, among other things). Accordingly, a HARQ feedback enabled/disabled indicator field (e.g., a field indicating whether HARQ feedback is enabled or disabled) in corresponding SCI (e.g., in SCI format 2-A or SCI format 2-B or SCI format 2-C) may indicate SL HARQ feedback disabled (e.g., indicate that SL HARQ feedback is disabled), wherein the corresponding SCI schedules/allocates the PSSCH transmission for transmitting the MAC PDU.

In a third example scenario, when the MAC PDU comprises the SL-CSI reporting MAC CE and sidelink data from one or more logical channels (e.g., one or more second logical channels) configured with enabled SL HARQ feedback, the MAC PDU may be considered to enable SL HARQ feedback (e.g., the MAC PDU may be interpreted as an indication that SL HARQ feedback is enabled, among other things). Accordingly, a HARQ feedback enabled/disabled indicator field (e.g., a field indicating whether HARQ feedback is enabled or disabled) in corresponding SCI (e.g., in SCI format 2-A or SCI format 2-B or SCI format 2-C) may indicate SL HARQ feedback enabled (e.g., indicate that SL HARQ feedback is enabled), wherein the corresponding SCI schedules/allocates the PSSCH transmission for transmitting the MAC PDU.

In some examples, a priority of the MAC PDU is set to a value of the highest priority of one or more logical channels (e.g., the one or more first logical channels and/or the one or more second logical channels), if any, and the MAC CE, if included, in the MAC PDU. A priority field in a corresponding SCI (e.g., in SCI format 1-A) may indicate a priority value for the MAC PDU. It may be appreciated that a smaller priority value may indicate a higher priority (e.g., priority value 1 corresponds to a highest priority while priority value 8 corresponds to a lowest priority). In some examples, the priority value of the SL-CSI reporting MAC CE is fixed to '1'.

In some examples, since the SL CSI report is not considered in sidelink buffer status report generation and in order to satisfy latency requirement of the SL CSI report, the network may provide (e.g., also provide) SR configuration to the UE-A. If the UE-A has SL CSI report to be transmitted and does not have scheduled/reserved PSSCH/PSCCH resources for transmitting the SL CSI report, the TX UE may transmit a SR to network, based on the SR configuration, for requesting sidelink resources. When the network receives/detects the SR from the UE-A, the network may transmit one or more sidelink grants for scheduling PSSCH/PSCCH resources to the UE-A. Then, the UE-A can transmit the SL CSI report on the scheduled PSSCH/PSCCH resources to the UE-B.

In some examples, the SR configuration associated with sidelink buffer status report (e.g., sidelink buffer status report MAC CE) may be different from the SR configuration associated with SL CSI report (e.g., SL-CSI reporting MAC CE). In some examples, the SR resource associated with sidelink buffer status report (e.g., sidelink buffer status report MAC CE) may be the same as or different from the SR resource associated with SL CSI report (e.g., SL-CSI reporting MAC CE).

Alternatively and/or additionally, in Rel-17 sidelink, inter-UE coordination may be supported and/or studied for enhancing reliability and/or reducing latency in mode 2 (e.g., NR sidelink resource allocation mode 2). A UE may transmit a MAC CE for inter-UE coordination information/request. The MAC CE for inter-UE coordination information/request may have one or more features (e.g., behaviors and/or characteristics) similar to features of the SL-CSI reporting MAC CE (e.g., similar features may include at least one of enabled/disabled SL HARQ feedback, associated SR configuration/resource for requesting sidelink resources, etc.). Alternatively and/or additionally, new sidelink MAC CE(s) designed and/or specified in future may have similar features compared with the SL-CSI reporting MAC CE (e.g., similar features may include at least one of enabled/disabled SL HARQ feedback, associated SR configuration/resource for requesting sidelink resources, etc.).

In sidelink evolution, such as NR Release 18 (NR Rel-18) sidelink evolution (e.g., discussed in RP-213678), sidelink Carrier Aggregation (CA) operation may be supported and/or studied. A UE may be configured with one carrier/cell and/or more than one carrier/cell to operate sidelink communication. For a sidelink data packet to be transmitted, a UE in mode 2 (e.g., NR sidelink resource allocation mode 2) may select a sidelink carrier/cell and/or may select one or more sidelink data and/or control resources (e.g., one or more PSSCH resources and/or one or more PSCCH resources) in one sidelink resource pool in the selected sidelink carrier/cell. For a sidelink data packet to be transmitted, a UE in mode 1 (e.g., NR sidelink resource allocation mode 1) may receive a sidelink grant which indicates a sidelink carrier/cell and allocate one or more sidelink data and/or control resources in one sidelink resource pool in the indicated sidelink carrier/cell. Since the UE may have multiple sidelink data packets and/or multiple sidelink connections with one or more other UEs, the UE may simultaneously (e.g., concurrently) perform multiple sidelink data transmissions (e.g., multiple PSSCH transmissions) in multiple sidelink carrier/cells (respectively, for example). In some examples, for a UE, at most one sidelink data transmission may be allowed in one sidelink carrier/cell at a timing, such that more than one sidelink data transmissions at a timing may not be allowed in one sidelink carrier/cell. If the total transmit power of the multiple sidelink data transmissions is determined to and/or predicted to exceed a maximum UE transmit power, the UE may drop some of the multiple sidelink data transmissions depending on priority order of the multiple sidelink data transmissions (e.g., if the rule of UL transmit power prioritization/reduction in 3GPP TS 38.213 V17.0.0 is applied similarly).

Alternatively and/or additionally, the UE may drop some of the multiple sidelink data transmissions due to a limited TX capability. For example, the UE may drop some of the multiple sidelink data transmissions depending on a priority order of the multiple sidelink data transmissions and/or UE implementation. The limited TX capability may correspond to one or more limitations in the number of simultaneous transmission carriers, one or more limitations in the supported carrier combinations, and/or one or more limitations in interruptions for Radio Frequency (RF) retuning time. For example, the limited TX capability may mean that the UE cannot support one or more sidelink and/or uplink (UL) transmissions over one or more carrier/cells in a slot due to one or more of (a) a number of TX chains being smaller than the number of configured TX carrier/cells, (b) the UE not supporting the given frequency band combination, (c) a TX chain switching time, and/or (d) the UE being unable to fulfill the RF requirement due to one or more reasons such as power spectrum density (PSD) imbalance.

As specified in Rel-18 Work Item Description (WID) on NR sidelink evolution, increased sidelink data rate is one key requirement for commercial sidelink application. Sidelink CA and/or Frequency Range 2 (FR2) sidelink operation enhancement may be supported to achieve increased sidelink data rate. For example, a UE may have one or more configurations (e.g., pre-configuration(s)) of a plurality of carriers/cells, which are utilized for sidelink communication. In the present disclosure, the term "carriers/cells" may refer to carriers and/or cells. Sidelink data delivery between the UE and one or more paired UEs may be performed, (e.g., transmitted and/or received) in the plurality of sidelink carriers/cells. However, performing transmissions and/or receptions in more sidelink carriers/cells may induce more power consumption and higher processing complexity. To achieve balance, the UE may determine that (e.g., may assume that) a destination or a sidelink logical channel may be associated with a set of sidelink carriers/cells among the plurality of sidelink carriers/cells. The association may be configured per destination and/or per sidelink logical channel. The association may be different or the same for each destination or for each sidelink logical channel of the UE. The association may be provided (and/or configured) by a network (e.g. via a system information and/or via a dedicated sidelink configuration) and/or may be provided (and/or configured) by a Tx UE (e.g. via a PC5-Radio Resource Control (RRC) message provided by a unicast UE).

In an example, the UE may perform one or more sidelink unicast transmissions associated with a first destination (e.g., a paired UE). Sidelink data for the one or more sidelink unicast transmissions and/or for the first destination is available from one or more first sidelink logical channels of the UE. In some examples, the UE may have a first configuration related to (i) an association between a first set of sidelink carriers/cells and the first destination, and/or (ii) an association between a first set of sidelink carriers/cells and the one or more first sidelink logical channels. In some examples, the UE may perform one or more first sidelink unicast transmissions associated with different destinations (e.g., the one or more sidelink unicast transmissions may be associated with different sidelink logical channels, and/or may be associated with the same sets of sidelink carriers/cells or different sets of sidelink carriers/cells).

In an example, the UE may perform one or more sidelink groupcast transmissions associated with a second destination (e.g., a sidelink group). Sidelink data for the one or more sidelink groupcast transmissions and/or for the second destination is available from one or more second sidelink logical channels of the UE. In some examples, the UE may have a second configuration related to (i) an association between a second set of sidelink carriers/cells and the second destination, and/or (ii) an association between a second set of sidelink carriers/cells and the one or more second sidelink logical channels. In some examples, the UE may perform one or more first sidelink groupcast transmissions associated with different destinations (e.g., the one or more sidelink groupcast transmissions may be associated with different sidelink logical channels, and/or may be associated with the same sets of sidelink carriers/cells or different sets of sidelink carriers/cells).

In an example, the UE may perform one or more sidelink broadcast transmissions associated with a third destination. The third destination may correspond to a specific (e.g. layer-2) destination ID. Sidelink data of the one or more sidelink broadcast transmissions and/or for the third destination is available from one or more third sidelink logical channels of the UE. In some examples, the UE may have a third configuration related to (i) an association between a third set of sidelink carriers/cells and the third destination, and/or (ii) an association between a third set of sidelink carriers/cells and the one or more third sidelink logical channels. In some examples, the UE may perform one or more first sidelink broadcast transmissions associated with different destinations (e.g., the one or more sidelink broadcast transmissions may be associated with different sidelink logical channels, and/or may be associated with the same sets of sidelink carriers/cells or different sets of sidelink carriers/cells).

In an example, the UE may perform one or more sidelink transmissions associated with a fourth destination. Sidelink data for the one or more sidelink transmissions and/or for the fourth destination is available from one or more fourth sidelink logical channels of the UE. In some examples, the UE may not have a configuration related to an association between a set of sidelink carriers/cells and the fourth destination. The UE may determine that (e.g., consider that) the plurality of carriers/cells (e.g., all the plurality of carriers/cells) are associated with the fourth destination. The UE may determine (e.g., consider) the set of sidelink carriers/cells associated with the fourth destination to be the plurality of carriers/cells (e.g., all the plurality of carriers/cells). In some examples, the UE may not have a configuration related to an association between a set of sidelink carriers/cells and the one or more fourth sidelink logical channels. The UE may determine (e.g., consider) the set of sidelink carriers/cells associated with each of the one or more fourth sidelink logical channels to be the plurality of carriers/cells (e.g., all the plurality of carriers/cells).

In some examples, the plurality of sidelink carriers/cells comprises the first set of sidelink carriers/cells. In some examples, the plurality of sidelink carriers/cells comprises the second set of sidelink carriers/cells. In some examples, the plurality of sidelink carriers/cells comprises the third set of sidelink carriers/cells.

In some examples, a first UE may perform and/or may have support to perform any of the one or more first sidelink unicast transmissions, the one or more first sidelink groupcast transmissions, and/or the one or more first sidelink broadcast transmissions.

In accordance with some of the embodiments herein, Concepts A-C are provided.

Concept A

In Concept A, the first UE may have one or more configurations (e.g., one or more pre-configurations) of a plurality of carriers/cells, which are utilized for sidelink communication (e.g., sidelink communication of the first UE). The first UE may have a scheduled/reserved set of sidelink resources in a first sidelink carrier/cell among the plurality of sidelink carriers/cells. For example, the scheduled/reserved set of sidelink resources are in a same sidelink resource pool in (e.g., one sidelink BWP of) the first sidelink carrier/cell. The set of sidelink resources may be utilized for transmitting a same first sidelink data packet from the first UE. The first UE may perform one or more sidelink transmissions (e.g., data and/or shared transmissions) on the set of sidelink resources for transmitting the first sidelink data packet. The first sidelink data packet is generated by the first UE.

In some examples, the first UE may perform sidelink communication with one or more destinations. In some examples, the first UE may have a plurality of sidelink logical channels. In some examples, the first UE may have one or more sidelink logical channels with available sidelink data (e.g., sidelink data available for transmission). A sidelink logical channel (e.g., one sidelink logical channel) may be associated with a destination (among the one or more destinations, for example). In some examples, any two sidelink logical channels (of the o plurality of sidelink logical channels, for example) may be associated with different destinations or the same destination. In some examples, a sidelink logical channel (e.g., one sidelink logical channel) may be associated with a set of sidelink carriers/cells. In some examples, any two sidelink logical channels (of the plurality of sidelink logical channels, for example) may be associated with different sets of sidelink carriers/cells or the same set of sidelink carriers/cells. In some examples, any two sidelink logical channels (of the plurality of sidelink logical channels, for example) may be associated with two sets of sidelink carriers/cells, respectively, wherein a first set of the two sets is associated with a sidelink logical channel (e.g., one sidelink logical channel) comprising sidelink carriers/cells that are at least partially overlapping with or are distinct from sidelink carriers/cells of a second set of the two sets. Alternatively and/or additionally, in some examples, each sidelink logical channel of one or more first sidelink logical channels of the one or more sidelink logical channels may be associated with a respective set of sidelink carriers/cells, and one or more second sidelink logical channels of the one or more sidelink logical channels may not be associated with one or more (e.g., specific) sidelink carriers/cells (e.g., the set of sidelink carriers/cells). Alternatively and/or additionally, a destination (e.g., one destination) may be associated with a set of sidelink carriers/cells. In some examples, any two destinations may be associated with different sets of sidelink carriers/cells or the same set of sidelink carriers/cells. In some examples, any two destinations may be associated with two sets of sidelink carriers/cells, respectively, wherein a first set of the two sets may be associated with a destination (e.g., one destination) comprising sidelink carriers/cells that are at least partially overlapping with or are distinct from sidelink carriers/cells of a second set of the two sets associated with the other destination. In some examples, each destination of one, some and/or all of the one or more destinations may be associated with a set of sidelink carriers/cells.

In some examples, such as examples associated with the first UE generating the first sidelink data packet, the first UE may determine (e.g., derive) a set of sidelink logical channels among/from the one or more sidelink logical channels with available sidelink data (e.g., sidelink data available for transmission), and the first UE may perform sidelink logical channel prioritization among the set of the sidelink logical channels (e.g. a set or subset of the one or more sidelink logical channels). In some examples, the first UE may perform the sidelink logical channel prioritization by selecting/determining a sidelink logical channel with highest priority among the set of sidelink logical channels. In the present disclosure, the term "selecting/determining" may refer to selecting and/or determining. In some examples, the first UE may perform the sidelink logical channel prioritization by selecting/determining a destination associated with a sidelink logical channel with highest priority among the set of sidelink logical channels. Alternatively and/or additionally, the sidelink logical channel prioritization may include sidelink logical channel prioritization for a SCI corresponding to a sidelink data transmission (e.g., a new sidelink data transmission), the first UE selects a destination associated with sidelink logical channel(s) (e.g., the set of sidelink logical channels) that has sidelink data available and/or allowed to transmit on sidelink carrier/cell (e.g., the first sidelink carrier/cell) associated with the transmission and/or associated with the scheduled/reserved set of sidelink resources. In some examples, the first UE may not select a destination that is associated with a sidelink logical channel with sidelink data not allowed to transmit on the sidelink carrier/cell (e.g., the first sidelink carrier/cell) associated with the scheduled/reserved set of sidelink resources.

In some examples, such as examples when the first UE is generating the first sidelink data packet, the first UE may include/multiplex available sidelink data on the selected/determined sidelink logical channel in the first data packet. In the present disclosure, the term "selected/determined" may refer to selected and/or determined. In some examples, the first UE may set/determine/select a first destination of the first data packet based on the selected/determined sidelink logical channel. In the present disclosure, the term "set/determine/select" may refer to set, determine and/or select. In some examples, the first UE may set/determine/select a destination of the first sidelink data packet as the first destination, wherein the first destination is associated with the selected/determined sidelink logical channel.

In some embodiments with respect to Concept A, the first UE may determine, derive and/or select the set of sidelink logical channels based on the first sidelink carrier/cell and a set of sidelink carriers/cells (e.g., each set of sidelink carriers/cells) associated with each of the one or more sidelink logical channels. In some examples, the first UE may determine, derive and/or select the set of sidelink logical channels and/or the first destination based on the first sidelink carrier/cell and a set of sidelink carriers/cells (e.g., each set of sidelink carriers/cells) associated with each of the one or more sidelink logical channels and/or associated with each of the one or more destinations.

In one embodiment, the first UE may determine (e.g., derive) the set of sidelink logical channels based on a condition that the first sidelink carrier/cell of the scheduled/reserved set of sidelink resources is in one or more sets of sidelink carriers/cells (e.g., one or more defined sidelink carriers/cells) associated with the one or more sidelink logical channels. For example, if the first sidelink carrier/cell of the scheduled/reserved set of sidelink resources is in a set of sidelink carriers/cells associated with a sidelink logical channel of the one or more sidelink logical channels, the sidelink logical channel may be included in (and/or may be considered/determined to be included in) the set of sidelink logical channels. Alternatively and/or additionally, if the first sidelink carrier/cell of the scheduled/reserved set of sidelink resources is not in a set of sidelink carriers/cells associated with a sidelink logical channel of the one or more sidelink logical channels, the sidelink logical channel may not be included in (and/or may not be considered/determined to be included in) the set of sidelink logical channels.

In one embodiment, the first UE may determine (e.g., derive) the set of sidelink logical channels based on a condition that the first sidelink carrier/cell of the scheduled/reserved set of sidelink resources is in one or more sets of sidelink carriers/cells of one or more destinations (e.g., one or more defined destinations). For example, if the first sidelink carrier/cell of the scheduled/reserved set of sidelink resources is in a set of sidelink carriers/cells associated with a destination, sidelink logical channel(s) associated with the destination may be included in (and/or may be considered/determined to be included in) the set of sidelink logical channels. Alternatively and/or additionally, if the first sidelink carrier/cell of the scheduled/reserved set of sidelink resources is not in a set of sidelink carriers/cells associated with a destination, sidelink logical channel(s) associated with the destination may not be included in (and/or may not be considered/determined to be included in) the set of sidelink logical channels.

Alternatively and/or additionally, the first UE may select/determine/derive a destination (among one or more destinations, for example) for the scheduled/reserved set of sidelink resources (to perform a new transmission, for example) based on a condition that the set of sidelink carriers/cells associated/configured with sidelink logical channel(s) of the destination include the first sidelink carrier/cell of the scheduled/reserved set of sidelink resources. The first UE may not select a destination if and/or when the sidelink logical channels of the destination are not associated with (and/or are not allowed to be transmitted on) the first sidelink carrier/cell.

In some examples, the scheduled/reserved set of sidelink resources in the first sidelink carrier/cell may be provided, indicated and/or derived based on a sidelink grant (e.g., a dynamic sidelink grant).

Concept B

In Concept B, the first UE may have one or more configurations (e.g., one or more pre-configurations) of a plurality of carriers/cells, which are utilized for sidelink communication (e.g., sidelink communication of the first UE).

In some examples, the first UE may perform sidelink communication with one or more destinations comprising a first destination (and/or comprising one or more other destinations in addition to the first destination). In some examples, the first UE may be configured in (and/or may operate in) network scheduling mode (e.g. NR sidelink resource allocation mode 1) for acquiring sidelink resource(s) that may be utilized for sidelink communication with the first destination (and/or with one or more destinations in addition to the first destination). In some examples, the first UE may have a plurality of sidelink logical channels. In some examples, the first UE may or may not have one or more sidelink logical channels with available sidelink data (e.g., sidelink data available for transmission). A sidelink logical channel (e.g., one sidelink logical channel) may be associated with a destination (among the one or more destinations, for example). In some examples, any two sidelink logical channels (of the plurality of sidelink logical channels, for example) may be associated with different destinations or the same destination. In some examples, any two sidelink logical channels (of the plurality of sidelink logical channels, for example) may be associated with two sets of sidelink carriers/cells, respectively, wherein a first set of the two sets is associated with a sidelink logical channel (e.g., one sidelink logical channel) comprising sidelink carriers/cells that are at least partially overlapping with or are distinct from sidelink carriers/cells of a second set of the two sets. In some examples, a sidelink logical channel (e.g., one sidelink logical channel) may be associated with a set of sidelink carriers/cells. In some examples, any two sidelink logical channels (of the plurality of sidelink logical channels, for example) may be associated with different sets of sidelink carriers/cells or the same set of sidelink carriers/cells. Alternatively and/or additionally, in some examples, each sidelink logical channel of one or more first sidelink logical channels of the one or more sidelink logical channels may be associated with a respective set of sidelink carriers/cells, and one or more second sidelink logical channels of the one or more sidelink logical channels may not be associated with one or more (e.g., specific) sidelink carriers/cells. Alternatively and/or additionally, a destination (e.g., one destination) may be associated with a set of sidelink carriers/cells. In some examples, the first destination may be associated with a first set of sidelink carriers/cells. In some examples, any two destinations may be associated with different sets of sidelink carriers/cells or the same set of sidelink carriers/cells. In some examples, any two destinations may be associated with two sets of sidelink carriers/cells, respectively, wherein a first set of the two sets may be associated with a destination (e.g., one destination) comprising sidelink carriers/cells that are at least partially overlapping with or are distinct from sidelink carriers/cells of a second set of the two sets associated with the other destination. In some examples, each destination of one, some and/or all of the one or more destinations may be associated with a set of sidelink carriers/cells.

In some examples, when the first UE determines a sidelink message for transmission to a first destination (e.g., when the first UE derives and/or has the sidelink message for transmission to the first destination, such as in a scenario in which the first UE has the sidelink message available for transmission to the first destination), the first UE may trigger a SR to network. For example, the first UE may trigger the SR to the network when the first UE does not have sidelink resource for transmitting the sidelink message. In some examples, the first UE may trigger the SR to the network in response to being triggered by a different entity different than the first UE (e.g., the different entity may trigger the first UE to trigger the SR to the network based on the first UE having the sidelink message available for transmission to the first destination and/or the first UE not having sidelink resource for transmitting the sidelink message to the first destination). For example, the SR to the network may be triggered by (e.g., triggered in response to) the sidelink message. Alternatively and/or additionally, the first UE may receive a sidelink message request, and may determine to generate (and/or transmit, for example) the sidelink message (e.g., the first UE may generate the sidelink message in response to the sidelink message request). The SR to the network may be triggered in response to the sidelink message request associated with the sidelink message. In some examples, the first UE may receive the sidelink message request from the first destination.

In some examples, the sidelink message may not trigger sidelink buffer status report to the network. In some examples, the sidelink message may be different from sidelink buffer status report. In some examples, the sidelink message does not comprise sidelink buffer status report. In some examples, the sidelink message is not taken into consideration when triggering and/or generating a sidelink buffer status report. In some examples, the sidelink message does not comprise sidelink data from sidelink logical channel(s). In some examples, the sidelink message does not comprise sidelink data from Packet Data Convergence Protocol (PDCP) and/or Radio Link Control (RLC) layer. In some examples, the sidelink message does not belong to sidelink logical channel(s). In some examples, the sidelink message may comprise sidelink report, sidelink request and/or sidelink command. In some examples, the sidelink message may comprise sidelink CSI report, channel Quality Indicator, Rank Indicator, precoding Matrix Indicator, Reference Signal Received Power (RSRP) value, Power Headroom Report (PHR) value, inter-UE coordination information, and/or inter-UE coordination request. In some examples, the sidelink message may comprise sidelink report delivered from physical layer. In some examples, the sidelink message may be included in a sidelink MAC CE and/or the sidelink message may be a sidelink MAC CE. In some examples, the sidelink message is assembled into a sidelink MAC PDU, wherein the sidelink MAC PDU comprises the sidelink MAC CE.

In some examples, the first UE may transmit a signaling of the SR to the network.

In a first method of Concept B, the signaling of the SR may comprise (e.g., indicate and/or provide) information associated with the first destination and/or information associated with a first sidelink carrier/cell associated with the first destination. The first sidelink carrier/cell may be associated with (e.g., may be included in) the first set of sidelink carriers/cells associated with the first destination. In some examples, the signaling of the SR may comprise information associated with the first destination and/or information associated with the first set of sidelink carriers/cells associated with the first destination.

In one embodiment, uplink resource of the signaling of the SR may be determined (e.g., derived) based on the first destination and/or based on the first sidelink carrier/cell associated with the first destination. In some examples, the uplink resource of the signaling of the SR may be determined (e.g., derived) based on a first SR configuration associated with the first destination and/or the first sidelink carrier/cell. For example, the first UE may be provided (and/or configured), by the network, with different SR configurations for different destinations (e.g., different sets of destinations). Each destination (and/or each set of destinations) may be associated with different SR configurations (e.g. associated with different SR indexes). In response to a triggered SR of the first destination, the first UE may transmit a signaling of the triggered SR on a PUCCH resource associated with a SR configuration of the first destination.

In one embodiment, the signaling of the SR may comprise a field and/or a set of bits (e.g., a set of one or more bits) for indicating information associated with the first destination and/or information associated with the first sidelink carrier/cell.

In some examples, the first UE may determine the first sidelink carrier/cell (e.g., select the first sidelink carrier/cell from the first set of sidelink carriers/cells) by UE implementation. Alternatively and/or additionally, the first UE may determine the first sidelink carrier/cell as any sidelink carrier/cell in the first set of sidelink carriers/cells (e.g., the first sidelink carrier/cell may correspond to any one sidelink carrier/cell in the first set of sidelink carriers/cells). Alternatively and/or additionally, the first UE may determine the first sidelink carrier/cell to be a sidelink carrier/cell with lowest Channel Busy Ratio (CBR) in the first set of sidelink carriers/cells (e.g., the first UE may select the first sidelink carrier/cell from the first set of sidelink carriers/cells based on the first sidelink carrier/cell having the lowest CBR in the first set of sidelink carriers/cells). Alternatively and/or additionally, the first UE may determine the first sidelink carrier/cell to be a sidelink carrier/cell with a lowest carrier/cell index/identity (e.g., lowest SL-Freq-Id and/or lowest SL carrier/cell Id)) in the first set of sidelink carriers/cells (e.g., the first UE may select the first sidelink carrier/cell from the first set of sidelink carriers/cells based on the first sidelink carrier/cell having the lowest carrier/cell index/identity in the first set of sidelink carriers/cells). In the present disclosure, the term "index/identity" may refer to index and/or identity. Alternatively and/or additionally, the first UE may determine the first sidelink carrier/cell to be an activated sidelink carrier/cell in the first set of sidelink carriers/cells.

In some examples, when (and/or after) the network receives/detects the signaling of the SR, the network may schedule one or more sidelink resources in the first sidelink carrier/cell to the first UE (e.g., the one or more sidelink resources may be scheduled to the first UE via a sidelink grant from the network allocating/indicating/scheduling the one or more sidelink resources in the first sidelink carrier/cell). In the present disclosure, the term "allocating/indicating/scheduling" may refer to allocating, indicating, and/or scheduling. In some examples, the one or more sidelink resources (scheduled by the network) are in a same sidelink resource pool in the first sidelink carrier/cell. In some examples, the one or more sidelink resources (scheduled by the network) are in a same sidelink resource pool in one sidelink BWP of the first sidelink carrier/cell. The first device may utilize the one or more sidelink resources (scheduled by the network) for transmitting the sidelink message.

Alternatively and/or additionally, the network may determine (e.g., may know) the association between the first destination and the first set of sidelink carriers/cells. When the signaling of the SR comprises information associated with the first destination, the network may schedule one or more sidelink resources in a sidelink carrier/cell (e.g., one sidelink carrier/cell) in the first set of sidelink carriers/cells (e.g., the one or more sidelink resources may be scheduled via a sidelink grant from the network allocating/indicating/scheduling the one or more sidelink resources in the sidelink carrier/cell). In some examples, the one or more sidelink resources (scheduled by the network) are in a same sidelink resource pool in the sidelink carrier/cell (e.g., the one sidelink carrier/cell). In some examples, the one or more sidelink resources (scheduled by the network) are in a same sidelink resource pool in one sidelink BWP of the sidelink carrier/cell (e.g., the one sidelink carrier/cell). In some examples, the network may determine the first sidelink carrier/cell to be the sidelink carrier/cell (e.g., the one sidelink carrier/cell) in the first set of sidelink carriers/cells. Alternatively and/or additionally, the network may determine the sidelink carrier/cell (e.g., the one sidelink carrier/cell) to be a sidelink carrier/cell with lowest CBR in the first set of sidelink carriers/cells (e.g., the network may select the sidelink carrier/cell from the first set of sidelink carriers/cells based on the sidelink carrier/cell having the lowest CBR in the first set of sidelink carriers/cells). Alternatively and/or additionally, the network may determine the sidelink carrier/cell (e.g., the one sidelink carrier/cell) to be a sidelink carrier/cell with a lowest carrier/cell index/identity (e.g., lowest SL-Freq-Id and/or lowest SL carrier/cell Id) in the first set of sidelink carriers/cells (e.g., the network may select the sidelink carrier/cell from the first set of sidelink carriers/cells based on the sidelink carrier/cell having the lowest carrier/cell index/identity in the first set of sidelink carriers/cells). Alternatively and/or additionally, the network may determine the sidelink carrier/cell (e.g., the one sidelink carrier/cell) to be an activated sidelink carrier/cell in the first set of sidelink carriers/cells.

In some examples, the SR is transmitted via PUCCH. In some examples, the signaling of the SR is transmitted via PUCCH. In some examples, the signaling of the SR is PUCCH. In some examples, the uplink resource of the signaling of the SR is PUCCH resource.

In some examples, the first SR configuration may be associated with the sidelink message, and/or may be associated with transmitting (and/or a size requirement, reason and/or need of transmitting) the sidelink message. In some examples, the first SR configuration index/identity may be associated with the sidelink message (e.g., the first SR configuration index/identity may be the only SR configuration index/identity associated with the sidelink message and/or the sidelink message may be the only sidelink message associated with the first SR configuration index/identity). In some examples, the first SR configuration index/identity may or may not be associated with sidelink logical channel.

In some examples, the SR may indicate a size requirement, a reason and/or a need associated with the sidelink message (e.g., a data size requirement associated with the sidelink message, such as an amount of data of a transmission of the sidelink message and/or an amount of time and/or resources for transmitting the sidelink message). In some examples, the SR may indicate a small size requirement (e.g., a need of small size of sidelink resource). In some examples, the small size requirement may be indicative of a size of one or more sidelink resources needed to transmit the sidelink message. In some examples, the small size requirement may be indicative of a size (e.g., sidelink resource size) that is at least the size of the sidelink message. The small size requirement may be a defined (e.g., a fixed, specified and/or configured, such as pre-configured) value. In some examples, the small size may be 2 bytes, 4 bytes, 6 bytes, 8 bytes, and/or 10 bytes.

In some examples, if the first device also has sidelink buffer status report (e.g., a regular sidelink buffer status report) to be transmitted to the network, the sidelink SR may indicate a normal/large size requirement that indicates a size larger than a size indicated by the small size requirement. In the present disclosure, the term "normal/large" may refer to normal and/or large. In some examples, the normal/large size requirement may be indicative of a size of one or more sidelink resources needed to transmit the sidelink message and the sidelink buffer status report. In some examples, the normal/large size requirement may be indicative of a size (e.g., sidelink resource size) that is at least a sum of the size of the sidelink message and the size of the sidelink buffer status report.

In some examples, the first UE transmits the SR to the network when the first device does not have available uplink resource for performing Physical Uplink Shared Channel (PUSCH) transmission. Alternatively and/or additionally, the first UE transmits the sidelink SR to network even when the first device has available uplink resource for performing PUSCH transmission.

In some examples, when (and/or if) the first UE has available sidelink resource for transmitting the sidelink message to the first destination, the first UE may not trigger the SR to network. The first device may utilize the available sidelink resource for transmitting the sidelink message.

In some examples, when the first UE triggers and/or generates a sidelink buffer status report for sidelink logical channels with available sidelink data, the sidelink buffer status report does not indicate a size requirement, a reason and/or a need associated with the sidelink message, and/or the sidelink buffer status report is not triggered in response to the sidelink message.

In some examples, the sidelink message may comprise a sidelink report, a sidelink request and/or a sidelink command. In some examples, the sidelink report (comprised in the sidelink message and/or in the sidelink MAC CE comprising the sidelink message) may be generated based on a measurement and/or a sensing result in a first sidelink resource pool in the first sidelink carrier/cell (e.g., in the one sidelink BWP of the first sidelink carrier/cell). In some examples, the sidelink report (comprised in the sidelink message and/or in the sidelink MAC CE comprising the sidelink message) may be generated in response to the sidelink message request received in the first sidelink resource pool in the first sidelink carrier/cell (e.g., in the one sidelink BWP of the first sidelink carrier/cell). In some examples, the sidelink report (comprised in the sidelink message and/or in the sidelink MAC CE comprising the sidelink message) may be generated in response to the sidelink message request from the first destination.

In some examples, the sidelink request and/or the sidelink command (comprised in the sidelink message and/or in the sidelink MAC CE comprising the sidelink message) may be generated and/or utilized for the first sidelink resource pool in the first sidelink carrier/cell (e.g., in the one sidelink BWP of the first sidelink carrier/cell). In some examples, the sidelink request and/or the sidelink command (comprised in the sidelink message and/or in the sidelink MAC CE comprising the sidelink message) may be generated and/or utilized for the first sidelink carrier/cell. In some examples, the sidelink request and/or the sidelink command (comprised in the sidelink message and/or in the sidelink MAC CE comprising the sidelink message) may be generated and/or utilized for the first destination.

In a second method of Concept B, the sidelink message may comprise information associated with the first sidelink carrier/cell and/or the first sidelink resource pool in the first sidelink carrier/cell (e.g., in the one sidelink BWP of the first sidelink carrier/cell). For example, the sidelink report (comprised in the sidelink message and/or in the sidelink MAC CE comprising the sidelink message) may be generated based on a measurement and/or a sensing result in the first sidelink resource pool in the first sidelink carrier/cell (e.g., in the one sidelink BWP of the first sidelink carrier/cell). In some examples, the sidelink report (comprised in the sidelink message and/or in the sidelink MAC CE comprising the sidelink message) may be generated in response to the sidelink message request received in the first sidelink resource pool in the first sidelink carrier/cell (e.g., in the one sidelink BWP of the first sidelink carrier/cell). In some examples, the sidelink request and/or the sidelink command (comprised in the sidelink message and/or in the sidelink MAC CE comprising the sidelink message) may be generated and/or utilized for the first sidelink resource pool in the first sidelink carrier/cell (e.g., in the one sidelink BWP of the first sidelink carrier/cell). In some examples, the sidelink request and/or the sidelink command (comprised in the sidelink message and/or in the sidelink MAC CE comprising the sidelink message) may be generated and/or utilized for the first sidelink carrier/cell.

In one embodiment, the information associated with the first sidelink carrier/cell may comprise (and/or may be) SL-Freq-Id or SL carrier/cell Id of the first sidelink carrier/cell. In some examples, the information associated with the first sidelink resource pool may be sidelink resource pool index/identity.

In one embodiment, the information associated with the first sidelink carrier/cell may comprise (and/or may be) an order of putting/including the sidelink report, the sidelink request, and/or the sidelink command into the sidelink message and/or into the sidelink MAC CE comprising the sidelink message, wherein the order may be based on SL-Freq-Id or SL carrier/cell Id of the first sidelink carrier/cell (e.g., ascending order or descending order). In the present disclosure, the term "putting/including" may refer to putting (e.g., inserting) and/or including.

In one embodiment, the information associated with the first sidelink carrier/cell may comprise (and/or may be) an order of one or more timings associated with generating, triggering and/or requesting the sidelink report, the sidelink request, and/or the sidelink command in the sidelink message and/or in the sidelink MAC CE comprising the sidelink message. In some examples, sidelink report(s)/sidelink request(s)/sidelink command(s) in the sidelink message may be non-out-of-dated (e.g., non-expired, and/or currently valid) (e.g., sidelink report(s)/sidelink request(s)/sidelink command(s) in the sidelink message may correspond to non-out-of-dated report(s)/request(s)/command(s)). In some examples, sidelink message(s) in the sidelink MAC CE may correspond to non-out-of-dated sidelink message(s). In some examples, sidelink report(s)/request(s)/command(s) in the sidelink message corresponds to one or more report(s)/request(s)/command(s) (e.g., triggered report(s)/request(s)/command(s)) which are not cancelled. In some examples, sidelink message(s) in the sidelink MAC CE correspond to sidelink message(s) (e.g., triggered sidelink message(s)) which are not cancelled. In some examples, when the timing for transmitting the sidelink message is after (e.g., later than) a CSI validation time after a triggered timing for a sidelink report/request/command and/or a timing for receiving Channel State Information-Reference Signal (CSI-RS) associated with the sidelink report/request/command, the UE does not include the sidelink report into the sidelink message, the sidelink report/request/command may be out-of-dated, and/or the sidelink report/request/command may be cancelled by the UE.

In some examples, the sidelink message (and/or the sidelink MAC CE comprising the sidelink message) may comprise one or more sidelink reports, one or more sidelink requests and/or one or more sidelink commands. In some examples, the one or more sidelink reports, the one or more sidelink requests and/or the one or more sidelink commands may correspond to one or more sidelink carrier/cells.

In some examples, when the first UE receives one or more requests in same time/slot, the order of one or more reports associated with the one or more requests may be based on SL-Freq-Id and/or SL carrier/cell Id of sidelink carrier/cell (e.g., ascending order or descending order) and/or based on resource pool index/identity. In an example, for the one or more requests, the order of one or more reports may be based on SL-Freq-Id or SL carrier/cell Id of sidelink carrier/cell and for same carrier/cell index/identity based on (e.g., followed by) resource pool index/identity. For example, for requests that are associated with different sidelink carriers/cells, an order of reports associated with the requests may be determined based on SL-Freq-Id and/or SL carrier/cell Id values of the different sidelink carriers/cells. Alternatively and/or additionally, for requests that are associated with the same sidelink carrier/cell index/identity (e.g., requests associated with the same values of SL-Freq-Id and/or SL carrier/cell Id), an order of reports associated with the requests may be determined based on resource pool indexes/identities associated with the requests.

In some examples, one or more requests are associated with a same paired/peer UE/destination/unicast link. In the present disclosure, the term "paired/peer" may refer to paired and/or peer. In the present disclosure, the term "UE/destination/unicast link" may refer to UE, destination and/or unicast link.

In some examples, one or more requests are associated with different sidelink resource pools.

In some examples, one or more requests are associated with different sidelink carrier/cells.

In some examples, the one or more timings associated with generating, triggering and/or requesting the sidelink report, the sidelink request, and/or the sidelink command may comprise a slot where the first UE receives a request (e.g., a request to provide the sidelink report, the sidelink request and/or the sidelink command), a starting sidelink symbol of the slot and/or an ending sidelink symbol of the slot.

In some examples, based on the information provided by the sidelink message (e.g., information explicitly indicated and/or implicitly indicated by the sidelink message), a paired/peer UE (e.g., a UE that is paired with the first UE) and/or the requested UE (e.g., the first UE) may identify which sidelink carriers/cells are associated with the one or more reports.

For example, the first UE may be scheduled by the network node to transmit on a third sidelink carrier/cell (e.g., transmit the sidelink message on the third sidelink carrier/cell). The first UE may receive two requests from a same destination (e.g., a second UE). In some examples, a first request of the two requests is associated with (e.g., transmitted along with) a sidelink transmission on the first carrier/cell. In some examples, a second request of the two requests is associated with (e.g., transmitted along with) another sidelink transmission on a second carrier/cell. In some examples, the sidelink transmission is in slot n. In some examples, the another sidelink transmission is in slot m. In some examples, slot m is after (e.g., later than) slot n. In some examples, the second carrier/cell has a higher carrier frequency than the first carrier/cell. In some examples, the second carrier/cell has a higher SL-Freq-Id or SL carrier/cell Id than the first carrier/cell. In some examples, the sidelink message transmitted on the third sidelink carrier/cell may comprise a first report associated with the first request and a second report associated with the second request. In some examples, the sidelink message is transmitted to the second UE (e.g., destination is set to the second UE). The first report comprises CSI, Rank Indicator (RI) associated with the first carrier/cell and/or SL-Freq-Id or SL carrier/cell Id of the first carrier/cell. The second report comprises CSI, RI associated with the second carrier/cell and/or SL-Freq-Id or SL carrier/cell Id of the second carrier/cell. Alternatively and/or additionally, in some examples, the first report and the second report do not comprise explicit indications of SL-Freq-Id or SL carrier/cell Id. The first UE would set or place the first report earlier than the second report (e.g., a position of the first report in the sidelink message may be at least one of above, before, earlier than, etc. a position of the second report in the sidelink message). Criteria and/or reasoning for setting the first report earlier than the second report may correspond to an order of SL-Freq-Id or SL carrier/cell Id of the first cell/carrier and the second cell/carrier. Alternatively and/or additionally, criteria and/or reasoning for setting the first report earlier than the second report may correspond to an order of carrier frequency of the first cell/carrier and the second cell/carrier. Alternatively and/or additionally, criteria and/or reasoning for setting the first report earlier than the second report may correspond to an order of timings associated with the sidelink transmission and the another sidelink transmission (e.g., slot n is earlier than slot m). In some examples, the first carrier/cell, the second carrier/cell and/or the third carrier/cell may be used for sidelink communication between the first UE and the second UE. In some examples, the third carrier/cell may be the same as the first carrier/cell or may be the same as the second carrier/cell. In some examples, the first UE may transmit the sidelink message in slot k (on the third sidelink carrier/cell, for example). In some examples, if the first report is cancelled, the sidelink message may comprise the second report (e.g., if the first report is cancelled, the sidelink message may comprise only the second report, and/or may not comprise the first report). In some examples, a time interval between slot k and slot n may exceed a validation time for the first report. In some examples, when time interval between slot k and slot n exceeds validation time for the first report, the first report is canceled (and/or is considered not to be included in the sidelink message). In an example, when the second carrier is removed from a list of SL-Freq-Id, the first UE may ignore and/or drop the second report. In some examples, the first UE and the second UE may be associated with a same list of SL-Freq-Id. In some examples, a list of SL-Freq-Id associated with the first UE is indicative of SL-Freq-Id values of one or more carriers/cells that the first UE may use for performing sidelink transmission. In some examples, the first UE may exchange information of its own list of SL-Freq-Id with the second UE. For example, the first UE may be configured with a first list of SL-Freq-Id and the second UE may be configured with a second list of SL-Freq-Id. The first UE may transmit information related to the first list to the second UE. For example, the first UE may transmit the information related to the first list to the second UE before the first UE transmits the sidelink message and/or in response to (e.g., upon) the first UE constructing a unicast link with the second UE. In some examples, an order of reports in the sidelink message (e.g., an order in which sidelink reports are arranged in the sidelink message) is based on the first list (associated with the first UE transmitting the sidelink message). For example, the order of reports may be based on SL-Freq-Id values, as indicated by the first list, associated with the first carrier/cell and the second carrier/cell (e.g., the order of reports may be based on an ascending order or descending order of the SL-Freq-Id values associated with the first carrier/cell and the second carrier/cell). In some examples, the second UE may transmit information related to the second list to the first UE. For example, the second UE may transmit the information related to the second list to the first UE before the first UE transmits the sidelink message and/or in response to (e.g., upon) the first UE constructing a unicast link with the second UE. In some examples, an order of reports in the sidelink message (e.g., an order in which sidelink reports are arranged in the sidelink message) is based on the second list (associated with a UE, such as the second UE, that transmits a request). For example, the order of reports may be based on SL-Freq-Id values, as indicated by the second list, associated with the first carrier/cell and the second carrier/cell (e.g., the order of reports may be based on an ascending order or descending order of the SL-Freq-Id values associated with the first carrier/cell and the second carrier/cell).

In some examples, embodiments disclosed herein, such as embodiments described with respect to the first method and the second method of Concept B, may be implemented independently and/or separately. Alternatively and/or additionally, a combination of embodiments described herein, such as embodiments described with respect to the first method and the second method of Concept B, may be implemented. Alternatively and/or additionally, a combination of embodiments described herein, such as embodiments described with respect to the first method and the second method of Concept B, may be implemented concurrently and/or simultaneously.

In an example, the signaling of the SR may comprise information associated with the first destination and/or information associated with the first set of sidelink carriers/cells associated with the first destination. The first UE may receive a sidelink grant from the network. The sidelink grant may allocate/indicate/schedule one or more sidelink resources in a second sidelink resource pool in a second sidelink carrier/cell. In the present disclosure, the term "allocate/indicate/schedule" may refer to allocate, indicate and/or schedule. The second sidelink carrier/cell may be in the first set of sidelink carriers/cells. The first device may utilize the one or more sidelink resources (in the second sidelink resource pool in the second sidelink carrier/cell) for transmitting the sidelink message (e.g., the first device may perform a transmission of the sidelink message using the one or more sidelink resources), wherein the sidelink message may comprise information associated with the first sidelink carrier/cell and/or the first sidelink resource pool in the first sidelink carrier/cell (e.g., in the one sidelink BWP of the first sidelink carrier/cell). When the first destination receives the sidelink message from the one or more sidelink resources (in the second sidelink resource pool in the second sidelink carrier/cell), the first destination may determine (e.g., may know) that one or more contents of the sidelink message (e.g., the sidelink report, sidelink request and/or sidelink command in the sidelink message) is for the first sidelink resource pool and/or for the first sidelink carrier/cell (e.g., the first destination may determine that the one or more contents of the sidelink message are for the first sidelink resource pool and/or for the first sidelink carrier/cell based on the information, associated with the first sidelink carrier/cell and/or the first sidelink resource pool, included in the sidelink message).

In another example, the signaling of the SR may not comprise information associated with the first destination and may not comprise information associated with the first set of sidelink carriers/cells associated with the first destination. The first UE may receive a sidelink grant from the network. The sidelink grant may allocate/indicate/schedule one or more sidelink resources in a second sidelink resource pool in a second sidelink carrier/cell. The second sidelink carrier/cell may or may not be in the first set of sidelink carriers/cells. The first device may utilize the one or more sidelink resources (in the second sidelink resource pool in the second sidelink carrier/cell) for transmitting the sidelink message (e.g., the first device may perform a transmission of the sidelink message using the one or more sidelink resources), wherein the sidelink message may comprise information associated with the first sidelink carrier/cell and/or the first sidelink resource pool in the first sidelink carrier/cell (e.g., in the one sidelink BWP of the first sidelink carrier/cell). When the first destination receives the sidelink message from the one or more sidelink resources (in the second sidelink resource pool in the second sidelink carrier/cell), the first destination may determine (e.g., may know) that one or more contents of the sidelink message (e.g., the sidelink report, sidelink request and/or sidelink command in the sidelink message) is for the first sidelink resource pool and/or for the first sidelink carrier/cell.

Concept C

In Concept C, the first UE may have one or more configurations (e.g., one or more pre-configurations) of a plurality of carriers/cells, which are utilized for sidelink communication (e.g., sidelink communication of the first UE).

In some examples, the first UE may perform sidelink communication with one or more destinations, comprising a first destination (and/or one or more other destinations in addition to the first destination). In some examples, a destination (e.g., one destination) may be associated with a set of sidelink carriers/cells. In some examples, any two destinations may be associated with different sets of sidelink carriers/cells or the same set of sidelink carriers/cells. In some examples, any two destinations may be associated with two sets of sidelink carriers/cells, respectively, wherein a first set of the two sets may be associated with a destination (e.g., one destination) comprising sidelink carriers/cells that are at least partially overlapping with or are distinct from sidelink carriers/cells of a second set of the two sets associated with the other destination. In some examples, each destination of one, some and/or all of the one or more destinations may be associated with a set of sidelink carriers/cells.

In some examples, the first UE may have sidelink Discontinuous Reception (DRX)configurations/parameters/patterns associated with the one or more destinations respectively. In the present disclosure, the term "configuration/parameter/pattern" refers to a configuration, a parameter and/or a pattern. In an example, the first UE may have a first sidelink DRX configuration/parameter/pattern associated with the first destination. The first UE may have a second sidelink DRX configuration/parameter/pattern associated with the second destination.

In a first direction of Concept C, the first UE may perform sidelink DRX operation based on the sidelink DRX configurations/parameters/patterns associated with the one or more destinations and/or the sets of sidelink carriers/cells associated with the one or more destinations. For example, the first UE may perform sidelink DRX operation in a first set of sidelink carriers/cells (e.g., the first UE may perform sidelink DRX operation in one or more activated sidelink carriers/cells within the first set of sidelink carriers/cells) based on a first sidelink DRX configuration/parameter/pattern, wherein the first set of sidelink carriers/cells and the first sidelink DRX configuration/parameter/pattern are associated with the first destination. In some examples, the first UE may not perform sidelink DRX operation in a sidelink carrier/cell outside the first set of sidelink carriers/cells (e.g., the first UE may not perform sidelink DRX operation in another set of sidelink carriers/cells that is different than and/or not within the first set of sidelink carriers/cells) based on the first sidelink DRX configuration/parameter/pattern. In some examples, the first UE may perform sidelink DRX operation in a second set of sidelink carriers/cells (e.g., the first UE may perform sidelink DRX operation in one or more activated sidelink carriers/cells within the second set of sidelink carriers/cells) based on a second sidelink DRX configuration/parameter/pattern, wherein the second set of sidelink carriers/cells and the second sidelink DRX configuration/parameter/pattern are associated with a second destination. In some examples, the first UE may not perform sidelink DRX operation in a sidelink carrier/cell outside the second set of sidelink carriers/cells (e.g., the first UE may not perform sidelink DRX operation in another set of sidelink carriers/cells that is different than and/or not within the second set of sidelink carriers/cells) based on the second sidelink DRX configuration/parameter/pattern.

In one embodiment, the first UE may determine (e.g., derive) a first sidelink active time based on the first sidelink DRX configuration/parameter/pattern. With the first sidelink active time, the first UE may monitor/detect/receive one or more SCIs in the first set of sidelink carriers/cells (e.g., the first UE may monitor/detect/receive one or more SCIs in one or more activated sidelink carriers/cells within the first set of sidelink carriers/cells). In the present disclosure, the term "monitor/detect/receive" may refer to monitor, detect and/or receive. In some examples, the first UE may not monitor/detect/receive one or more SCIs in a sidelink carrier/cell outside the first set of sidelink carriers/cells, in response to the first sidelink active time (e.g., during the first sidelink active time, the first UE may monitor/detect/receive using the first set of sidelink carriers/cells, and/or may not monitor/detect/receive outside the first set of sidelink carriers/cells). In some examples, the first UE may determine (e.g., derive) a second sidelink active time based on the second sidelink DRX configuration/parameter/pattern. With the second sidelink active time, the first UE may monitor/detect/receive one or more SCIs in the second set of sidelink carriers/cells (e.g., the first UE may monitor/detect/receive one or more SCIs in one or more activated sidelink carriers/cells within the second set of sidelink carriers/cells). In some examples, the first UE may not monitor/detect/receive one or more SCIs in a sidelink carrier/cell outside the second set of sidelink carriers/cells, in response to the second sidelink active time (e.g., during the second sidelink active time, the first UE may monitor/detect/receive using the second set of sidelink carriers/cells, and/or may not monitor/detect/receive outside the second set of sidelink carriers/cells). In some examples, when (and/or if) there is overlapping between the first sidelink active time and the second sidelink active time (e.g., overlapped timings in both the first sidelink active time and the second sidelink active time), during the overlapped timings in both the first sidelink active time and the second sidelink active time, the first UE may monitor/detect/receive one or more SCIs in the first set of sidelink carriers/cells and the second set of sidelink carriers/cells (e.g., during the overlapped timings in both the first sidelink active time and the second sidelink active time, the first UE may monitor/detect/receive one or more SCIs in (i) one or more activated sidelink carriers/cells within the first set of sidelink carriers/cells and/or (ii) one or more activated sidelink carriers/cells within the second set of sidelink carriers/cells). In some examples, the first set of sidelink carriers/cells and the second set of sidelink carriers/cells may be independent and/or separate from each other, or the first set of sidelink carriers/cells may at least partially overlap with the second set of sidelink carriers/cells.

In a second direction of Concept C, the first UE may perform sidelink DRX operation in the plurality of carriers/cells (e.g., the first UE may perform sidelink DRX operation in one or more activated sidelink carriers/cells within the plurality of carriers/cells) based on the sidelink DRX configurations/parameters/patterns associated with the one or more destinations. In some examples, the first UE may not perform sidelink DRX operation based on the sets of sidelink carriers/cells associated with the one or more destinations. For example, the first UE may perform sidelink DRX operation in the plurality of carriers/cells based on a first sidelink DRX configuration/parameter/pattern associated with the first destination (e.g., the first UE may perform sidelink DRX operation, based upon the first sidelink DRX configuration/parameter/pattern, in one or more activated sidelink carriers/cells within the plurality of carriers/cells). The first UE may perform sidelink DRX operation in a sidelink carrier/cell (e.g., an activated sidelink carrier/cell) outside a first set of sidelink carriers/cells based on the first sidelink DRX configuration/parameter/pattern, wherein the first set of sidelink carriers/cells is associated with the first destination. The first UE may perform sidelink DRX operation in the plurality of carriers/cells based on a second sidelink DRX configuration/parameter/pattern (e.g., the first UE may perform sidelink DRX operation, based upon the second sidelink DRX configuration/parameter/pattern, in one or more activated sidelink carriers/cells within the plurality of carriers/cells), wherein the second sidelink DRX configuration/parameter/pattern is associated with a second destination. The first UE may perform sidelink DRX operation in a sidelink carrier/cell (e.g., an activated sidelink carrier/cell) outside a second set of sidelink carriers/cells based on the second sidelink DRX configuration/parameter/pattern, wherein the second set of sidelink carriers/cells is associated with the second destination.

With respect to one or more embodiments provided herein, such as embodiments of the first direction and/or the second direction of Concept C, in some examples, a sidelink DRX configuration (e.g., a first sidelink DRX configuration of the first sidelink DRX configuration/parameter/pattern) may comprise a parameter of sidelink on-duration timer, a parameter of sidelink inactivity timer, a timing offset for sidelink on-duration, and/or sidelink DRX cycle. In some examples, a sidelink DRX parameter (e.g., a first sidelink DRX parameter of the first sidelink DRX configuration/parameter/pattern) may comprise and/or may correspond to (e.g., may be and/or may refer to) a parameter of sidelink on-duration timer, a parameter of sidelink inactivity timer, a timing offset for sidelink on-duration, and/or sidelink DRX cycle. In some examples, a sidelink active time (e.g., the first sidelink active time and/or the second sidelink active time) includes one or more timings (e.g., slots, time periods, etc.) in which a corresponding timer is running (e.g., the corresponding timer may correspond to a sidelink on-duration timer and/or a sidelink inactivity timer, such as a sidelink on-duration timer and/or a sidelink inactivity timer corresponding to a destination and/or a sidelink logical channel associated with the destination). In some examples, the sidelink DRX pattern (e.g., a first sidelink DRX pattern of the first sidelink DRX configuration/parameter/pattern) may comprise and/or may correspond to (e.g., may be and/or may refer to) a time pattern of the sidelink active time and/or sidelink non-active time within one sidelink DRX cycle.

One, some and/or all of the foregoing examples, concepts, techniques and/or embodiments can be formed and/or combined to a new embodiment.

In some examples, embodiments disclosed herein, such as embodiments described with respect to Concept A, Concept B and Concept C, may be implemented independently and/or separately. Alternatively and/or additionally, a combination of embodiments described herein, such as embodiments described with respect to Concept A, Concept B and/or Concept C, may be implemented. Alternatively and/or additionally, a combination of embodiments described herein, such as embodiments described with respect to Concept A, Concept B and/or Concept C, may be implemented concurrently and/or simultaneously.

Various techniques, embodiments, methods and/or alternatives of the present disclosure may be performed independently and/or separately from one another. Alternatively and/or additionally, various techniques, embodiments, methods and/or alternatives of the present disclosure may be combined and/or implemented using a single system. Alternatively and/or additionally, various techniques, embodiments, methods and/or alternatives of the present disclosure may be implemented concurrently and/or simultaneously.

With respect to one or more embodiments herein, such as one or more techniques, devices, concepts, methods, example scenarios and/or alternatives described above, the plurality of carriers/cells may be activated. In some examples, the plurality of carriers/cells may comprise some or all configured carrier/cells for the first UE. In some examples, for each of the plurality of carriers/cells, the first UE may be capable of simultaneously transmitting a corresponding maximum number of sidelink feedback transmissions. The maximum number of sidelink feedback transmissions may be the same or different for different carriers/cells (e.g., the capability corresponding to the maximum number of sidelink feedback transmissions may be the same or different for different carriers/cells). In some examples, for each of the plurality of carriers/cells, the first UE may be capable of transmitting at most one sidelink data transmission in one Transmission Time Interval (TTI)/occasion. In the present disclosure, the term "TTI/occasion" may refer to a TTI and/or an occasion.

With respect to one or more embodiments herein, in some examples, in a TTI/occasion, the first UE may have a plurality of sidelink transmissions (e.g., a plurality of scheduled and/or requested sidelink transmissions) on the plurality of carriers/cells. In some examples, the plurality of sidelink transmissions may at least partially overlap with each other in time domain. For example, in a symbol (e.g., a time symbol), the first UE may have the plurality of sidelink transmissions on the plurality of carriers/cells.

With respect to one or more embodiments herein, in some examples, a sidelink carrier/cell may comprise, may correspond to (e.g., may be and/or may refer to), may represent and/or may replace a sidelink carrier frequency. In some examples, a sidelink carrier/cell may comprise, may correspond to (e.g., may be and/or may refer to), may represent and/or may replace a sidelink BWP.

With respect to one or more embodiments herein, in some examples, the first UE may perform sensing in a sidelink resource pool for generating an inter-UE coordination information/message (e.g., the inter-UE coordination information/request). The first UE may monitor and/or receive one or more SCIs in the sidelink resource pool, and/or the first UE may acquire and/or identify reserved resources of other UE(s) via received SCIs from the other UE(s).

With respect to one or more embodiments herein, in some examples, for sidelink, a lower priority value may mean a higher priority.

With respect to one or more embodiments herein, in some examples, a smaller priority value (associated with sidelink MAC CE, sidelink data, and/or sidelink logical channel) may mean and/or indicate a higher priority. For example, priority value 1 may mean and/or indicate a highest priority, while priority value 8 may mean and/or indicate a lower and/or a lowest priority.

With respect to one or more embodiments herein, in some examples, when a first priority value of a first sidelink MAC CE, data and/or logical channel is smaller than a second priority value of a second sidelink MAC CE, data and/or logical channel, priority of the first sidelink MAC CE, data and/or logical channel may be higher than priority of the second sidelink MAC CE, data and/or logical channel. Alternatively and/or additionally, a sidelink MAC CE, data and/or logical channel with a highest priority may be set to and/or configured with a lower and/or a lowest priority value (e.g., a fixed value 0 or 1).

With respect to one or more embodiments herein, in some examples, the inter-UE coordination information/message may comprise and/or may correspond to (e.g., may be and/or may refer to) an inter-UE coordination information report. In some examples, the inter-UE coordination information/message may comprise and/or may correspond to (e.g., may be and/or may refer to) scheme 1 inter-UE coordination information report. In some examples, the inter-UE coordination information/message may comprise and/or may correspond to (e.g., may be and/or may refer to) an inter-device coordination information.

With respect to one or more embodiments herein, in some examples, the first UE may generate an inter-UE coordination information/message (e.g., one inter-UE coordination information/message) in response to receiving a request (e.g., one request). The request may be received from one or more other UEs (e.g., one or more paired UEs with which the first UE is paired). In some examples, the first UE may generate an inter-UE coordination information/message (e.g., one inter-UE coordination information/message) in response to the first UE detecting and/or determining that a condition is satisfied (e.g., the inter-UE coordination information/message may be condition-triggered).

With respect to one or more embodiments herein, in some examples, the first UE may perform one or more sidelink transmissions (e.g., one or more sidelink data transmissions and/or one or more sidelink shared transmissions) on the scheduled/reserved set of sidelink resources for transmitting the first sidelink data packet. In some examples, the first UE may performs one or more sidelink transmissions (e.g., one or more sidelink data transmissions and/or one or more sidelink shared transmissions) on the scheduled/reserved sidelink resources for transmitting the sidelink message, the sidelink MAC CE and/or the sidelink MAC PDU.

With respect to one or more embodiments herein, in some examples, the sidelink data/shared transmission from the first UE may be and/or may comprise PSSCH transmission. In some examples, the PSSCH transmission from the UE may be a device-to-device transmission. The PSSCH transmission may be utilized for transmitting a data packet, a transport block, and/or a MAC Protocol Data Unit (PDU).

MAC CE may be comprised in a MAC PDU, a transport block and/or a data packet. The MAC PDU may represent and/or be a data packet and/or a TB.

With respect to one or more embodiments herein, in some examples, monitoring a slot in a sidelink carrier/cell may comprise and/or may correspond to (e.g., may be and/or may refer to) the first UE monitoring, receiving, and/or detecting one or more SCIs in the slot (e.g., all SCIs in the slot) in one or more sidelink resource pools in the sidelink carrier/cell.

With respect to one or more embodiments herein, in some examples, the SCI may be delivered in PSCCH (and/or in one or more other channels in addition to PSCCH). In some examples, the SCI may comprise first-stage SCI. In some examples, the first-stage SCI may be transmitted via PSCCH. In some examples, the SCI may comprise second-stage SCI. In some examples, the second-stage SCI may be transmitted via multiplexed with PSSCH. In some examples, the first-stage SCI may comprise SCI format 1, and/or SCI format 1-X. In some examples, the second-stage SCI may comprise at least one of SCI format 2-A, SCI format 2-B, SCI format 2-C, SCI format 2-X, etc.

With respect to one or more embodiments herein, in some examples, the slot may correspond to (e.g., may be and/or may refer to) a sidelink slot. In some examples, the slot may be represented as and/or replaced with a Transmission Time Interval (TTI). In some examples, in the present disclosure, one, some and/or all instances of the term "slot" may be replaced with the term "TTI".

With respect to one or more embodiments herein, in some examples, the sidelink slot may correspond to (e.g., may be and/or may refer to) slot for sidelink. In some examples, a TTI may be a subframe (for sidelink, for example), a slot (for sidelink, for example) or a sub-slot (for sidelink, for example). In some examples, a TTI comprises multiple symbols, e.g., 12, 14 or other number of symbols. In some examples, a TTI may be a slot comprising sidelink symbols (e.g., the slot may fully/partially comprise the sidelink symbols). In some examples, a TTI may mean a transmission time interval for a sidelink transmission (e.g., a sidelink data transmission). In some examples, a sidelink slot (e.g., a slot for sidelink) may comprise OFDM symbols available for sidelink transmission (e.g., all OFDM symbols available for sidelink transmission). In some examples, a sidelink slot (e.g., a slot for sidelink) may contain a consecutive number of symbols available for sidelink transmission (e.g., when the number is 5, the sidelink slot may comprise 5 consecutive symbols available for sidelink transmission). In some examples, a sidelink slot (e.g., a slot for sidelink) may comprise and/or may correspond to (e.g., may be and/or may refer to) a slot that is included in a sidelink resource pool.

With respect to one or more embodiments herein, in some examples, the symbol may comprise and/or may correspond to (e.g., may be and/or may refer to) a symbol indicated and/or configured for sidelink.

With respect to one or more embodiments herein, in some examples, the slot may comprise and/or may correspond to (e.g., may be and/or may refer to) a sidelink slot associated with the sidelink resource pool. In some examples, the slot may not comprise and/or may not correspond to (e.g., may not be and/or may not refer to) a sidelink slot associated with other sidelink resource pool (different than the sidelink resource pool).

With respect to one or more embodiments herein, in some examples, the contiguous slots may comprise and/or may correspond to (e.g., may be and/or may refer to) contiguous sidelink slots in and/or for the sidelink resource pool.

With respect to one or more embodiments herein, in some examples, the contiguous slots may or may not be contiguous physical slots. It means that the contiguous slots in the sidelink resource pool may be not contiguous from the aspect of physical slot. In some examples, the contiguous slots may or may not be contiguous in sidelink slots associated with a sidelink BWP and/or a sidelink carrier/cell (e.g., the sidelink slots may be sidelink slots that are in and/or for the sidelink BWP and/or the sidelink carrier/cell). For example, the contiguous slots in the sidelink resource pool may be not contiguous from the aspect of sidelink slots in a sidelink BWP or a sidelink carrier/cell. In some examples, there may be one or more sidelink resource pools in a sidelink BWP and/or a sidelink carrier/cell.

With respect to one or more embodiments herein, in some examples, the sidelink data packet (e.g., the first sidelink data packet) may comprise and/or may correspond to (e.g., may be and/or may refer to) a TB. In some examples, the sidelink data packet (e.g., the first sidelink data packet) may comprise and/or may correspond to (e.g., may be and/or may refer to) a MAC PDU.

With respect to one or more embodiments herein, in some examples, the sidelink data packet (e.g., the first sidelink data packet) is associated with at least a sidelink logical channel. In some examples, the sidelink data packet (e.g., the first sidelink data packet) comprises data from at least a sidelink logical channel.

With respect to one or more embodiments herein, in some examples, a sub-channel may be a unit for sidelink resource allocation and/or scheduling (for PSSCH, for example). A sub-channel may comprise multiple contiguous Physical Resource Blocks (PRBs) in frequency domain, and/or the number of PRBs for each sub-channel may be configured (e.g., pre-configured) for a sidelink resource pool. In some examples, a sidelink resource pool configuration (e.g., a sidelink resource pool pre-configuration) may indicate and/or configure a number of PRBs for each sub-channel. In some examples, the number of PRBs for a sub-channel (e.g., each sub-channel) may be at least one of 4, 5, 6, 8, 9, 10, 12, 15, 16, 18, 20, 25, 30, 48, 50, 72, 75, 96, 100 (or other value). In some examples, a sub-channel may be represented as a unit for sidelink resource allocation and/or sidelink resource scheduling. In some examples, a sub-channel may comprise and/or may correspond to (e.g., may be and/or may refer to) a PRB. In some examples, a sub-channel may comprise and/or may correspond to (e.g., may be and/or may refer to) a set of consecutive PRBs in frequency domain. In some examples, a sub-channel may comprise and/or may correspond to (e.g., may be and/or may refer to) a set of consecutive resource elements in frequency domain.

With respect to one or more embodiments herein, in some examples, the resource reservation period value may be in units of milliseconds. The resource reservation period value may be (converted and/or changed, for example) into units of slots for deriving and/or determining periodic occasions of periodic sidelink data resources.

With respect to one or more embodiments herein, in some examples, the first UE acquires resource reservation information from one or more other UEs via one or more received SCIs (received from the one or more other UEs, for example). In some examples, the one or more received SCIs from the one or more other UEs includes resource reservation information of the one or more other UEs.

With respect to one or more embodiments herein, in some examples, the UE may be and/or comprise a device.

With respect to one or more embodiments herein, in some examples, the sidelink transmission and/or reception may be UE-to-UE transmission and/or reception. The sidelink transmission and/or reception may be device-to-device transmission and/or reception, may be Vehicle-to-Everything (V2X) transmission and/or reception, and/or may be Pedestrian-to-Everything (P2X) transmission and/or reception. In some examples, the sidelink transmission and/or reception may be on a PC5 interface.

With respect to one or more embodiments herein, in some examples, the PC5 interface may be a wireless interface for communication between a device and a device. The PC5 interface may be a wireless interface for communication between devices and/or between UEs. The PC5 interface may be a wireless interface for V2X and/or P2X communication. The Uu interface may be a wireless interface for communication between a network node and a device. The Uu interface may be a wireless interface for communication between a network node and a UE.

With respect to one or more embodiments herein, in some examples, the first UE may be a first device, a UE-A and/or a UE-B. The first UE may be a vehicle UE and/or a V2X UE.

With respect to one or more embodiments herein, in some examples, the second UE may be a second device, a UE-B and/or a UE-A. The second UE may be a vehicle UE and/or a V2X UE.

With respect to one or more embodiments herein, in some examples, a sidelink logical channel may be a Sidelink Control Channel (SCCH) or a Sidelink Traffic Channel (STCH). In some examples, a sidelink logical channel may not be a physical channel.

Figure 5:
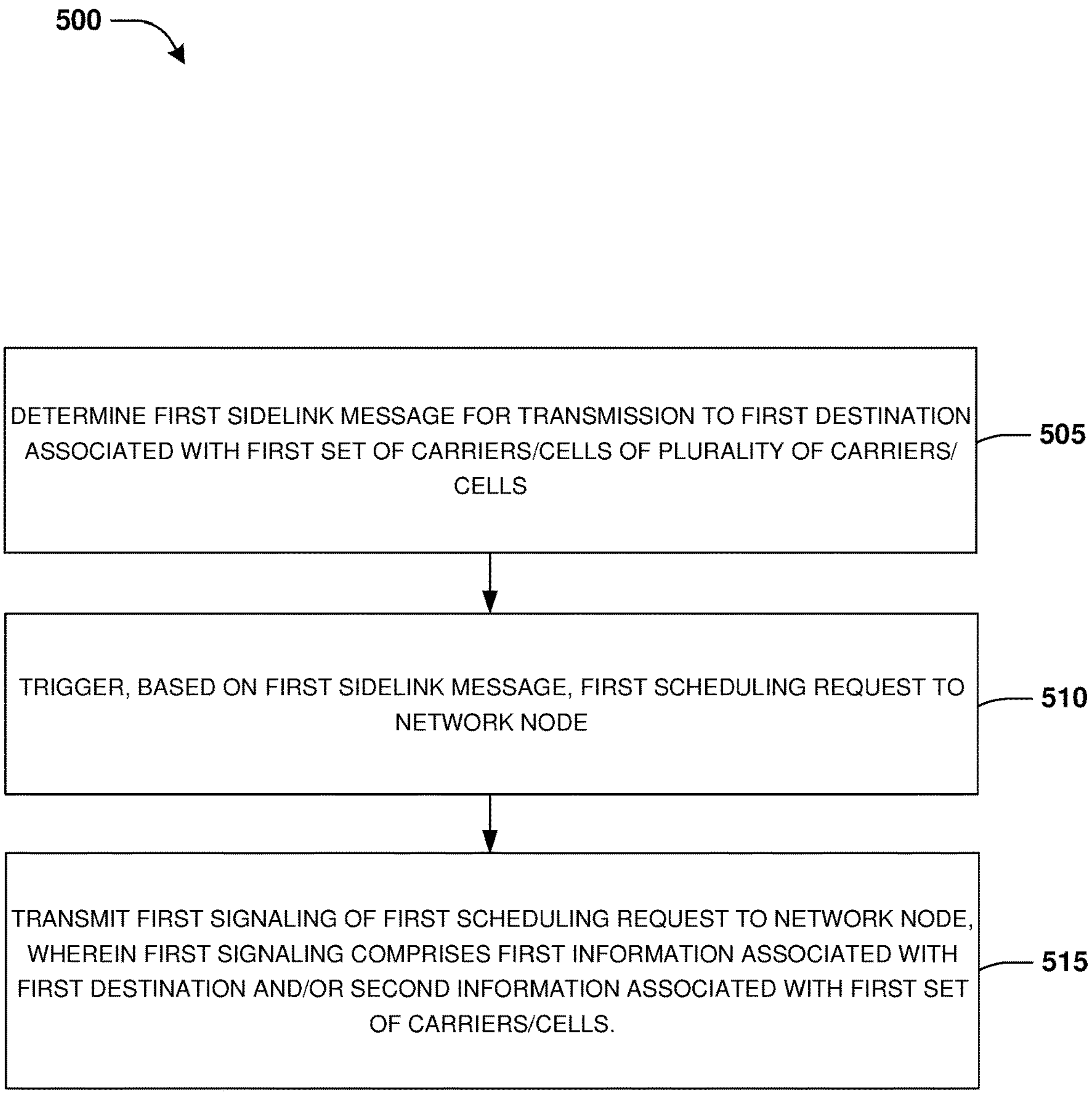
FIG. 5 is a flow chart according to one exemplary embodiment.

FIG. 5 is a flow chart 500 according to one exemplary embodiment from the perspective of a first device configured with a plurality of carriers/cells for sidelink communication. For example, the plurality of carriers/cells may be utilized for sidelink communication. The first device may have configurations (e.g., carrier configurations and/or cell configurations) of the plurality of carriers/cells. In step 505, the first device determines (e.g., derives and/or generates) a first sidelink message for transmission to a first destination associated with a first set of carriers/cells of the plurality of carriers/cells. For example, the first device may have the first sidelink message available for transmission to the first destination associated with the first set of carriers/cells. In step 510, the first device triggers, based on the first sidelink message, a first scheduling request to a network node. In some examples, the first device may trigger the first scheduling request to the network node in response to the first sidelink message (e.g., in response to determining the first sidelink message and/or in response to the first sidelink message being available for transmission to the first destination). In some examples, the first device may trigger the first scheduling request to the network node in response to being triggered by a different entity different than the first device. In step 515, the first device transmits a first signaling of the first scheduling request to the network node. The first signaling comprises first information (e.g., a first L1 or L2 destination ID) associated with the first destination and/or second information associated with the first set of carriers/cells.

In some examples, the second information may comprise an identifier (e.g., one identifier, such as at least one of an index or an identity, etc.) associated with the first set of carriers/cells. The first set of carriers/cells may comprise one or more carriers/cells. In some examples, the second information may comprise one or more identifiers (e.g., at least one of an index, an identity, SL-Freq-Id, SL carrier/cell Id, etc.) of one or more carriers/cells of the first set of carriers/cells. Alternatively and/or additionally, the second information may comprise ordering information. The ordering information may be indicative of an order in which information is arranged in the first sidelink message, for example. Alternatively and/or additionally, the ordering information may be indicative of an order of one or more timings associated with generating, triggering and/or requesting a sidelink report, a sidelink request and/or a sidelink command (e.g., the sidelink report, the sidelink request and/or the sidelink command may be included in the first sidelink message).

In some examples, the first signaling comprises at least one of a first signal, a first set of signals, one or more first signals sent in a single transmission or multiple transmissions, etc. The first signaling may be a first PUCCH transmission utilized for the first scheduling request.

In one embodiment, the first device determines a first uplink resource of the first signaling based on the first destination and/or the first set of carriers/cells.

In one embodiment, the first device determines the first uplink resource of the first signaling based on the first scheduling request configuration associated with the first destination and/or the first set of carriers/cells.

In one embodiment, the first device transmits the first signaling using the first uplink resource. The first uplink resource may be a first PUCCH resource.

In one embodiment, the first signaling comprises a field and/or a set of bits (e.g., a set of one or more bits). The field and/or the set of bits may be indicative of the first information and/or the second information.

In one embodiment, the first sidelink message is a sidelink MAC CE.

In one embodiment, the first sidelink message (e.g., the sidelink MAC CE) comprises a sidelink report, a sidelink request, and/or a sidelink command.

In one embodiment, the first sidelink message (e.g., the sidelink MAC CE) comprises a sidelink CSI report, a RSRP measurement report, a power headroom report, an inter-UE coordination information report, an inter-UE coordination request, and/or a sidelink DRX command.

In one embodiment, the first device generates the sidelink report based on a measurement and/or a sensing result associated with a first sidelink resource pool in a first carrier/cell of the first set of carriers/cells. In some examples, the measurement and/or the sensing result may be determined via sensing performed (by the first device, for example) on one or more resources of the first sidelink resource pool.

In one embodiment, the first sidelink message (e.g., the sidelink MAC CE) comprises the sidelink report and (i) information associated with the first carrier/cell and/or (ii) information associated with the first sidelink resource pool. The information associated with the first carrier/cell may comprise one or more identifiers (e.g., at least one of an index, an identity, SL-Freq-Id, SL carrier/cell Id, etc.) of the first carrier/cell, ordering information associated with the first carrier/cell, and/or other information. The information associated with the first sidelink resource pool may comprise one or more identifiers (e.g., at least one of an index, an identity, a resource pool index/identity, etc.) of the first sidelink resource pool, one or more measurements and/or sensing results associated with the first sidelink resource pool, and/or other information.

In one embodiment, the first set of carriers/cells comprises the first carrier/cell (and/or one or more other carriers/cells in addition to the first carrier/cell).

In one embodiment, an association between the first destination and the first set of carriers/cells is provided by the network node. For example, the network node may provide the first device with an indication that the first destination is associated with the first set of carriers/cells. Alternatively and/or additionally, the network node may configure the first device with a configuration indicative of the association between the first destination and the first set of carriers/cells.

In one embodiment, the association between the first destination and the first set of carriers/cells is determined by the first device. Alternatively and/or additionally, the first device may provide an indication that the first destination is associated with the first set of carriers/cells (e.g., the first device may provide the indication to the network node). Alternatively and/or additionally, the first device may configure one or more devices (e.g., the network node and/or one or more other devices) with a configuration indicative of the association between the first destination and the first set of carriers/cells.

In one embodiment, triggering the first scheduling request and/or transmitting the first signaling are performed based on the first device not having one or more available sidelink resources for transmitting the first sidelink message to the first destination. For example, the first device may trigger the first scheduling request in response to the first sidelink message (e.g., in response to determining the first sidelink message and/or in response to the first sidelink message being available for transmission to the first destination) based on the first device not having one or more available sidelink resources available to be used for transmitting the first sidelink message to the first destination. Alternatively and/or additionally, the first device may transmit the first signaling of the first scheduling request to the network node when the first device does not have one or more available sidelink resources available to be used for transmitting the first sidelink message to the first destination.

In one embodiment, the first device determines (e.g., derives and/or generates) a second sidelink message for transmission to a second destination associated with a second set of carriers/cells. For example, the first device may have the second sidelink message available for transmission to the second destination associated with the second set of carriers/cells. The first device triggers, based on the second sidelink message, a second scheduling request to the network node. In some examples, the first device may trigger the second scheduling request to the network node in response to the second sidelink message (e.g., in response to determining the second sidelink message and/or in response to the second sidelink message being available for transmission to the second destination). In some examples, the first device may trigger the second scheduling request to the network node in response to being triggered by a different entity different than the first device. The first device transmits a second signaling of the second scheduling request to the network node. The second signaling comprises third information (e.g., a second L1 or L2 destination ID) associated with the second destination and/or fourth information associated with the second set of carriers/cells. In some examples, the second signaling comprises at least one of a second signal, a second set of signals, one or more second signals sent in a single transmission or multiple transmissions, etc. The second signaling may be a second PUCCH transmission utilized for the second scheduling request.

In one embodiment, the first device determines a second uplink resource of the second signaling based on the second destination, the second set of carriers/cells, and/or a second scheduling request configuration associated with the second destination and/or the second set of carriers/cells. The second uplink resource may be a second PUCCH resource.

In one embodiment, the first device transmits the second signaling using the second uplink resource.

In one embodiment, the second signaling comprises a field and/or a set of bits (e.g., a set of one or more bits). The field and/or the set of bits may be indicative of the third information and/or the fourth information.

In one embodiment, the first device determines (e.g., derives and/or generates) a sidelink buffer status report for transmission to the network node. For example, the first device may have the sidelink buffer status report available for transmission to the network node. The first device triggers, based on the sidelink buffer status report, a third scheduling request to the network node. The first device may trigger the third scheduling request in response to the sidelink buffer status report (e.g., in response to determining the sidelink buffer status report and/or having the sidelink buffer status report available for transmission to the network node). In some examples, the first device may trigger the third scheduling request to the network node in response to being triggered by a different entity different than the first device. The first device transmits a third signaling of the third scheduling request to the network node. In some examples, the third signaling does not comprise information associated with carriers/cells (e.g., the third signaling may not comprise at least one of an index, an identity, SL-Freq-Id, SL carrier/cell Id, etc. of a carrier/cell). In some examples, the third signaling comprises at least one of a third signal, a third set of signals, one or more third signals sent in a single transmission or multiple transmissions, etc. The third signaling may be a third PUCCH transmission utilized for the third scheduling request.

Referring back to FIGS. 3 and 4, in one exemplary embodiment of a first device configured with a plurality of carriers/cells for sidelink communication, the device 300 includes a program code 312 stored in the memory 310. The CPU 308 may execute program code 312 to enable the first device (i) to determine a first sidelink message for transmission to a first destination associated with a first set of carriers/cells of the plurality of carriers/cells, (ii) to trigger, based on the first sidelink message, a first scheduling request to a network node, and (iii) to transmit a first signaling of the first scheduling request to the network node, wherein the first signaling comprises first information associated with the first destination and/or second information associated with the first set of carriers/cells. Furthermore, the CPU 308 can execute the program code 312 to perform one, some and/or all of the above-described actions and steps and/or others described herein.

Figure 6:
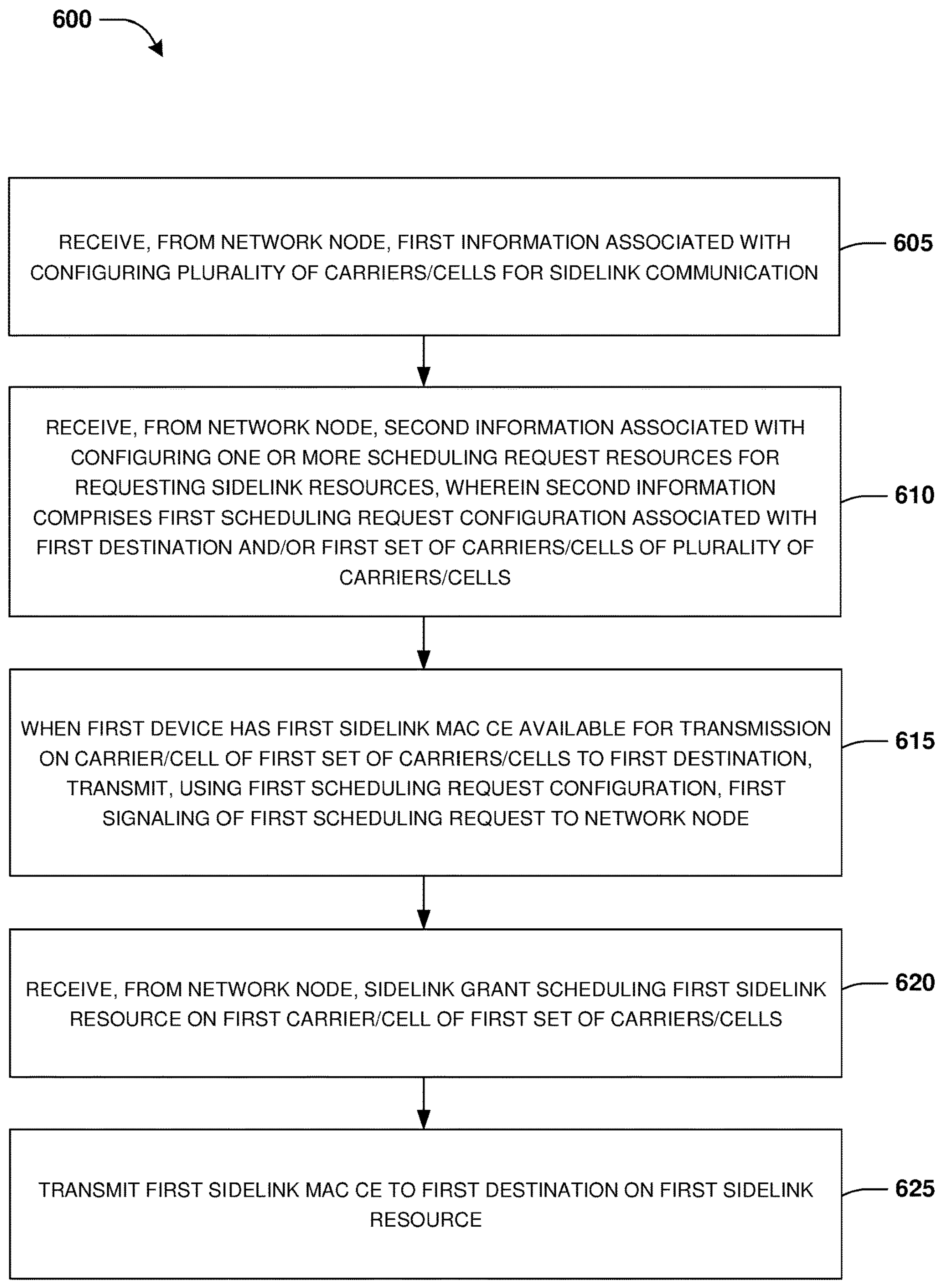
FIG. 6 is a flow chart according to one exemplary embodiment.

FIG. 6 is a flow chart 600 according to one exemplary embodiment from the perspective of a first device. In step 605, the first device receives, from a network node, first information associated with configuring a plurality of carriers/cells for sidelink communication. The plurality of carriers/cells may be utilized for sidelink communication. In an example, the first information may be indicative of the plurality of carriers/cells. Alternatively and/or additionally, the first information may comprise one or more configurations of the plurality of carriers/cells. The first device may configure the plurality of carriers/cells based upon the first information (e.g., the first device may use the one or more configurations to configure the plurality of carriers/cells). In step 610, the first device receives, from the network node, a second information associated with configuring one or more scheduling request resources for requesting sidelink resources. The second information comprises a first scheduling request configuration associated with a first destination and/or a first set of carriers/cells of the plurality of carriers/cells. In an example, the first scheduling request configuration may be used, by the first device, to generate signalings of scheduling requests that are performed to acquire resources (e.g., sidelink resources) that can be used to perform sidelink transmissions to the first destination (e.g., scheduling requests associated with acquiring resources for transmissions to the first destination may be performed according to the first scheduling request configuration) and/or on a carrier/cell (e.g., one carrier/cell) of the first set of carriers/cells. In step 615, when the first device has a first sidelink MAC CE available for transmission on a carrier/cell (e.g., one carrier cell, such as any one carrier/cell, a first carrier/cell, or a second carrier/cell) of the first set of carriers/cells to the first destination (e.g., when the first device has the first sidelink MAC CE buffered for transmission to the first destination), the first device transmits, using the first scheduling request configuration, a first signaling of a first scheduling request to the network node. The first device may generate the first signaling of the first scheduling request based upon the first scheduling request configuration. In step 620, the first device receives, from the network node, a sidelink grant scheduling a first sidelink resource on a first carrier/cell of the first set of carriers/cells. In some examples, the network node provides the first device with the sidelink grant (that schedules the first sidelink resource on the first carrier/cell) in response to receiving the first signaling of the first scheduling request. In step 625, the first device transmits the first sidelink MAC CE to the first destination on the first sidelink resource.

In some examples, the first signaling comprises at least one of a first signal, a first set of signals, one or more first signals sent in a single transmission or multiple transmissions, etc. The first signaling may be a first PUCCH transmission utilized for the first scheduling request.

In one embodiment, the first information comprises a first RRC message and/or first system information.

In one embodiment, the first information (e.g., the first RRC message and/or the first system information) is broadcasted by the network node. In one embodiment, the first system information is broadcasted by the network node In one embodiment, the second information comprises a second RRC message and/or second system information.

In one embodiment, the second information (e.g., the second RRC message and/or the second system information) is broadcasted by the network node. In one embodiment, the second system information is broadcasted by the network node In one embodiment, the first sidelink MAC CE comprises a sidelink report, a sidelink request, and/or a sidelink command.

In one embodiment, the first sidelink MAC CE comprises a sidelink CSI report, a RSRP measurement report, a power headroom report, an inter-UE coordination information report, an inter-UE coordination request, and/or a sidelink DRX command.

In one embodiment, the first device generates the sidelink report based on a measurement and/or a sensing result associated with a first sidelink resource pool in a second carrier/cell of the first set of carriers/cells. In some examples, the second carrier/cell may be different from the first carrier/cell. In some examples, the second carrier/cell may be identical to (e.g., the same as) the first carrier/cell. In some examples, the measurement and/or the sensing result may be determined via sensing performed (by the first device, for example) on one or more resources of the first sidelink resource pool.

In one embodiment, the first sidelink MAC CE comprises the sidelink report and (i) information associated with the second carrier/cell and/or (ii) information associated with the first sidelink resource pool. The information associated with the second carrier/cell may comprise one or more identifiers (e.g., at least one of an index, an identity, SL-Freq-Id, SL carrier/cell Id, etc.) of the second carrier/cell, ordering information associated with the second carrier/cell, and/or other information. The information associated with the first sidelink resource pool may comprise one or more identifiers (e.g., at least one of an index, an identity, a resource pool index/identity, etc.) of the first sidelink resource pool, one or more measurements and/or sensing results associated with the first sidelink resource pool, and/or other information.

In one embodiment, the first set of carriers/cells may comprise one or more carriers/cells. In one embodiment, the first set of carriers/cells comprises the first carrier/cell (and/or one or more other carriers/cells in addition to the first carrier/cell). In one embodiment, the first set of carriers/cells comprises the second carrier/cell (and/or one or more other carriers/cells in addition to the second carrier/cell).

In one embodiment, the first destination is associated with the first set of carriers/cells.

In one embodiment, the association between the first destination and the first set of carriers/cells is provided by the network node. For example, the network node may provide the first device with an indication that the first destination is associated with the first set of carriers/cells. Alternatively and/or additionally, the network node may configure the first device with a configuration indicative of the association between the first destination and the first set of carriers/cells.

In one embodiment, the association between the first destination and the first set of carriers/cells is determined by the first device. Alternatively and/or additionally, the first device may provide an indication that the first destination is associated with the first set of carriers/cells (e.g., the first device may provide the indication to the network node). Alternatively and/or additionally, the first device may configure one or more devices (e.g., the network node and/or one or more other devices) with a configuration indicative of the association between the first destination and the first set of carriers/cells.

In one embodiment, transmitting the first signaling is performed based on the first device not having one or more available sidelink resources for transmitting the first sidelink MAC CE to the first destination. For example, the first device may trigger the first scheduling request and/or transmit the first signaling in response to the first sidelink MAC CE (e.g., in response to determining the first sidelink MAC CE and/or in response to the first sidelink MAC CE being available for transmission to the first destination) based upon the first device not having one or more available sidelink resources available to be used for transmitting the first sidelink MAC CE to the first destination. Alternatively and/or additionally, the first device may transmit the first signaling of the first scheduling request to the network node when the first device does not have one or more available sidelink resources available to be used for transmitting the first sidelink message to the first destination.

In one embodiment, the second information comprises a second scheduling request configuration associated with a second destination and/or a second set of carriers/cells of the plurality of carriers/cells.

In one embodiment, when the first device has a second sidelink MAC CE available for transmission on a carrier/cell (e.g., one carrier cell, such as any one carrier/cell, or a third carrier/cell) of the second set of carriers/cells to the second destination, the first device transmits, using the second scheduling request configuration, a second signaling of a second scheduling request to the network node. In some examples, the second signaling comprises at least one of a second signal, a second set of signals, one or more second signals sent in a single transmission or multiple transmissions, etc. The second signaling may be a second PUCCH transmission utilized for the second scheduling request.

In one embodiment, the first device determines (e.g., derives and/or generates) a sidelink buffer status report for transmission to the network node. For example, the first device may have the sidelink buffer status report available for transmission to the network node. In response to the sidelink buffer status report (e.g., in response to determining the sidelink buffer status report and/or having the sidelink buffer status report available for transmission to the network node), the first device transmits, using a third scheduling request configuration, a third signaling of a third scheduling request to the network node. In some examples, the third signaling is not associated with a destination, carriers and/or cells. In some examples, the third signaling comprises at least one of a third signal, a third set of signals, one or more third signals sent in a single transmission or multiple transmissions, etc. The third signaling may be a third PUCCH transmission utilized for the third scheduling request.

Referring back to FIGS. 3 and 4, in one exemplary embodiment of a first device, the device 300 includes a program code 312 stored in the memory 310. The CPU 308 may execute program code 312 to enable the first device (i) to receive, from a network node, first information associated with configuring a plurality of carriers/cells for sidelink communication, (ii) to receive, from the network node, a second information associated with configuring one or more scheduling request resources for requesting sidelink resources, wherein the second information comprises a first scheduling request configuration associated with a first destination and/or a first set of carriers/cells of the plurality of carriers/cells, (iii) when the first device has a first sidelink MAC CE available for transmission on a carrier/cell of the first set of carriers/cells to the first destination, to transmit, using the first scheduling request configuration, a first signaling of a first scheduling request to the network node, (iv) to receive, from the network node, a sidelink grant scheduling a first sidelink resource on a first carrier/cell of the first set of carriers/cells, and (v) to transmit the first sidelink MAC CE to the first destination on the first sidelink resource. Furthermore, the CPU 308 can execute the program code 312 to perform one, some and/or all of the above-described actions and steps and/or others described herein.

Figure 7:
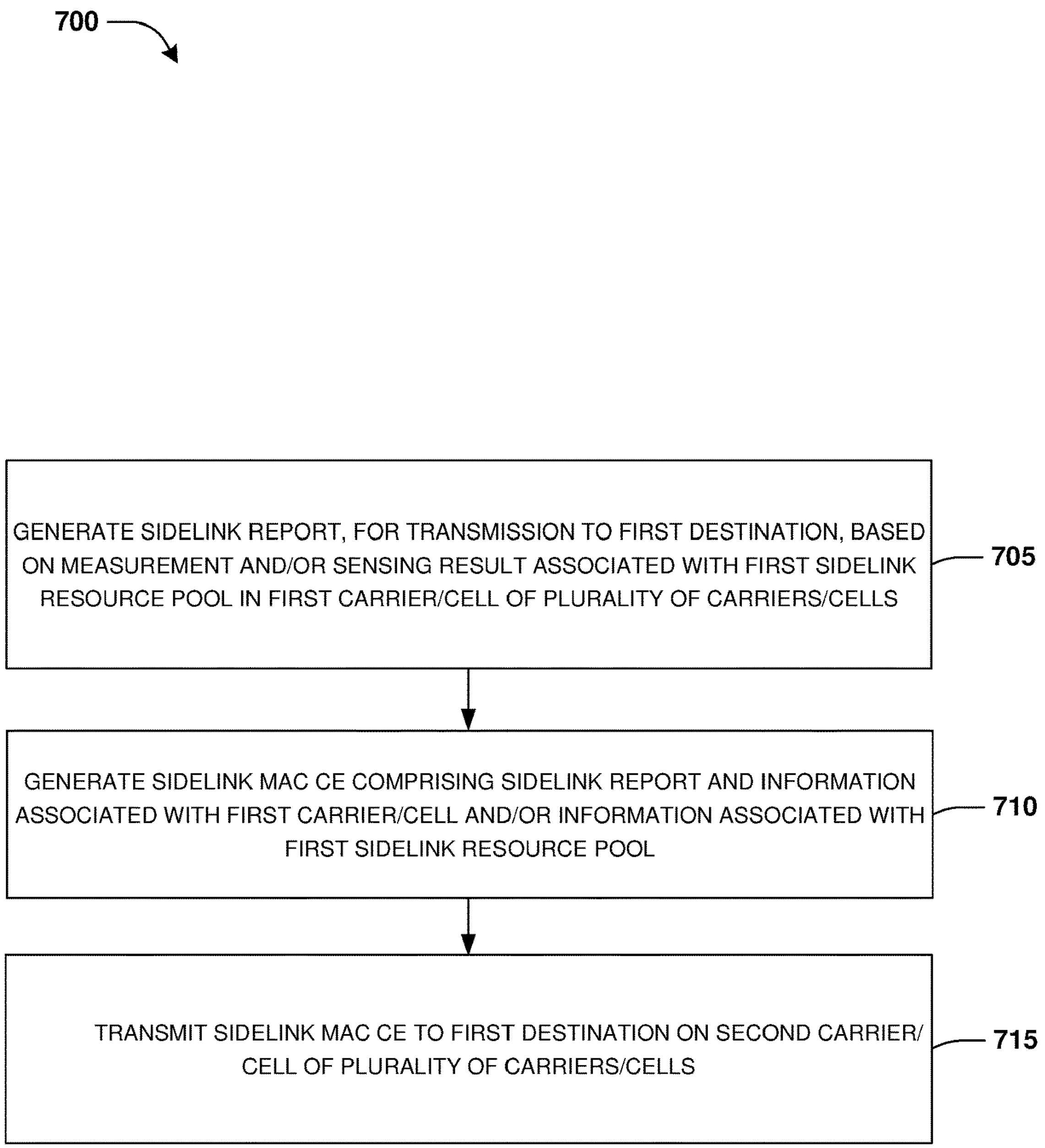
FIG. 7 is a flow chart according to one exemplary embodiment.

FIG. 7 is a flow chart 700 according to one exemplary embodiment from the perspective of a first device configured with a plurality of carriers/cells for sidelink communication. For example, the plurality of carriers/cells may be utilized for sidelink communication. The first device may have configurations (e.g., carrier configurations and/or cell configurations) of the plurality of carriers/cells. In step 705, the first device generates a sidelink report, for transmission to a first destination, based on a measurement and/or a sensing result associated with a first sidelink resource pool in a first carrier/cell of the plurality of carriers/cells. In some examples, the measurement and/or the sensing result may be determined via sensing performed (by the first device, for example) on one or more resources of the first sidelink resource pool. In step 710, the first device generates a sidelink MAC CE comprising the sidelink report and (i) information associated with the first carrier/cell and/or (ii) information associated with the first sidelink resource pool. In step 715, the first device transmits the sidelink MAC CE to the first destination on a second carrier/cell of the plurality of carriers/cells.

In some examples, the information associated with the first carrier/cell may comprise one or more identifiers (e.g., at least one of an index, an identity, SL-Freq-Id, SL carrier/cell Id, etc.) of the first carrier/cell, ordering information associated with the first carrier/cell, and/or other information.

In some examples, the information associated with the first sidelink resource pool may comprise one or more identifiers (e.g., at least one of an index, an identity, a resource pool index/identity, etc.) of the first sidelink resource pool, one or more measurements and/or sensing results associated with the first sidelink resource pool, and/or other information.

In one embodiment, the sidelink report comprises a sidelink CSI report, a RSRP measurement report, a power headroom report, and/or an inter-UE coordination information report.

In one embodiment, the first destination is associated with a first set of carriers/cells comprising the first carrier/cell and the second carrier/cell (and/or one or more other carriers/cells in addition to the first carrier/cell and the second carrier/cell). In one embodiment, the second carrier/cell may be different from the first carrier/cell. In one embodiment, the second carrier/cell may be identical to (e.g., the same as) the first carrier/cell.

In one embodiment, the association between the first destination and the first set of carriers/cells is provided by a network node. For example, the network node may provide the first device with an indication that the first destination is associated with the first set of carriers/cells. Alternatively and/or additionally, the network node may configure the first device with a configuration indicative of the association between the first destination and the first set of carriers/cells.

In one embodiment, the association between the first destination and the first set of carriers/cells is determined by the first device. Alternatively and/or additionally, the first device may provide an indication that the first destination is associated with the first set of carriers/cells (e.g., the first device may provide the indication to the network node). Alternatively and/or additionally, the first device may configure one or more devices (e.g., the network node and/or one or more other devices) with a configuration indicative of the association between the first destination and the first set of carriers/cells.

In one embodiment, when the first device does not have one or more available sidelink resources for transmitting the sidelink MAC CE to the first destination, the first device transmits, using a first scheduling request configuration, a first signaling of a first scheduling request to a network node. In some examples, the first signaling comprises at least one of a first signal, a first set of signals, one or more first signals sent in a single transmission or multiple transmissions, etc. The first signaling may be a first PUCCH transmission utilized for the first scheduling request.

In one embodiment, the first scheduling request configuration is associated with the first destination and/or the first set of carriers/cells.

Referring back to FIGS. 3 and 4, in one exemplary embodiment of a first device configured with a plurality of carriers/cells for sidelink communication, the device 300 includes a program code 312 stored in the memory 310. The CPU 308 may execute program code 312 to enable the first device (i) to generate a sidelink report, for transmission to a first destination, based on a measurement and/or a sensing result associated with a first sidelink resource pool in a first carrier/cell of the plurality of carriers/cells, (ii) to generate a sidelink MAC CE comprising the sidelink report and information associated with the first carrier/cell and/or information associated with the first sidelink resource pool, and (iii) to transmit the sidelink MAC CE to the first destination on a second carrier/cell of the plurality of carriers/cells. Furthermore, the CPU 308 can execute the program code 312 to perform one, some and/or all of the above-described actions and steps and/or others described herein.

A communication device (e.g., a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in FIGS. 5-7. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise a flash memory device, a hard disk drive, a disc (e.g., a magnetic disc and/or an optical disc, such as at least one of a digital versatile disc (DVD), a compact disc (CD), etc.), and/or a memory semiconductor, such as at least one of static random access memory (SRAM), dynamic random access memory (DRAM), synchronous dynamic random access memory (SDRAM), etc. The computer-readable medium may comprise processor-executable instructions, that when executed cause performance of one, some and/or all method steps illustrated in FIGS. 5-7, and/or one, some and/or all of the above-described actions and steps and/or others described herein.

It may be appreciated that applying one or more of the techniques presented herein may result in one or more benefits including, but not limited to, increased efficiency of communication between devices (e.g., one or more UEs and/or one or more network nodes). The increased efficiency may be a result of enabling devices to perform logical channel prioritization, destination selection, scheduling request and/or sidelink DRX operation based upon associations between sidelink carriers/cells and destinations/logical channels. In the present disclosure, the term "destinations/logical channels" may refer to destinations and/or logical channels. For example, in response to association between sidelink carriers/cells and destinations/logical channels, logical channel prioritization, destination selection, scheduling request, and/or sidelink DRX operation can be performed accordingly to avoid impact on resource waste, power consumption, and/or UE complexity.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based on design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a first device configured with a plurality of at least one of carriers or cells for sidelink communication, the method comprising:

generating a sidelink report, for transmission to a first destination, based on at least one of a measurement or a sensing result associated with a first sidelink resource pool in at least one of a first carrier or a first cell of the plurality of at least one of carriers or cells;

generating a sidelink Medium Access Control (MAC) Control Element (CE) comprising the sidelink report and at least one of:

information associated with at least one of the first carrier or the first cell; or information associated with the first sidelink resource pool; and transmitting the sidelink MAC CE to the first destination on at least one of a second carrier or a second cell of the plurality of at least one of carriers or cells.

2. The method of claim 1, wherein:

the sidelink report comprises at least one of a sidelink Channel State Information (CSI) report, a Reference Signal Received Power (RSRP) measurement report, a power headroom report, or an inter-User Equipment (UE) coordination information report.

3. The method of claim 1, wherein at least one of:

the first destination is associated with a first set of at least one of carriers or cells comprising:

at least one of the first carrier or the first cell; and at least one of the second carrier or the second cell;

the association between the first destination and the first set of at least one of carriers or cells is provided by a network node; or the association between the first destination and the first set of at least one of carriers or cells is determined by the first device.

4. The method of claim 3, wherein at least one of:

the method comprises, when the first device does not have one or more available sidelink resources for transmitting the sidelink MAC CE to the first destination, transmitting, using a first scheduling request configuration, a first signaling of a first scheduling request to the network node; or the first scheduling request configuration is associated with at least one of the first destination or the first set of at least one of carriers or cells.

5. A first device configured with a plurality of at least one of carriers or cells for sidelink communication, the first device comprising:

a control circuit;

a processor installed in the control circuit; and a memory installed in the control circuit and operatively coupled to the processor, wherein the processor is configured to execute a program code stored in the memory to perform operations, the operations comprising:

generating a sidelink report, for transmission to a first destination, based on at least one of a measurement or a sensing result associated with a first sidelink resource pool in at least one of a first carrier or a first cell of the plurality of at least one of carriers or cells;

generating a sidelink Medium Access Control (MAC) Control Element (CE) comprising the sidelink report and at least one of:

information associated with at least one of the first carrier or the first cell; or information associated with the first sidelink resource pool; and transmitting the sidelink MAC CE to the first destination on at least one of a second carrier or a second cell of the plurality of at least one of carriers or cells.

6. The first device of claim 5, wherein:

the sidelink report comprises at least one of a sidelink Channel State Information (CSI) report, a Reference Signal Received Power (RSRP) measurement report, a power headroom report, or an inter-User Equipment (UE) coordination information report.

7. The first device of claim 5, wherein:

the first destination is associated with a first set of at least one of carriers or cells comprising:

at least one of the first carrier or the first cell.

8. The first device of claim 5, wherein:

the first destination is associated with a first set of at least one of carriers or cells comprising:

at least one of the second carrier or the second cell.

9. The first device of claim 5, wherein:

an association between the first destination and a first set of at least one of carriers or cells is provided by a network node.

10. The first device of claim 5, wherein:

an association between the first destination and a first set of at least one of carriers or cells is determined by the first device.

11. The first device of claim 5, comprising:

when the first device does not have one or more available sidelink resources for transmitting the sidelink MAC CE to the first destination, transmitting, using a first scheduling request configuration, a first signaling of a first scheduling request to a network node.

12. The first device of claim 11, wherein:

the first scheduling request configuration is associated with at least one of the first destination or a first set of at least one of carriers or cells associated with the first destination.

13. A non-transitory computer-readable medium comprising processor-executable instructions that when executed cause performance of operations of a first device configured with a plurality of at least one of carriers or cells for sidelink communication, the operations comprising:

generating a sidelink report, for transmission to a first destination, based on at least one of a measurement or a sensing result associated with a first sidelink resource pool in at least one of a first carrier or a first cell of the plurality of at least one of carriers or cells;

generating a sidelink Medium Access Control (MAC) Control Element (CE) comprising the sidelink report and at least one of:

information associated with at least one of the first carrier or the first cell; or information associated with the first sidelink resource pool; and transmitting the sidelink MAC CE to the first destination on at least one of a second carrier or a second cell of the plurality of at least one of carriers or cells.

14. The non-transitory computer-readable medium of claim 13, wherein:

the sidelink report comprises at least one of a sidelink Channel State Information (CSI) report, a Reference Signal Received Power (RSRP) measurement report, a power headroom report, or an inter-User Equipment (UE) coordination information report.

15. The non-transitory computer-readable medium of claim 13, wherein:

the first destination is associated with a first set of at least one of carriers or cells comprising:

at least one of the first carrier or the first cell.

16. The non-transitory computer-readable medium of claim 13, wherein:

the first destination is associated with a first set of at least one of carriers or cells comprising:

at least one of the second carrier or the second cell.

17. The non-transitory computer-readable medium of claim 13, wherein:

an association between the first destination and a first set of at least one of carriers or cells is provided by a network node.

18. The non-transitory computer-readable medium of claim 13, wherein:

an association between the first destination and a first set of at least one of carriers or cells is determined by the first device.

19. The non-transitory computer-readable medium of claim 13, comprising:

when the first device does not have one or more available sidelink resources for transmitting the sidelink MAC CE to the first destination, transmitting, using a first scheduling request configuration, a first signaling of a first scheduling request to a network node.

20. The non-transitory computer-readable medium of claim 19, wherein:

the first scheduling request configuration is associated with at least one of the first destination or a first set of at least one of carriers or cells associated with the first destination.

* * * * *